United States Patent
Mitate et al.

[11] Patent Number: 5,985,488
[45] Date of Patent: Nov. 16, 1999

[54] PROCESS FOR PREPARING POSITIVE ELECTRODE ACTIVE MATERIAL, AND NONAQUEOUS SECONDARY BATTERY UTILIZING THE SAME

[75] Inventors: Takehito Mitate, Yamatotakada; Naoto Torata, Kitakatsuragi-gun; Tetsuya Yoneda, Nabari; Kazuaki Minato, Osaka; Toyoshi Iida, Fukui; Tetsushi Makino, Fukui; Shigeyuki Hamano, Fukui; Naoyoshi Kameda, Fukui; Tomohiko Inada, Fukui, all of Japan

[73] Assignees: Sharp Kabushiki Kaisha, Osaka, Japan; Tanaka Chemical Corporation, Fukui, Japan

[21] Appl. No.: 08/823,536

[22] Filed: Mar. 25, 1997

[30] Foreign Application Priority Data

| Mar. 26, 1996 | [JP] | Japan | 8-070589 |
|---|---|---|---|
| Mar. 26, 1996 | [JP] | Japan | 8-070590 |
| Mar. 26, 1996 | [JP] | Japan | 8-070591 |
| Feb. 3, 1997 | [JP] | Japan | 9-020811 |
| Feb. 3, 1997 | [JP] | Japan | 9-020812 |
| Feb. 3, 1997 | [JP] | Japan | 9-020813 |

[51] Int. Cl.$^6$ .......................... H01M 4/52; C01G 49/00
[52] U.S. Cl. ........................ 429/223; 423/138; 423/594
[58] Field of Search .................... 429/223; 423/138, 423/594

[56] References Cited

U.S. PATENT DOCUMENTS

| 4,980,080 | 12/1990 | Lecerf et al. | 429/223 X |
|---|---|---|---|
| 5,565,688 | 10/1996 | Hayashi | 423/594 X |
| 5,728,367 | 3/1998 | Mao | 423/594 X |
| 5,759,717 | 6/1998 | Amine et al. | 429/223 X |

FOREIGN PATENT DOCUMENTS

| 0017400 A1 | 10/1980 | European Pat. Off. . |
|---|---|---|
| 0573040 A1 | 12/1993 | European Pat. Off. . |
| 0701293 A2 | 3/1996 | European Pat. Off. . |
| 5-251079 | 9/1993 | Japan . |
| 5-325966 | 12/1993 | Japan . |
| 6-44970 | 2/1994 | Japan . |
| 6-44971 | 2/1994 | Japan . |
| 6-96769 | 4/1994 | Japan . |
| 6-203834 | 7/1994 | Japan . |
| 2087858A | 6/1982 | United Kingdom . |
| WO 97/05062 | 2/1997 | WIPO . |

OTHER PUBLICATIONS

Patent Abstracts of Japan, vol. 018, No. 551 (E–1619), Oct. 20, 1994 & JP 06 203834 A (Masayuki Yoshio; Others: 02), Jul. 22, 1994.

*Primary Examiner*—Stephen Kalafut
*Attorney, Agent, or Firm*—Nixon & Vanderhye P.C.

[57] ABSTRACT

A process for preparing lithium nickeloxide ($LiNiO_2$) for use as a positive electrode active material for a nonaqueous secondary battery, which comprises the steps of: (a) using as the raw materials a lithium compound and a nickel compound at least one of which has a melting point not higher than 300° C.; i) in case where both of the lithium compound and the nickel compound have a melting point not higher than 300° C., mixing the above two compounds after their melting, or mixing the above compounds, melting the mixture and mixing the melted mixture; ii) in case where either one of the lithium compound and the nickel compound has a melting point higher than 300° C., mixing said one having a melting point higher than 300° C. with the remaining one before or after its melting; (b) calcining the resulting mixture at a temperature of 700° C. to 950° C. in air or in an atmosphere containing oxygen in a higher concentration than an atmospheric oxygen concentration.

34 Claims, 26 Drawing Sheets

PROCESS FOR PREPARING POSITIVE ELECTRODE ACTIVE MATERIAL, AND NONAQUEOUS SECONDARY BATTERY UTILIZING THE SAME

BACKGROUND OF THE INVENTION

1. Field of the Invention

The present invention relates to a process for preparing a positive electrode active material and to a nonaqueous secondary battery utilizing the same. More specifically, the invention relates to a process for preparing a positive electrode active material of lithium nickel oxide ($LiNiO_2$), and to a nonaqueous secondary battery comprising a positive electrode containing the positive electrode active material, a negative electrode containing a lithium-containing substance or a lithium insertable and releasable substance such as carbon or graphite, and a nonaqueous ion conductor.

2. Related Art

With the size reduction and power saving of electronic devices, research and development have been made on lightweight secondary batteries which utilize an alkali metal such as lithium and are capable of discharging at a high voltage.

Where an alkali metal such as lithium is used alone for the negative electrode of a secondary battery, a dendrite (branching tree-like crystal) appears and grows on the metal surface during repeated charge and discharge cycles, i.e., during a metal dissolution and deposition process. The dendrite may penetrate through the separator of the secondary battery to come in contact with the positive electrode. This will result in a short circuit within the secondary battery. Where an alkali metal alloy is used for the negative electrode of a secondary battery instead of the alkali metal, the generation of the dendrite can be suppressed and, hence, the charge and discharge cycle characteristics are improved in comparison with the case where the alkali metal is used alone. However, the generation of the dendrite cannot be completely prevented, and there still exists the problem of the short circuit within the secondary battery.

In recent years, it has been reported that carbon materials and organic materials such as conductive polymers are useful for the negative electrode. These materials utilize a process of absorption and desorption of alkali metal ions instead of the dissolution-deposition process or the dissolution-deposition-diffusion process of a metal such as an alkali metal or its alloy. The use of these materials, in principle, prevents the generation of the dendrite which may occur where the alkali metal or its alloy is used. This remarkably reduces the risk of the short circuit within the battery. For this reason, a lithium ion battery utilizing a carbon or graphite material for its negative electrode and lithium cobaltate for its positive electrode has been put in practical use.

The use of lithium cobaltate for the positive electrode, however, entails an increase in the material cost because of the scarcity of the cobalt resource.

The use of lithium nickel oxide ($LiNiO_2$) prepared from a nickel material which is a less expensive and more abundant resource was proposed by John Banister Goodenough et.al. (Japanese Examined Patent Publication No. 63-59507 (1988)). Lithium nickeloxide has since then been receiving attention.

Exemplary processes for preparing lithium nickel oxide ($LiNiO_2$) are as follows:

(1) Calcining a mixture of anhydrous lithium hydroxide and art metal nickel in an atmosphere of oxygen (J. Am. Chem. Soc., 76, 1499 (1954));

(2) Mixing $LiOH.H_2O$ and NiO, and calcining the mixture at 600° C. in air, pulverizing the material mixture and then calcining again at a temperature of 600° C. to 800° C. for preparation of $Li_yNi_{2-y}O_2$ (Japanese Unexamined Patent Publication No. 2-40861 (1990));

(3) Calcining a material mixture at a temperature of 600° C. to 800° C. (preferably calcining the material mixture at 800° C. for 6 hours twice) for preparation of $LiMO_2$ wherein M is one or more elements selected from Co, Ni, Fe and Mn (Japanese Unexamined Patent Publication No. 4-181660 (1992));

(4) Mixing lithium peroxide ($Li_2O_2$) and nickel oxide (NiO), then reacting the mixture at a temperature lower than 750° C., and thereafter rapidly cooling the resulting product (Japanese Unexamined Patent Publication No. 5-205741 (1993)); and (5) Mixing lithium nitrate with nickel hydroxide and/or nickel oxyhydroxide, and calcining the mixture at a temperature of 500° C. to 1,000° C. (Japanese Unexamined Patent Publication No. 5-251079 (1993)).

In these processes, a lithium compound and a nickel compound are mixed in a solid phase before the calcination and, therefore, the mixture of the nickel compound and the lithium compound is not homogeneous.

Another exemplary process (Japanese Unexamined Patent Publication No. 6-203834 (1994)) includes the steps of dissolving nickel acetate and lithium acetate in ethylene glycol under heating, further heating the solution to dryness, thermally treating the resulting solid substance at 400° C. in air, pulverizing the resulting substance, and calcining the resulting powdery substance at 700° C. and then at 800° C. in a stream of oxygen. This process requires a prolonged reaction time and complicated preparation steps.

In view of the foregoing, processes for easy preparation of lithium nickel oxide have been proposed as follows, which are adapted to increase the homogeneity of the mixture of starting materials.

(1) Mixing a 4.5 mol/l lithium hydroxide aqueous solution and a 1.0 mol/l nickel nitrate aqueous solution in an equimolar mixing ratio at 60° C., stirring the mixture, drying the solution under reduced pressure, pulverizing the resulting solid substance, calcining the resulting powdery substance at 300° C. (preliminary calcination) and then at 800° C. (main calcination) (Chemistry Express, 6, 161 (1991));

(2) Separately dissolving a nickel salt, a lithium salt and, as required, a cobalt salt in solvents, mixing the resulting solutions, and heating and calcining the mixture for preparation of $LiCo_xNi_{1-x}O_2$ ($0 \leq x \leq 0.5$) (Japanese Unexamined Patent Publication No. 5-325966 (1993)); and (3) Mixing an aqueous solution of a water-soluble nickel salt and an aqueous solution of a water-soluble lithium salt, drying the solution mixture, calcining the resulting cake at a temperature of 600° C. to 800° C. (Japanese Unexamined Patent Publication No. 6-44970 (1994)).

In these processes, aqueous solutions of starting materials are mixed and dried, and the resulting solid substance is calcined.

There are also known a process including the steps of mixing a powdery nickel compound slightly soluble or insoluble in water with an aqueous solution of a water-soluble lithium salt, kneading the mixture, drying the mixture, and calcining the resulting cake at a temperature of 600° C. to 800° C. (Japanese Unexamined Patent Publication No. 6-44971 (1994)), and a process including the steps of weighing a lithium material and a nickel material in an Li:Ni molar ratio of 1:1, mixing the lithium material and the nickel material in a small amount of water as a dispersant, drying the mixture, and calcining the resulting solid substance at 650° C. in air (Japanese Unexamined Patent Publication No. 6-96769 (1994)). These processes ensure macroscopically homogenous mixing of the starting materials.

In the processes in which a lithium material and a nickel material are mixed in a solid phase and the mixture is calcined for preparation of a positive electrode active material $LiNiO_2$ for a nonaqueous secondary battery, the nickel material and the lithium material cannot be homogeneously mixed before the calcination.

In the processes in which aqueous solutions of a lithium material and a nickel material are mixed and the mixture is dried and calcined, the homogeneity of the mixture of the nickel material and the lithium material is increased in comparison with the processes involving the solid phase mixing, because the lithium material and the nickel material are mixed in a liquid phase. However, the homogeneity of the mixture is still unsatisfactory.

The process which includes the steps of mixing nickel acetate and lithium acetate in ethylene glycol under heating, further heating the solution to dryness, thermally treating the resulting solid substance in air, pulverizing the resulting substance, and calcining twice the resulting powdery substance in a stream of oxygen presents problems of a prolonged reaction time and complicated preparation steps.

The process in which a mixture of a powdery nickel compound slightly soluble or insoluble in water and an aqueous solution of a water-soluble lithium salt is kneaded and dried, and the process in which water is used as a dispersant attempt to obtain a more homogeneous mixture. However, the resulting mixture does not have a satisfactory homogeneity after water as the solvent or dispersant is removed.

SUMMARY OF THE INVENTION

In accordance with one aspect of the present invention, there is provided a process for preparing lithium nickel oxide ($LiNiO_2$) for use as a positive electrode active material for a nonaqueous secondary battery, which comprises the steps of: (a) using as the raw materials a lithium compound and a nickel compound at least one of which has a melting point not higher than 300° C.; (i) in the case where both of the lithium compound and the nickel compound have a melting point not higher than 300° C., mixing the above two compounds after their melting, or mixing the above compounds, melting the mixture and mixing the melted mixture; (ii) in the case where either one of the lithium compound and the nickel compound has a melting point higher than 300° C., mixing said one having a melting point higher than 300° C. with the remaining one before or after its melting; (b) calcining the resulting mixture at a temperature of 700° C. to 950° C. in air or in an atmosphere containing oxygen in a higher concentration than an atmospheric oxygen concentration.

In accordance with another aspect of the present invention, there is provided a nonaqueous secondary battery which comprises a positive electrode containing a positive electrode active material of $LiNiO_2$ prepared by the aforesaid process, a negative electrode and an ion conductor.

In accordance with still another aspect of the present invention, there is provided a process for preparing a positive electrode active material, which comprises mixing an organic acid with a mixture of nickel nitrate hexahydrate (a nickel compound) which has a melting point not higher than 300° C. and a lithium compound, preliminarily calcining the resulting mixture at a temperature lower than the following main calcination, and then calcining the resulting substance at 700~950° C. in air or in an atmosphere containing oxygen in a higher concentration than an atmospheric oxygen concentration. This process can inhibit the generation of nitrogen oxides and improve the uniformity of the mixture before the main calcination.

DESCRIPTION OF THE PREFERRED EMBODIMENTS

Figure 1:
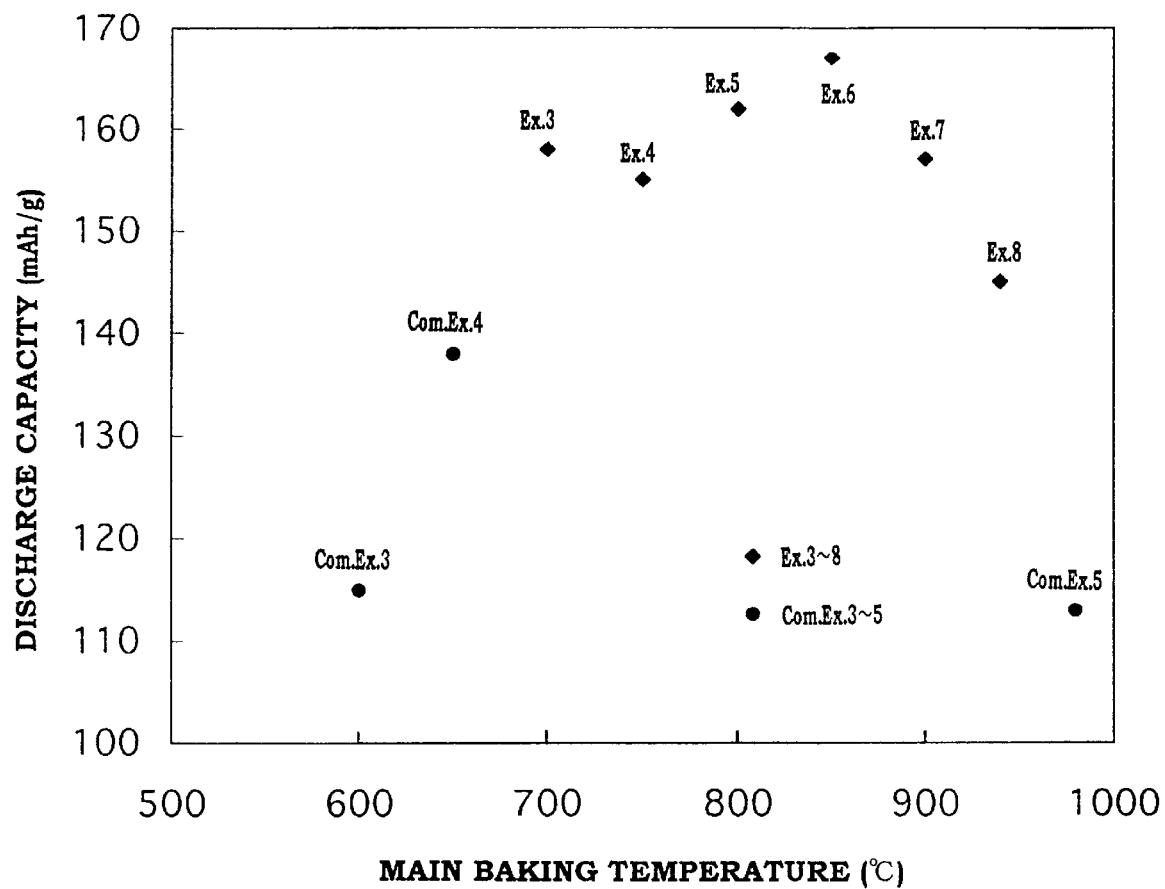
FIG. 1 is a graphical representation illustrating the relationship between a main calcining temperature and a discharge capacity in the first cycle in accordance with Examples 3 to 8 and Comparative Examples 3 to 5.

Specific examples of specific lithium compounds having a melting not higher than 300° C. include anhydrous lithium nitrate, lithium nitrate trihydrate, lithium acetate dihydrate, lithium iodide trihydrate, lithium hydrogensulfate and lithium hydrogenphosphate. Among those, anhydrous lithium nitrate, lithium nitrate trihydrate, lithium acetate dihydrate and lithium iodide trihydrate are preferred because impurities are less likely to remain in the resulting product after the calcination (main calcination).

Specific examples of nickel compounds having a melting point not higher than 300° C. include nickel nitrate hexahydrate and nickel perchlorate hexahydrate. Among those, nickel nitrate hexahydrate is preferred in terms of safety.

Specific examples of specific nickel compounds having a melting point higher than 300° C. include nickel oxide, nickel hydroxide, nickel oxyhydroxide, nickel carbonate, basic nickel carbonate monohydrate, nickel acetate tetrahydrate, nickel oxalate dihydrate, nickel formate dihydrate, anhydrous nickel chloride, nickel chloride hexahydrate, nickel bromide, nickel iodide, nickel sulfide and nickel sulfate. Among those, nickel oxide, nickel hydroxide, nickel oxyhydroxide, nickel carbonate, basic nickel carbonate monohydrate, nickel acetate tetrahydrate, nickel oxalate dihydrate, nickel formate dihydrate, anhydrous nickel chloride and nickel chloride hexahydrate are preferred because impurities are less likely to remain in the resulting product after the calcination (main calcination).

Specific examples of lithium compounds having a melting point higher than 300° C. include anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide, anhydrous lithium acetate, lithium sulfide, lithium sulfate and lithium nitride. Among those, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide and anhydrous lithium acetate are preferred because impurities are less likely to remain in the resulting product after the calcination (main calcination) and these compounds are highly safe.

A lithium compound having a melting point not higher than 300° C. and a nickel compound having a melting point higher than 300° C. may be used in combination. Alternatively, a nickel compound having a melting point not higher than 300° C. and a lithium compound having a melting point higher than 300° C. may be used in combination.

For the cost reduction and the simplification of a production apparatus, it is preferred that at least one of the nickel compound and the lithium compound to be used has a melting point not higher than 130° C.

In such a case, a nickel compound having a melting point not higher than 130° C. and a lithium compound having a melting point higher than 130° C. may be used in combination. An example of such a nickel compound is nickel nitrate hexahydrate. Examples of such a lithium compound include anhydrous lithium nitrate, lithium nitrate trihydrate, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide and anhydrous lithium acetate.

Alternatively, a nickel compound having a melting point not higher than 130° C. and a lithium compound having a melting point not higher than 130° C. may be used in combination. An example of such a nickel compound is nickel nitrate hexahydrate. Examples of such a lithium compound include lithium iodide trihydrate and lithium acetate dihydrate.

The lithium compound and the nickel compound are mixed in a molar ratio of Ni:Li=1:0.8 or greater (Li/Ni=0.8 or higher), preferably Ni:Li=1:0.8 to 1.3 (Li/Ni=0.8 to 1.3), more preferably Ni:Li=1:1.0 to 1.3 (Li/Ni=1.0 to 1.3). If the Li/Ni molar ratio is lower than 0.8, lithium nickelate crystals do not sufficiently grow during the calcination, so that the resulting active material exhibits a reduced discharge capacity. In consideration of the stability of the active material in air, the Li/Ni molar ratio is preferably not higher than 1.3. Further, in consideration of the stability in the discharge capacity of the active material, the Li/Ni molar ratio is preferably between 1.0 and 1.3.

Further, with the lithium compound and the nickel compound, a transition-metal compound or a compound containing an element of the 3B, 4B or 5B group may be mixed (hereinafter referred to as third component compound). The positive electrode active material containing the third component compound is represented by $LiNi_{1-x}M_xO_2$ wherein X is more than 0 and less then 0.5, and M is a transition metal or a 3B-, 4B- or 5B-group element.

The third component compound is preferably a compound of Ti, V, Cr, Mn, Fe, Co, Cu, Zn, Y, Zr, Nb, Mo, La, W, Al, In, Sn, Pb, Sb, or Bi in particular in terms of performance of the battery. Examples of such compounds include titanium chloride, titanium bromide, titanium iodide, titanium oxide, titanium oxychloride, titanium hydroxide, titanium nitrate, vanadium chloride, vanadium bromide, vanadium iodide, vanadium oxide, vanadium oxychloride, vanadium oxybromide, vanadium acetate, vanadyl oxalate, chromium chloride, chromium trioxide, chromium nitrate, chromium acetate, chromium oxalate, manganese chloride, manganese bromide, manganese iodide, manganese oxide, manganese hydroxide, manganese nitrate, manganese carbonate, manganese acetate, manganese oxalate, iron chloride, iron bromide, iron iodide, iron oxide, iron sulfate, iron nitrate, iron carbonate, iron acetate, iron oxalate, cobalt chloride, cobalt bromide, cobalt iodide, cobalt oxide, cobalt hydroxide, cobalt sulfate, cobalt nitrate, cobalt carbonate, cobalt acetate, cobalt oxalate, copper chloride, copper bromide, copper iodide, copper oxide, copper hydroxide, copper sulfate, copper nitrate, copper carbonate, copper acetate, copper oxalate, zinc chloride, zinc bromide, zinc iodide, zinc oxide, zinc hydroxide, zinc sulfate, zinc nitrate, zinc carbonate, zinc acetate, zinc oxyacetate, zinc oxalate, yttrium chloride, yttrium bromide, yttrium iodide, yttrium oxide, yttrium hydroxide, yttrium sulfate, yttrium nitrate, yttrium carbonate, yttrium acetate, yttrium oxalate, zirconium chloride, zirconium bromide, zirconium iodide, zirconium oxide, zirconium oxychloride, zirconium sulfate, zirconium nitrate, zirconium acetate, niobium chloride, niobium bromide, niobium oxychloride, niobium oxide, niobium hydrogenoxalate, molybdenum chloride, molybdenum bromide, molybdenum iodide, molybdenum oxychloride, molybdenum oxide, molybdenum oxyhydroxide, molybdenum acetate, lanthanum chloride, lanthanum bromide, lanthanum iodide, lanthanum oxide, lanthanum hydroxide, lanthanum sulfate, lanthanum nitrate, lanthanum carbonate, lanthanum acetate, lanthanum oxalate, tungsten chloride, tungsten bromide, tungsten iodide, tungsten oxychloride, tungsten oxybromide, tungsten oxide, aluminum chloride, aluminum bromide, aluminum iodide, aluminum oxide, aluminum hydroxide, aluminum nitrate, aluminum hydroacetate, aluminum oxalate, indium chloride, indium bromide, indium iodide, indium oxide, indium hydroxide, indium sulfate, indium nitrate, tin chloride, tin bromide, tin iodide, tin oxide, tin hydroxide, tin sulfate, tin acetate, tin oxalate, lead chloride, lead bromide, lead iodide, lead oxide, lead oxyhydroxide, lead nitrate, lead hydrocarbonate, lead carbonate, lead acetate, lead oxalate, antimony chloride, antimony bromide, antimony iodide, antimony oxide, antimony sulfate, bismuth chloride, bismuth bromide, bismuth iodide, bismuth oxide, bismuth sulfate, bismuth oxynitrate, bismuth carbonate, bismuth acetate and bismuth oxalate. These compounds may contain water of hydration.

Preferably, the third component compound has a melting point not higher than 300° C. where the lithium compound and the nickel compound have melting points not higher than 300° C.

Examples of third component compounds having melting points not higher than 300° C. include titanium chloride, titanium bromide, titanium iodide, titanium nitrate, vanadium chloride, chromium chloride hexahydrate, chromium trioxide, chromium nitrate enneahydrate, manganese chloride tetrahydrate, manganese nitrate hexahydrate, iron chloride hexahydrate, iron bromide hexahydrate, iron sulfate heptahydrate, iron nitrate hexahydrate, iron nitrate heptahydrate, cobalt chloride hexahydrate, cobalt bromide hexahydrate, cobalt sulfate heptahydrate, cobalt nitrate hexahydrate, copper sulfate, copper nitrate trihydrate, copper acetate monohydrate, zinc chloride, zinc sulfate heptahydrate, zinc nitrate hexahydrate, zinc acetate dihydrate, zinc oxyacetate, niobium chloride, niobium bromide, molybdenum chloride, molybdenum oxychloride, lanthanum nitrate hexahydrate, tungsten chloride, tungsten bromide, tungsten oxychloride, tungsten oxybromide, anhydrous aluminum bromide, aluminum bromide hexahydrate, anhydrous aluminum iodide, aluminum iodide hexahydrate, aluminum nitrate enneahydrate, indium chloride, indium bromide, indium iodide, tin chloride, tin bromide, tin iodide, tin acetate, lead acetate, antimony chloride, antimony bromide, antimony iodide, bismuth chloride and bismuth bromide.

The lithium compound (Li), the nickel compound (Ni) and the third component compound (M) are mixed in a molar ratio of Li:(Ni+M)=1:0.8 or greater (Li/(Ni+M)=0.8 or higher), preferably Li:(Ni+M)=1:0.8 to 1.3 (Li/(Ni+M)= 0.8 to 1.3), more preferably Li:(Ni+M)=1:1.0 to 1.3 (Li/(Ni+M)=1.0 to 1.3). If the Li/(Ni+M) molar ratio is lower than 0.8, lithium nickel oxide crystals do not grow during the calcination, so that the resulting active material exhibits a reduced discharge capacity. In consideration of the stability of the active material in air, the Li/(Ni+M) molar ratio is preferably not higher than 1.3. Further, in consideration of the stability in the discharge capacity of the active material, the Li/(Ni+M) molar ratio is preferably between 1.0 and 1.3.

Where either one of the lithium compound and the nickel compound has a melting point not higher than 300° C. and the other has a melting point higher than 300° C., the lithium compound and the nickel compound are preferably subjected to either of the following processes:

(1) Melting the one compound, mixing the other compound with the one compound thus melted; and (2) Mixing the one compound and the other compound, heating the mixture to melt the one compound at a temperature not higher than 300° C., and mixing the mixture.

Specifically, where lithium nitrate hexahydrate is employed as the nickel compound having a melting point not higher than 130° C. in combination with a lithium compound having a melting point higher than 130° C., the nickel compound and the lithium compound are subjected to either of the following processes:

(1') Melting nickel nitrate hexahydrate at a temperature not higher than 130° C., mixing the lithium compound with molten nickel nitrate hexahydrate; and (2') Mixing nickel nitrate hexahydrate and the lithium compound, heating the mixture to melt nickel nitrate hexahydrate at a temperature not higher than 130° C., and mixing the mixture.

Where the third component compound is added, the lithium compound, the nickel compound and the third component compound are preferably subjected to either of the following processes:

(3) Melting at a temperature not higher than 300° C. the lithium compound or the nickel compound having a melting point not higher than 300° C., mixing therewith the other compound having a melting point higher than 300° C. and the third component compound; and (4) Mixing the third component compound with the lithium compound and the nickel compound, melting the mixture at a temperature not higher than 300° C., and mixing the mixture.

Where the lithium compound and the nickel compound have melting points not higher than 300° C., the lithium compound and the nickel compound are subjected to either of the following processes:

(5) Separately melting the lithium compound and the nickel compound, mixing the molten lithium compound and the molten nickel compound; and (6) Mixing the lithium compound and the nickel compound, melting the mixture at a temperature not higher than 300° C., and mixing the melt mixture.

Specifically, where nickel nitrate hexahydrate is used as the nickel compound in combination with a lithium compound having a melting point not higher than 130° C., the nickel compound and the lithium compound are subjected to either of the following processes:

(5') Separately melting nickel nitrate hexahydrate and the lithium compound at a temperature not higher than 130° C., mixing molten nickel nitrate and the molten lithium compound; and (6') Mixing nickel nitrate hexahydrate and the lithium compound, melting the mixture at a temperature not higher than 130° C., and mixing the melt mixture.

Where the third component compound is added, the lithium compound, the nickel compound and the third component compound are preferably subjected to either of the following processes:

(7) Separately melting at a temperature not higher than 300° C. the lithium compound, the nickel compound and the third component compound all having melting points not higher than 300° C., and mixing the molten compounds; and (8) Mixing the third component compound having a melting point with the lithium compound and the nickel compound having melting points not higher than 300° C., melting the mixture at a temperature not higher than 300° C., and further mixing the melt mixture.

Where a compound likely to undergo a dehydration or a like reaction before the mixing of the compound is used, the processes (1), (1') and (3) in which the one compound is first melted and then mixed with the other compound and the mixture is mixed can eliminate the risk of bumping and ensure homogeneous mixing. The processes (2), (2') and (4) in which the compounds are first mixed and the mixture is heated to melt the one compound and then mixed can prevent segregation since the lithium compound and the nickel compound can be kept at the same temperature. Therefore, these simple processes facilitate the homogeneous mixing of the lithium compound and the nickel compound.

The processes (5) and (5') in which the compounds are first melted and then the molten compounds are mixed ensure sufficient melting of the respective compounds and sufficient mixing of the molten compounds. The processes (6) and (6') in which the compounds are first mixed in a solid phase and then melted can afford an eutectic mixture (depending on the compounds to be used), so that the mixing operation can be carried out at a lower temperature.

The melting step is preferably carried out at a temperature not higher than 300° C. A melting temperature higher than 300° C. is not preferred because it is difficult to perform the operation for homogeneous mixing. In the processes (1'), (2'), (5') and (6'), the operation can be carried out at a temperature not higher than 130° C. Therefore, the generation of nitrogen oxides during the calcination can be suppressed where nitrate compounds are used as the lithium compound and/or the nickel compound.

Where nickel nitrate hexahydrate is used as the nickel compound, and anhydrous lithium nitrate, lithium nitrate trihydrate, lithium hydrogensulfate, lithium hydrogenphosphate, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide, lithium iodide trihydrate, anhydrous lithium acetate, lithium acetate dihydrate, lithium sulfide, lithium sulfate or lithium nitride is used as the lithium compound, an organic acid is preferably added to the mixture of the nickel compound and the lithium compound before the mixture is calcined. If the organic acid is not added to the mixture, the nitrate compound decomposes to generate nitrogen oxides. The addition of the organic acid can suppress the generation of nitrogen oxides because the nitrate compound is converted to nitric acid.

Where nickel nitrate hexahydrate is used as the nickel compound, it is preferred to use anhydrous lithium nitrate, lithium nitrate trihydrate, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide, lithium iodide trihydrate, anhydrous lithium acetate or lithium acetate dihydrate as the lithium compound, because impurities are less likely to remain in the resulting product after the calcination (main calcination) and these compounds are highly safe.

Nickel nitrate hexahydrate and the lithium compound are mixed in a molar ratio of Ni:Li=1:0.8 or greater (Li/Ni=0.8 or higher), preferably Ni:Li=1:0.8 to 1.3 (Li/Ni=0.8 to 1.3), more preferably Ni:Li=1:1.0 to 1.3 (Li/Ni=1.0 to 1.3). If the Li/Ni molar ratio is lower than 0.8, lithium nickel oxide crystals do not sufficiently grow during the calcination, so that the resulting active material exhibits a reduced discharge capacity. In consideration of the stability of the resulting active material in air, the Li/Ni molar ratio is preferably not higher than 1.3. With an Li/Ni molar ratio of not higher than 1.3, the inclusion of impurities can be suppressed. Further, in consideration of the stability in the discharge capacity of the active material, the Li/Ni molar ratio is preferably between 1.0 and 1.3.

Examples of specific organic acids include acetic acid, oxalic acid, malonic acid, maleic acid, malic acid, propionic acid, succinic acid, citric acid, citramalic acid, tartaric acid, lactic acid, pyruvic acid and fumaric acid. Among those, acetic acid, oxalic acid, malonic acid, maleic acid are malic acid are preferred in terms of the cost, and oxalic acid is particularly preferred.

The organic acid is added to the mixture of the nickel compound and the lithium compound in a proportion of 0.9 mols to 3 mols relative to 1 mol of nickel nitrate. A proportion of less than 0.9 mols is not preferred because a great amount of nitrogen oxides are generated during the calcination (preliminary calcination and main calcination). If the proportion is greater than 3 mols, carbon remains in the mixture before the main calcination. Where a monovalent organic acid (e.g., acetic acid) is used, the proportion thereof is preferably 1.8 mols to 3 mols as the generation of nitrogen oxides and impurities can be effectively suppressed during the calcination (preliminary calcination and main calcination). Where a divalent organic acid (e.g., oxalic acid, malonic acid, maleic acid or malic acid) is used, the proportion thereof is preferably 0.9 mols to 1.5 mols for the aforesaid reasons.

The addition of the organic acid can be achieved by any of the following methods:

(a) Mixing the organic acid with nickel nitrate hexahydrate and the lithium compound;
(b) Mixing the organic acid with nickel nitrate hexahydrate and the lithium compound, heating the mixture to melt at least nickel nitrate hexahydrate, and mixing the resulting mixture;
(c) Mixing nickel nitrate hexahydrate with the lithium compound, heating the mixture to melt at least nickel nitrate hexahydrate, and adding the organic acid to the mixture with mixing; and
(d) Melting nickel nitrate hexahydrate, and adding thereto the lithium compound and the organic acid with mixing.

Where the third component compound is used, nickel nitrate hexahydrate, the lithium compound, the third component compound and the organic acid are preferably subjected one of the following processes:

(e) Mixing the organic acid with nickel nitrate hexahydrate, the lithium compound and the third component compound;
(f) Mixing the organic acid with nickel nitrate hexahydrate, the lithium compound and the third component compound, heating the mixture to melt at least nickel nitrate hexahydrate, and mixing the resulting mixture;
(g) Mixing the third component compound with nickel nitrate hexahydrate and the lithium compound, heating the mixture to melt at least nickel nitrate hexahydrate, adding the organic acid to the mixture with mixing; and
(h) Melting nickel nitrate hexahydrate, mixing thereto the lithium compound, the third component compound and the organic acid with mixing.

The melting operation is preferably carried out at a temperature of 60° C. to 130° C. If the melting operation is carried out at a temperature of lower than 60° C., it is difficult to homogeneously mix nickel nitrate hexahydrate and the lithium compound, because the mixture has a high viscosity even if nickel nitrate hexahydrate can be melted. If the melting operation is carried out at a temperature of higher than 130° C., nitrogen oxides may be generated which are derived from a nitrate compound nonreactive with the organic acid. The generation of nitrogen oxides in this step is not preferable in consideration of the overall production process.

A comparison of the aforesaid methods (a) to (h) is made as follows. The method (b) and (f) in which the starting materials are first mixed and then the mixture is subjected to the melting step and mixed can increase the homogeneity of the resulting mixture before the calcination (main calcination) in comparison with the method (a) and (e). The method (c) and (g) in which nickel nitrate hexahydrate and the lithium compound (and the third component compound) are first mixed and the mixture is subjected to the melting step and the organic acid is added to the mixture with mixing for denitration can further increase the homogeneity of the resulting mixture in comparison with the method (b) and (f). In addition, the formation of an eutectic mixture of nickel nitrate hexahydrate and the lithium compound can be expected. The method (d) and (h) in which nickel nitrate hexahydrate is first melted and then the lithium compound and the organic acid (and the third component compound) are added thereto with mixing for denitration can increase the homogeneity of the resulting mixture in comparison with the method (b) and (f).

After the mixing of the nickel compound and the lithium compound, the mixture is preferably subjected to preliminary calcination for dehydration and removal of nitrogen oxides (where a nitrate compound is used). Where the method (1), (1'), (3), (5), (5') or (7) is employed, the temperature for the preliminary calcination is typically within the range from the melting point of the lithium compound or the melting point of the nickel compound, whichever higher, to 700° C., preferably the melting point to 600° C., more preferably 300° C. to 600° C. If the preliminary calcining temperature is lower than the melting point, the dehydration and the removal of nitrogen oxides may be insufficient. If the preliminary calcining temperature is higher than 700° C., an active material obtained after the main calcination exhibits a reduced discharge capacity and unsatisfactory characteristics. In order to ensure sufficient dehydration and removal of nitrogen oxides, the preliminary calcining temperature is preferably not lower than 300° C. In order to afford an active material exhibiting superior characteristics, the preliminary calcining temperature is preferably not higher than 600° C. The above condition may also be employed where the third component compound is used.

Where the method (2), (2'), (4), (6), (6'), (8), or the method involving the addition of the organic acid is employed, the preliminary calcining temperature is typically 130° C. to 400° C., preferably 300° C. to 400° C. If the preliminary calcining temperature is lower than 130° C., the dehydration and the removal of nitrogen oxides may be insufficient. A preliminary calcining temperature of higher than 400° C. is not economical. In order to ensure sufficient dehydration and removal of nitrogen oxides, the preliminary calcining temperature is preferably not lower than 300° C. Thus, the control of the contents of water and nitrogen oxides can be facilitated in the subsequent steps.

The mixture subjected to the preliminary calcination is preferably cooled, or cooled and pulverized, and then the resulting powdery substance is preferably subjected to main calcination at a temperature of 700° C. to 950° C., more preferably 700° C. to 900° C., in air or in an oxygen atmosphere containing oxygen in a concentration higher than an atmospheric oxygen concentration for preparation of $LiNiO_2$. The oxygen concentration is preferably 50 vol % to 100 vol %.

The pulverization of the preliminarily calcined mixture after the cooling thereof increases the surface area of the mixture to be exposed to oxygen in the main calcining step, thereby promoting a reaction for synthesis of $LiNiO_2$.

If the mixture is calcined at a temperature of lower than 700° C. in the main calcining step, the growth of $LiNiO_2$ crystals is retarded. If the main calcining temperature is higher than 950° C., once created $LiNiO_2$ crystals are decomposed. Therefore, a main calcining temperature higher or lower than the aforesaid range is not preferable because the resulting active material exhibits a reduced discharge capacity. A main calcining temperature of not higher than 900° C. is more preferable to afford an active material exhibiting superior characteristics.

An atmosphere containing oxygen in a concentration lower than the atmospheric oxygen slows the reaction thereby to retard the growth of $LiNiO_2$ crystals, so that the resulting active material exhibits a reduced discharge capacity. Therefore, the mixture is preferably calcined in an atmosphere containing 50 vol % to 100 vol % of oxygen to afford an active material exhibiting superior characteristics.

For preparation of a positive electrode, a mixture containing the positive electrode active material $LiNiO_2$ prepared in the aforesaid manner, a conductive material, a binder and, as required, a solid electrolyte and the like is used.

Examples of specific conductive materials include carbon materials such as carbon black, acetylene black and Ketchen black, powdery graphite materials (e.g., natural graphite and synthetic graphite), powdery metals, and fibrous metals, but not limited thereto.

Examples of specific binders include fluoropolymers such as polytetrafluoroethylene and polyvinylidene fluoride, polyolefine polymers such as polyethylene, polypropylene and ethylene-propylene-diene terpolymer, and styrene-butadiene rubber, but not limited thereto.

The mixing ratio is preferably 1 part to 50 parts by weight of the conductive material and 1 part to 30 parts by weight of the binder with respect to 100 parts by weight of the positive electrode active material. If the proportion of the conductive material is less than 1 part by weight, the electrical resistance or polarization of the resulting electrode is increased to reduce the discharge capacity of the electrode, so that a practical secondary battery cannot be fabricated. If the proportion of the conductive material is greater than 50 parts by weight (which may vary depending on the kind of the conductive material to be blended), the absolute amount of the active material contained in the electrode is reduced, so that the discharge capacity of the resulting electrode is reduced. If the proportion of the binder is less than 1 part by weight, the binding ability is lost. If the proportion of the binder is greater than 30 parts by weight, the discharge capacity of the resulting electrode is reduced to an impractical level, because the absolute amount of the active material contained in the resulting electrode is reduced like the conductive material and the electrical resistance or polarization of the electrode is increased as described above.

For preparation of the positive electrode, the mixture containing the aforesaid positive electrode materials is compressed into a pellet form. Alternatively, an appropriate solvent is added to the mixture to afford a paste, which is applied on a collector, dried and compressed into a sheet form. The positive electrode preparation method is not limited to these methods.

A collector may be used for collecting electrons which are transferred from or to the positive electrode therethrough. The collector is formed of a metal, an alloy, a carbon material or the like. Examples of specific materials for the collector include titanium, aluminum and stainless steel, and copper materials, aluminum materials and stainless steel materials which are surface-treated with carbon, titanium or silver or subjected to surface oxidation. Usable as the collector are a foil, a film, a sheet, a mesh sheet and a punched sheet of any of these materials in a lath form, a porous form, a foamed form or a fibrous form. The thickness of the collector is not particularly limited, but is typically 1 $\mu$m to 1 mm.

Usable as the negative electrode are metal lithium, lithium alloys and lithium absorbable and desorbable substances. Examples of specific lithium alloys include a lithium aluminum alloy, a lithium tin alloy, a lithium lead alloy and a Wood's alloy. Examples of specific substances which can electrochemically be doped or dedoped with lithium ions include conductive polymers such as polyacetylene, polythiophene and polyparaphenylene, pyrolytic carbon materials, carbon materials pyrolyzed in a gas phase in the presence of a catalyst, carbon materials obtained by calcining pitch, coke, tar and the like, and carbon materials obtained by calcining polymers such as cellulose and a phenolic resin. Other exemplary negative electrode active materials include graphite materials (natural graphite, synthetic graphite, exfoliated graphite and the like) which can be intercalated and deintercalated with lithium ions, and inorganic compounds ($WO_2$, $MoO_2$ and the like) which can be doped and dedoped with lithium ions. These materials may be used either alone or as a composite thereof. Among those negative electrode active materials, pyrolytic carbon materials, carbon materials pyrolyzed in a gas phase in the presence of a catalyst, carbon materials obtained by calcining pitch, coke, tar and the like, carbon materials obtained by calcining polymers, and graphite materials (natural graphite, synthetic graphite, exfoliated graphite and the like) are preferable for fabrication of a highly safe secondary battery having superior battery characteristics.

Where the negative electrode is formed by employing any of the aforesaid conductive polymeric materials, carbon materials, graphite materials and inorganic compounds as the negative electrode active material, a conductive material and a binder may be blended therewith.

Examples of specific conductive materials include carbon materials such as carbon black, acetylene black and Ketchen black, powdery graphite materials (e.g., natural graphite and synthetic graphite), powdery metals and fibrous metals, but not limited thereto.

Examples of specific binders include fluoropolymers such as polytetrafluoroethylene and polyvinylidene fluoride, polyolefine polymers such as polyethylene, polypropylene and ethylene-propylene-diene terpolymer, and styrene-butadiene rubber, but not limited thereto.

Exemplary ion conductors to be used for the nonaqueous secondary battery include an organic electrolytic solution, a solid electrolyte (e.g., a polymeric solid electrolyte or an inorganic solid electrolyte) and a molten salt, among which the organic electrolytic solution is preferred.

The organic electrolytic solution contains an organic solvent and an electrolyte. Examples of specific organic solvents include aprotic organic solvents including esters such as propylene carbonate, ethylene carbonate, butylene carbonate, diethyl carbonate, dimethyl carbonate, ethylmethyl carbonate, $\gamma$-butyrolactone, methyl formate and methyl acetate, tetrahydrofuran, substituted tetrahydrofuran such as 2-methyltetrahydrofuran, ethers such as dioxolane, diethyl ether, dimethoxyethane, diethoxyethane and methoxyethoxyethane, dimethylsulfoxide, sulfolane, methylsulfolane and acetonitrile. These organic solvents may be used either alone or in combination.

Examples of specific electrolytes include lithium salts such as lithium perchlorate, lithium borofluoride, lithium phosphorus hexafluoride, lithium hexafluoroarsenate, lithium trifluoromethane sulfonate, lithium halides and lithium chloroaluminate. These electrolytes may be used either alone or in combination.

The electrolytic solution is prepared by dissolving the electrolyte in the organic solvent. The organic solvent and the electrolyte to be used for the preparation of the electrolytic solution are not limited to those described above.

Known as the inorganic solid electrolyte are a nitride, halides and oxoacid salts of lithium and phosphorus sulfide compounds. Examples thereof include $Li_3N$, $LiI$, $Li_3N$-$LiI$-$LiOH$, $LiSiO_4$, $LiSiO_4$-$LiI$-$LiOH$, $Li_3PO_4$-$Li_4SiO_4$ and $Li_2SiS_3$.

Usable as the organic solid electrolyte are a substance comprised of any of the aforesaid electrolytes and a polymer permitting the dissociation of the electrolyte, and a substance comprised of a polymer having an ionization group. Examples of the polymer permitting the dissociation of the electrolyte include polyethylene oxide derivatives, polymers containing polyethylene oxide derivatives, polypropylene oxide derivatives, polymers containing polypropylene oxide derivatives and phosphate polymers. A polymer matrix material containing any of the aforesaid aprotic polar solvents, a mixture of a polymer having an ionization group and the aprotic polar electrolytic solution, or polyacrylonitrile may be added to the electrolytic solution. The inorganic and organic solid electrolytes may be used in combination.

A separator is used to retain the electrolytic solution. Exemplary materials for the separators include nonwoven fabrics and woven fabrics of electrically insulative synthetic resin fibers, glass fibers and natural fibers, microporous materials and compacts of alumina power and the like. Among those, nonwoven fabrics of polyethylene, polypropylene and like synthetic resins and microporous materials are particularly preferred in terms of the quality stability. A separator made of a nonwoven fabric of any of such synthetic resin fibers or a microporous material may be adapted to isolate the positive electrode and the negative electrode from each other when the battery is abnormally heated to cause the separator to be fused. From the viewpoint of safety, the separator of this type is preferably used. The thickness of the separator is not particularly limited as long as the separator can retain a required amount of the electrolytic solution and prevent the short circuit between the positive electrode and the negative electrode, but may be typically about 0.01 mm to about 1 mm, preferably about 0.02 mm to about 0.05 mm.

The present invention can be applied to secondary batteries of coin type, button type, sheet type, cylinder type, square type and the like. A coin- or button-type battery is typically fabricated in the following manner. A positive electrode and a negative electrode each formed in a pellet form are put in a battery case, and a cover is press-fitted to the battery case with an insulation packing interposed therebetween.

A cylinder- or square-type battery is typically fabricated in the following manner. A positive electrode and a negative electrode each formed in a sheet form are put in a battery case. The electrodes are electrically connected to the case and to a sealing plate, respectively. Then, the electrolyte solution is poured in the case, and the case is sealed with the sealing plate with an insulative packing interposed therebetween or with the sealing plate insulated from the case by a hermetic sealing. A safety valve including a safety device may be used for the sealing plate. Exemplary safety devices include a fuse, a bimetal and a PTC device which function as an overcurrent preventive device. For prevention of an increase in the inner pressure of the battery case, the hermetic sealing (gasket), the sealing plate or the battery case may be formed with a slit. Further, an external circuit for preventing over-charge or over-discharge of the battery may be used.

The pellet or sheet electrodes are preferably dried and dehydrated in advance in a common manner. For example, hot air, vacuum, infrared radiation, far-infrared radiation, microwave and dry air may be used alone or in combination for the drying and dehydration of the electrodes. The temperature for the drying and dehydration is preferably within a range between 50° C. and 380° C.

EXAMPLES

The present invention will hereinafter be described in detail by way of examples thereof. In the following examples, the ratio of the starting materials is indicated by molar ratio, the ratio of the solvents by volume ratio, and the ratio among the active material, the conductive agent and the adhesive by part(s) by weight. For example, if $LiNiO_2$:acetylene black:polyvinylidene fluoride=100:10:10, 10 parts by weight of acetylene black and 10 parts by weight of polyvinylidene fluoride are added to 100 parts by weight of $LiNiO_2$.

Example 1

Synthesis of $LiNiO_2$

Anhydrous lithium nitrate and nickel hydroxide were weighed in a ratio of Li:Ni=1.1:1. Anhydrous lithium nitrate was melted at 270° C. Then, nickel hydroxide preheated at 270° C. was mixed with the melt at 270° C., and the mixture was kneaded. The mixture was once cooled, and the resulting solid substance was pulverized in a mortar. In turn, the resulting powdery substance was calcined at 700° C. in an oxygen atmosphere for 10 hours (main calcining step), and the resulting product was pulverized. Thus, a positive electrode active material $LiNiO_2$ was prepared.

Preparation of Electrode

The active material $LiNiO_2$ thus prepared, acetylene black and polytetrafluoroethylene were mixed in a ratio of 100:10:10 in a mortar, and the mixture was press-molded into a pellet having a diameter of 20 mm and a weight of 0.10 g. At this time, a titanium mesh for use as a collector was pressed along with the pellet. A titanium wire was spot-welded from the titanium mesh to the pellet to establish a current collection line. Thus, an electrode was prepared for evaluation thereof.

Evaluation of Electrode

The electrode was evaluated by a three electrode method in which lithium electrodes were used as a counter electrode and a reference electrode. Used as an electrolytic solution was a solution in which 1 mol/l lithium perchlorate ($LiClO_4$) was dissolved in a solvent mixture containing ethylene carbonate and ethylmethyl carbonate in a ratio of 1:1. In the first charge and discharge cycle, the electrode was charged at a current density of 27.4 mA/g up to 4.2V relative to the lithium reference electrode, and then discharged to 2.7 V at the same current density. The charge and discharge process was thereafter repeated within the same potential range and at the same current density. As a result, the discharge capacity in the first cycle was 158 mAh/g.

Comparative Example 1

Synthesis of $LiNiO_2$

Anhydrous lithium nitrate and nickel hydroxide were weighed in a ratio of Li:Ni=1.1:1. Anhydrous lithium nitrate was melted at 270° C., and nickel hydroxide preheated at 270° C. was mixed with the melt at 270° C. as in Example 1. However, the kneading operation was not carried out. The mixture was once cooled, and the resulting solid substance was pulverized in a mortar. In turn, the resulting powdery substance was calcined at 700° C. in an oxygen atmosphere for 10 hours (main calcining step), and the resulting product was pulverized. Thus, a positive electrode active material $LiNiO_2$ was prepared.

Preparation and Evaluation of Electrode

An electrode was prepared and evaluated in the same manner as in Example 1. As a result, the discharge capacity in the first cycle was 130 mAh/g.

A comparison between Example 1 and Comparative Example 1 indicates that the discharge capacity can be increased by the sufficient kneading of the melt mixture.

Example 2 and Comparative Example 2

Synthesis of $LiNiO_2$

Anhydrous lithium nitrate and nickel hydroxide were weighed in a ratio of Li:Ni=1.1:1. Anhydrous lithium nitrate was melted at 270° C. Then, nickel hydroxide preheated at 270° C. was mixed with the melt at 270° C., and the mixture was kneaded as in Example 1. In Example 2, the mixture was subjected to the cooling step, but not subjected to the pulverizing step. In Comparative Example 2, the mixture was subjected to neither the cooling step nor the pulverizing step. Thereafter, the resulting solid substances were calcined at 700° C. in an oxygen atmosphere for 10 hours (main calcining step). Then, the resulting products were pulverized. Thus, positive electrode active materials $LiNiO_2$ of Example 2 and Comparative Example 2 were prepared.

Preparation and Evaluation of Electrodes

Electrodes were prepared and evaluated in the same manner as in Example 1. As a result, the discharge capacities of the electrodes of Example 2 and Comparative Example 2 in the first cycle was 151 mAh/g and 120 mAh/g, respectively.

A comparison between Examples 1 and 2 and Comparative Example 2 indicates that the discharge capacity can be increased by the cooling and pulverization of the kneaded mixture.

Examples 3 to 8 and Comparative Examples 3 to 5

Synthesis of $LiNiO_2$

Anhydrous lithium nitrate and nickel hydroxide were weighed in a ratio of Li:Ni=1.1:1. Anhydrous lithium nitrate was melted at 270° C. Then, nickel hydroxide preheated at 270° C. was mixed with the melt at 270° C., and the mixture was kneaded. In turn, the mixture was once cooled, and the resulting solid substance was pulverized. Thereafter, the resulting powdery substance was calcined at 600° C., 650° C., 700° C., 750° C., 800° C., 850° C., 900° C., 940° C. and 980° C. in an oxygen atmosphere for 10 hours (main calcining step) in Comparative Examples 3 and 4, Example 3 to 8, and Comparative Example 5, respectively, and the resulting products were pulverized. Thus, positive electrode active materials $LiNiO_2$ of Examples 3 to 8 and Comparative Examples 3 to 5 were prepared.

Preparation and Evaluation of Electrodes

Electrodes were prepared and evaluated in the same manner as in Example 1. The relationship between the main calcining temperature and the discharge capacity in the first cycle is shown in FIG. 1. As can be seen from FIG. 1, the main calcining step is preferably carried out at a temperature of 700° C. to 950° C., more preferably 700° C. to 900° C.

Examples 9 to 14 and Comparative Example 6

Synthesis of $LiNiO_2$

Anhydrous lithium nitrate and nickel hydroxide were weighed in a ratio of Li:Ni=1.1:1. Anhydrous lithium nitrate was melted at 270° C. Then, nickel hydroxide preheated at 270° C. was mixed with the melt at 270° C., and the mixture was kneaded. In turn, the mixture was once cooled, and the resulting solid substance was pulverized in a mortar. Thereafter, the resulting powdery substance was calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 6 and Examples 9 to 14, respectively, and the resulting products were pulverized. Thus, positive electrode active materials $LiNiO_2$ of Comparative Example 6 and Examples 9 to 14 were prepared.

Preparation and Evaluation of Electrodes

Figure 2:
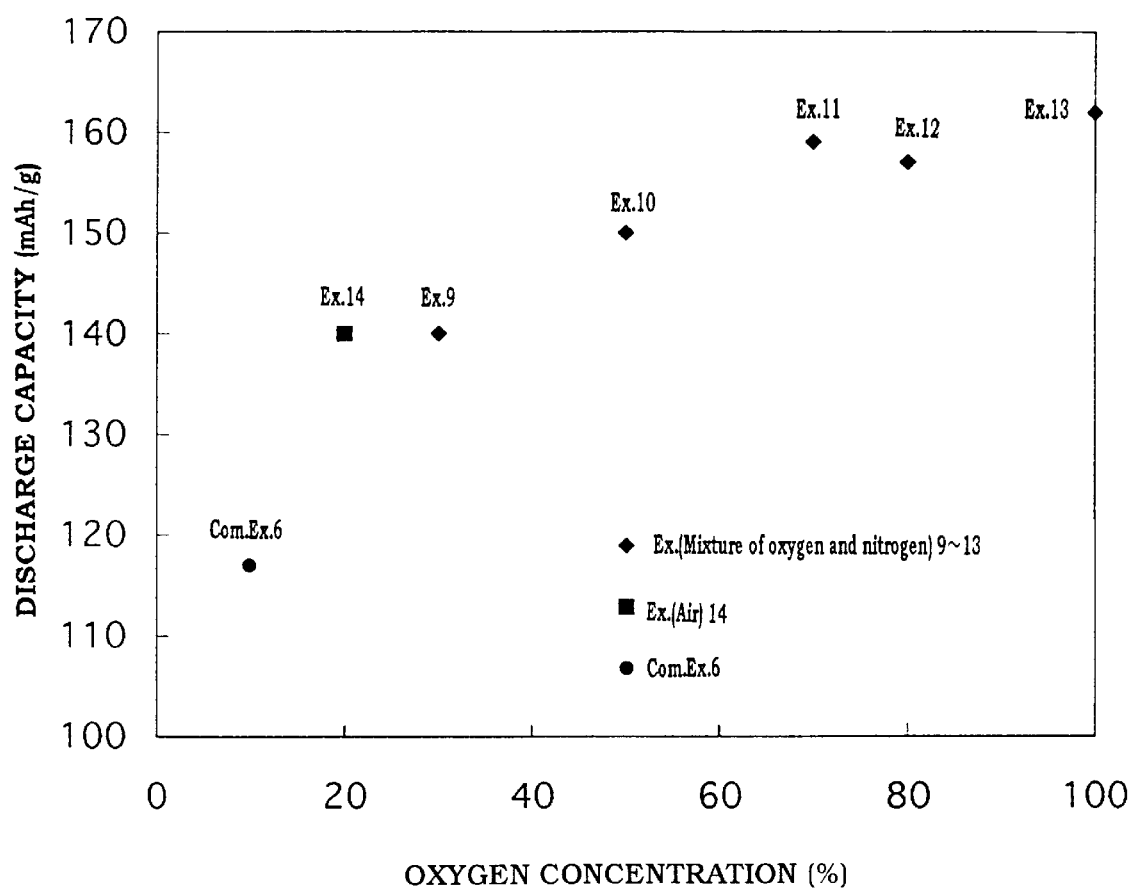
FIG. 2 is a graphical representation illustrating the relationship between an oxygen concentration in a main calcining atmosphere and a discharge capacity in the first cycle in accordance with Examples 9 to 14 and Comparative Example 6.

Electrodes were prepared and evaluated in the same manner as in Example 1. The relationship between the oxygen concentration in the main calcining atmosphere and the discharge capacity in the first cycle is shown in FIG. 2. As can be seen from FIG. 2, the oxygen concentration in the main calcining atmosphere is preferably 20 vol % to 100 vol %, more preferably 50 vol % to 100 vol %.

Comparative Example 7

Synthesis of $LiNiO_2$

Lithium hydroxide and nickel oxyhydroxide (NiOOH) were weighed in a ratio of Li:Ni=1.1:1, and mixed in a mortar. The mixture was press-molded into a pellet by applying thereto a pressure of 100 Kg/cm². The pellet was calcined at 800° C. for 2 hours in an oxygen atmosphere (main calcining step), and the resulting product was pulverized. Thus, a positive electrode active material $LiNiO_2$ was prepared.

Preparation and Evaluation of Electrode

An electrode was prepared and evaluated in the same manner as in Example 1. As a result, the discharge capacity in the first cycle was 124 mAh/g.

Comparative Example 8

Synthesis of $LiNiO_2$

Lithium hydroxide and nickel oxide (NiO) were weighed in a ratio of Li:Ni=1.1:1, and mixed in a mortar. The mixture was press-molded into a pellet by applying thereto a pressure of 100 Kg/cm². The pellet was calcined at 600° C. for 24 hours in air (preliminary calcining step), and then at 800° C. for 2 hours in an oxygen atmosphere (main calcining step), and the resulting product was pulverized. Thus, a positive electrode active material $LiNiO_2$ was prepared.

Preparation and Evaluation of Electrode

An electrode was prepared and evaluated in the same manner as in Example 1. As a result, the discharge capacity in the first cycle was 114 mAh/g.

Comparative Example 9

Synthesis of $LiNiO_2$

Lithium hydroxide and nickel chloride were weighed in a ratio of Li:Ni=1:1, and respectively dissolved in water. The aqueous solution of lithium hydroxide was added to the aqueous solution of nickel chloride little by little with stirring. The solution mixture was continuously stirred at 30° C. for 5 hours, and then dried at 90° C. to 100° C. The resulting solid substance was pulverized, and then press-molded into a pellet by applying thereto a pressure of 100 Kg/cm². The pellet was calcined at 800° C. for 2 hours in an oxygen atmosphere (main calcining step), and the resulting product was pulverized. Thus, a positive electrode active material $LiNiO_2$ was prepared.

Preparation and Evaluation of Electrode

An electrode was prepared and evaluated in the same manner as in Example 1. As a result, the discharge capacity in the first cycle was 120 mAh/g.

Comparative Example 10

Synthesis of $LiNiO_2$

Lithium hydroxide and nickel hydroxide were weighed in a ratio of Li:Ni=1:1, and mixed with a small amount of water (dispersant) in a mortar. The mixture was dried at 900° C. to 100° C. Then, the resulting solid substance was pulverized, and then press-molded into a pellet by applying a pressure of 100 Kg/cm$^2$. The pellet was calcined at 800° C. for 2 hours in an oxygen atmosphere (main calcining step), and the resulting product was pulverized. Thus, a positive electrode active material LiNiO$_2$ was prepared.

Preparation and Evaluation of Electrode

An electrode was prepared and evaluated in the same manner as in Example 1. As a result, the discharge capacity in the first cycle was 110 mAh/g.

Comparative Example 11

Synthesis of LiNiO$_2$

Lithium chloride and nickel oxide (NiO) were weighed in a ratio of Li:Ni=1:1. Lithium chloride was dissolved in water, and the aqueous solution of lithium chloride was added to nickel oxide little by little with kneading. The mixture was continuously kneaded at 30° C. for 5 hours, and then dried at 90° C. to 100° C. The resulting solid substance was pulverized, and then press-molded into a pellet by applying thereto a pressure of 100 Kg/cm$^2$. The pellet was calcined at 800° C. for 2 hours in an oxygen atmosphere (main calcining step), and the resulting product was pulverized. Thus, a positive electrode active material LiNiO$_2$ was prepared.

Preparation and Evaluation of Electrode

An electrode was prepared and evaluated in the same manner as in Example 1. As a result, the discharge capacity in the first cycle was 127 mAh/g.

A comparison between Examples 1 to 19 and Comparative Examples 7 to 11 indicates that the positive electrode active materials prepared by using a lithium material and a nickel material each having a melting point within a specific range in accordance with the present invention afford positive electrodes exhibiting superior characteristics.

Examples 15 to 23 and Comparative Examples 12 and 13

Synthesis of LiNiO$_2$

Lithium acetate dihydrate and nickel oxide (NiO) were weighed in a ratio of Li:Ni=1.1:1 and mixed. The mixture was heated up to 80° C. for melting lithium acetate dihydrate, and kneaded. In turn, the melt mixture was calcined in air for 24 hours at 150° C., 250° C., 300° C., 400° C., 500° C., 600° C., 650° C., 700° C., 750° C. and 800° C. (preliminary calcining step) in Examples 16 to 23 and Comparative Examples 12 and 13, respectively. In Example 15, the preliminary calcining step was not carried out. The resulting substances were cooled, and then pulverized in mortars. In turn, the resulting powdery substances were calcined at 800° C. in an oxygen atmosphere for 2 hours (main calcining step), and the resulting products were pulverized. Thus, positive electrode active materials LiNiO$_2$ of Examples 15 to 23 and Comparative Examples 12 and 13 were prepared. Where the preliminary calcining step was carried out at 150° C. and 250° C. (Examples 16 and 17) and where the preliminary calcining step was not carried out (Example 15), bumping occurred because of insufficient dehydration. However, the bumping did not cause any trouble in the production process.

Preparation and Evaluation of Electrodes

Electrodes were prepared in substantially the same manner as in Example 1, except that the active materials thus prepared were each mixed with acetylene black and polytetrafluoroethylene in a ratio of 100:4:3.

The electrodes thus prepared were each evaluated in substantially the same manner as in Example 1, except that the electrolytic solution was prepared by dissolving 1 mol/l lithium phosphorus hexafluoride (LiPF$_6$) in a solvent mixture containing propylene carbonate and diethyl carbonate in a ratio of 1:1.

The electrode of Example 15 (which employed the positive electrode active material prepared without carrying out the preliminary calcining step) exhibited a discharge capacity of 159 mAh/g in the first cycle.

Figure 3:
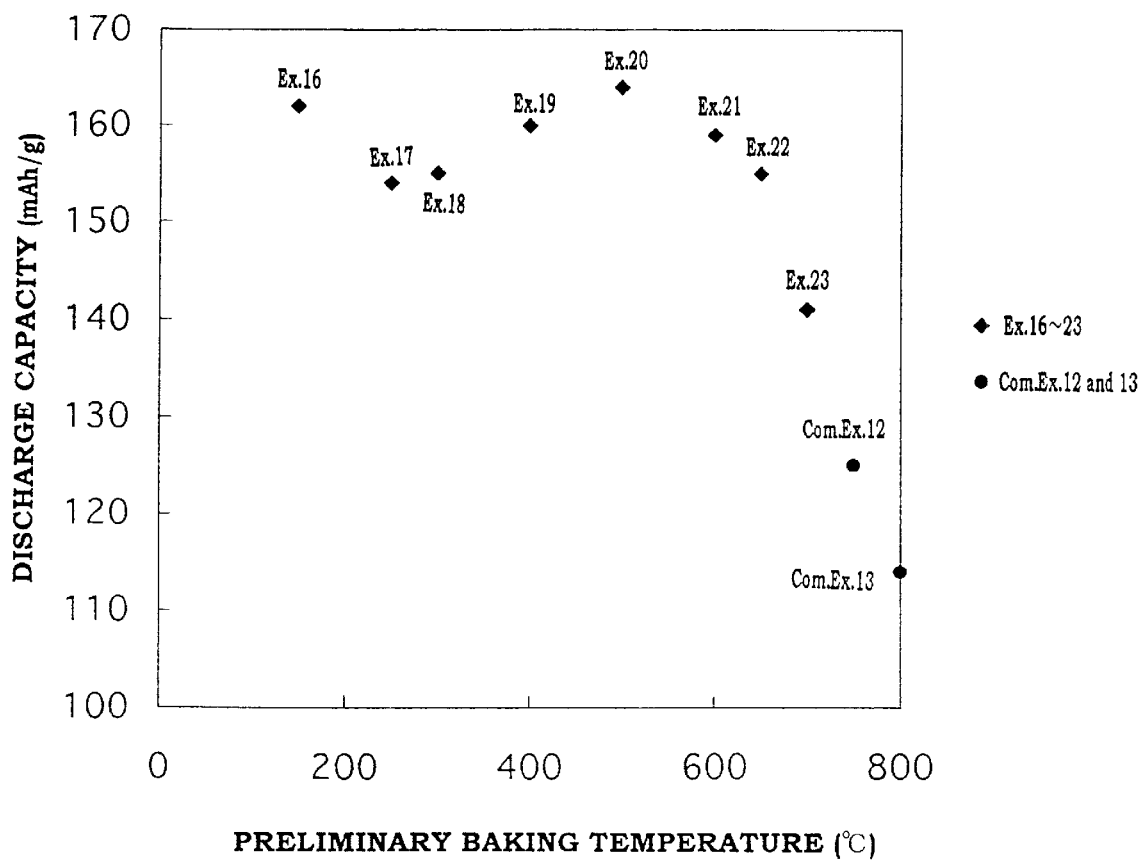
FIG. 3 is a graphical representation illustrating the relationship between a preliminary calcining temperature and a discharge capacity in the first cycle in accordance with Examples 16 to 23 and Comparative Examples 12 and 13.

The relationship between the preliminary calcining temperature and the discharge capacity in the first cycle is shown in FIG. 3. As can be seen from FIG. 3, the preliminary calcining step is preferably carried out at a temperature of not higher than 700° C., more preferably not higher than 600° C., further more preferably 300° C. to 600° C.

Examples 24 to 29 and Comparative Examples 14 to 16

Synthesis of LiNiO$_2$

Lithium acetate dihydrate and nickel oxide (NiO) were weighed in a ratio of Li:Ni=1.1:1 and mixed. The melt mixture was heated up to 80° C. for melting lithium acetate dihydrate, and kneaded. In turn, the mixture was calcined at 400° C. in air for 24 hours (preliminary calcining step). The resulting substance was cooled and pulverized in a mortar. Thereafter, the resulting powdery substance was calcined in an oxygen atmosphere for 2 hours at 600° C., 650° C., 700° C., 750° C., 800° C., 850° C., 900° C., 940° C. and 980° C. (main calcining step) in Comparative Examples 14 and 15, Examples 24 to 29 and Comparative Example 16, respectively, and the resulting products were pulverized. Thus, positive electrode active materials LiNiO$_2$ of Examples 24 to 29 and Comparative Examples 14 to 16 were prepared.

Preparation and Evaluation of Electrodes

Figure 4:
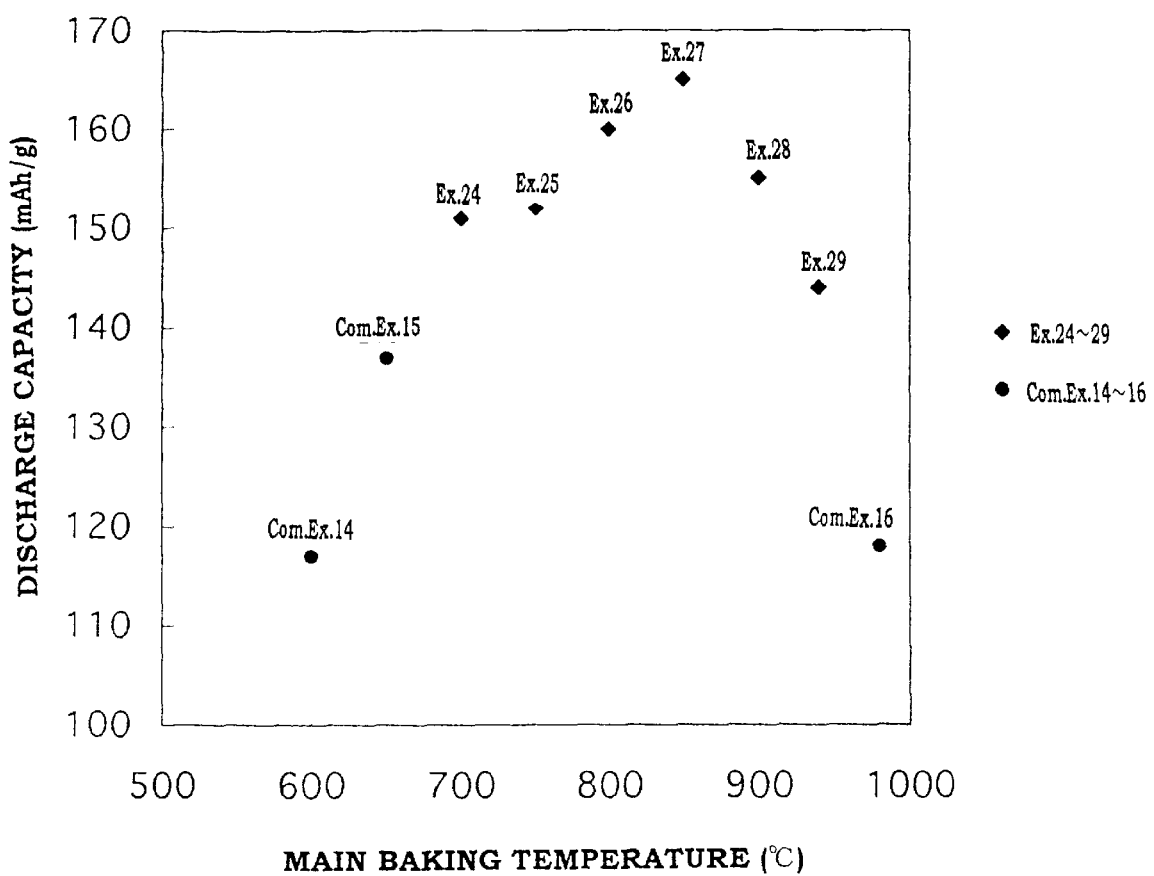
FIG. 4 is a graphical representation illustrating the relationship between a main calcining temperature and a discharge capacity in the first cycle in accordance with Examples 24 to 29 and Comparative Examples 14 to 16.

Electrodes were prepared and evaluated in the same manner as in Example 15. The relationship between the main calcining temperature and the discharge capacity in the first cycle is shown in FIG. 4. As can be seen from FIG. 4, the main calcining step is preferably carried out at a temperature of 700° C. to 950° C., more preferably 700° C. to 900° C.

Examples 30 to 35 and Comparative Example 17

Synthesis of LiNiO$_2$

Lithium acetate dihydrate and nickel oxide (NiO) were weighed in a ratio of Li:Ni=1.1:1 and mixed. The mixture was heated up to 80° C. for melting lithium acetate dihydrate, and kneaded. In turn, the mixture was calcined at 400° C. in air for 24 hours (preliminary calcining step). The resulting substance was cooled and pulverized in a mortar. Thereafter, the resulting powdery substance was calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 17 and Examples 30 to 35, respectively, and the resulting products were pulverized. Thus, positive electrode active materials LiNiO$_2$ of Comparative Example 17 and Examples 30 to 35 were prepared.

Preparation and Evaluation of Electrodes

Figure 5:
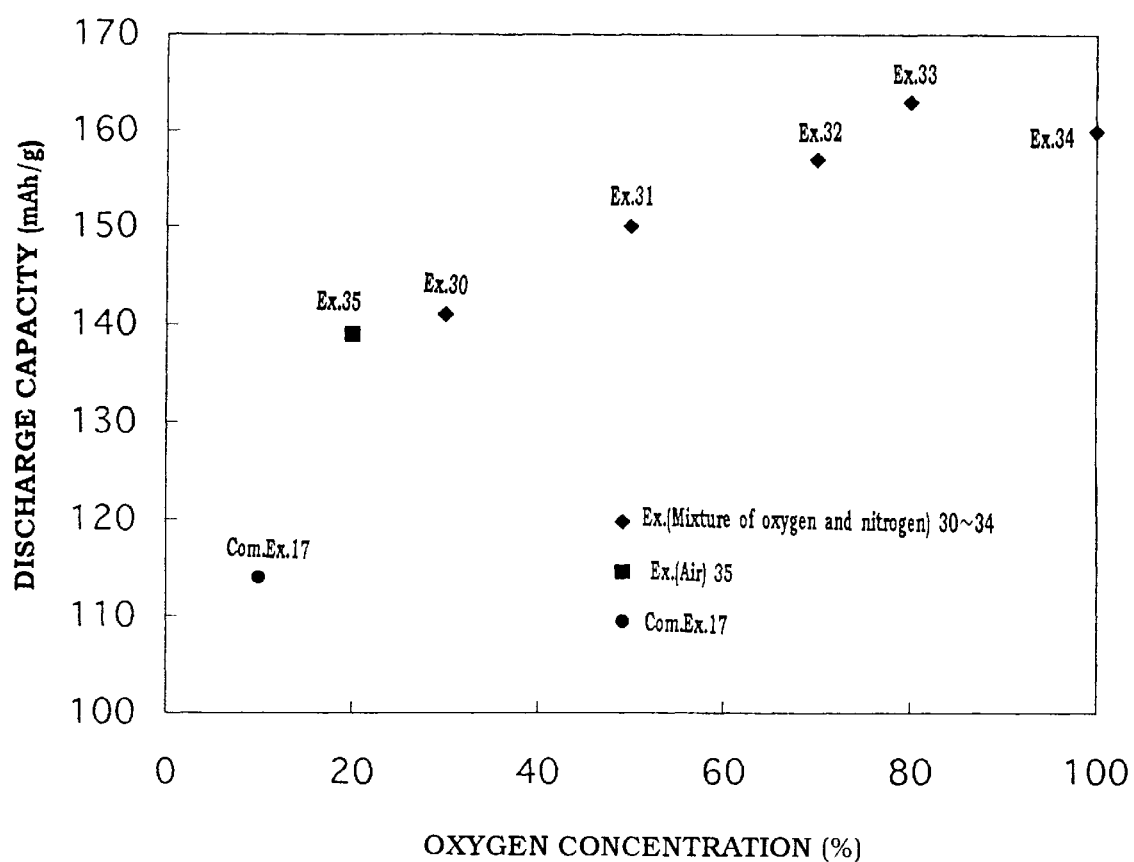
FIG. 5 is a graphical representation illustrating the relationship between an oxygen concentration in a main calcining atmosphere and a discharge capacity in the first cycle in accordance with Examples 30 to 35 and Comparative Example 17.

Electrodes were prepared and evaluated in the same manner as in Example 15. The relationship between the oxygen concentration in the main calcining atmosphere and the discharge capacity in the first cycle is shown in FIG. 5. As can be seen from FIG. 5, the oxygen concentration in the main calcining atmosphere is preferably 20 vol % to 100 vol %, more preferably 50 vol % to 100 vol %.

Examples 36 to 44 and Comparative Examples 18 to 21

Synthesis of LiNiO$_2$

Lithium hydroxide and nickel nitrate hexahydrate were weighed in a ratio of Li:Ni=1.2:1 and mixed. The mixture was heated up to 80° C. for melting nickel nitrate hexahydrate, and kneaded. In turn, the mixture was calcined in air for 24 hours at 100° C., 120° C., 130° C., 150° C., 200° C., 250° C., 300° C., 320° C., 350° C., 380° C., 400° C., 450° C. and 500° C. (preliminary calcining step) in Comparative Examples 18 and 19, Examples 36 to 44 and Comparative Examples 20 and 21, respectively, and the resulting substances were cooled and pulverized in mortars. Thereafter, the resulting powdery substances were calcined at 800° C. for 2 hours in an oxygen atmosphere (main calcining step), and the resulting products were pulverized. Thus, positive electrode active materials $LiNiO_2$ of Examples 36 to 44 and Comparative Examples 18 to 21 were prepared. Where the preliminary calcining step was carried out at 100° C. and 120° C. (Comparative Examples 18 and 19), bumping occurred in the main calcining step because of insufficient dehydration, causing a trouble in the production process. Where the preliminary calcining step was carried out at 130° C. to 200° C. (Examples 36 to 38), dehydration was insufficient, but no trouble arose in the production process.

Preparation and Evaluation of Electrodes

Electrodes were prepared in substantially the same manner as in Example 1, except that the positive electrode active materials were each mixed with acetylene black and polytetrafluoroethylene in a ratio of 100:5:5.

The electrodes thus prepared were each evaluated in substantially the same manner as in Example 1, except that the electrolytic solution was prepared by dissolving 1 mol/l lithium phosphorus hexafluoride ($LiPF_6$) in a solvent mixture containing propylene carbonate and diethyl carbonate in a ratio of 1:1.

Figure 6:
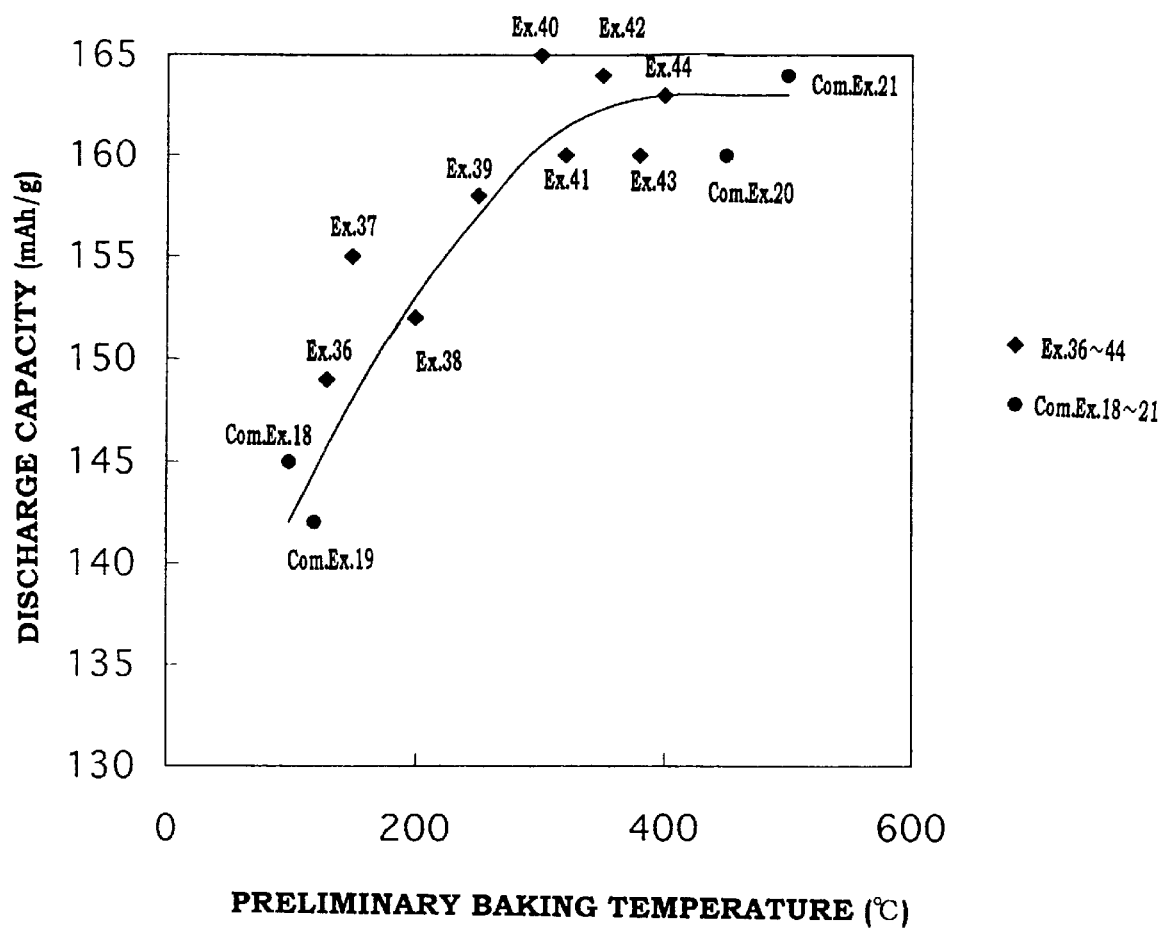
FIG. 6 is a graphical representation illustrating the relationship between a preliminary calcining temperature and a discharge capacity in the first cycle in accordance with Examples 36 to 44 and Comparative Examples 18 and 21.

The relationship between the preliminary calcining temperature and the discharge capacity in the first cycle is shown in FIG. 6.

If the preliminary calcining temperature is lower than 130° C., a problem associated with the production process arises (i.e., the bumping occurs in the main calcining step due to insufficient dehydration). Even if the calcining temperature is higher than 400° C., electrical characteristics cannot be improved (i.e., the discharge capacity does not increase) as can be seen from FIG. 6 and, therefore, the effect of the preliminary calcining is substantially the same. Therefore, the preliminary calcining step is preferably carried out at a temperature of 130° C. to 400° C., more preferably 300° C. to 400° C.

Examples 45 to 50 and Comparative Examples 22 to 24

Synthesis of $LiNiO_2$

Lithium hydroxide and nickel nitrate hexahydrate were weighed in a ratio of Li:Ni=1.2:1 and mixed. The mixture was heated up to 80° C. for melting nickel nitrate hexahydrate, and kneaded. In turn, the melt mixture was calcined at 380° C. in air for 24 hours (preliminary calcining step). Thereafter, the resulting substance was calcined in an oxygen atmosphere for 2 hours at 600° C., 650° C., 700° C., 750° C., 800° C., 850° C., 900° C., 940° C. and 800° C. (main calcining step) in Comparative Examples 22 and 23, Examples 45 to 50 and Comparative Example 24, respectively, and the resulting products were pulverized. Thus, positive electrode active materials $LiNiO_2$ of Examples 45 to 50 and Comparative Examples 22 to 24 were prepared.

Preparation and Evaluation of Electrodes

Figure 7:
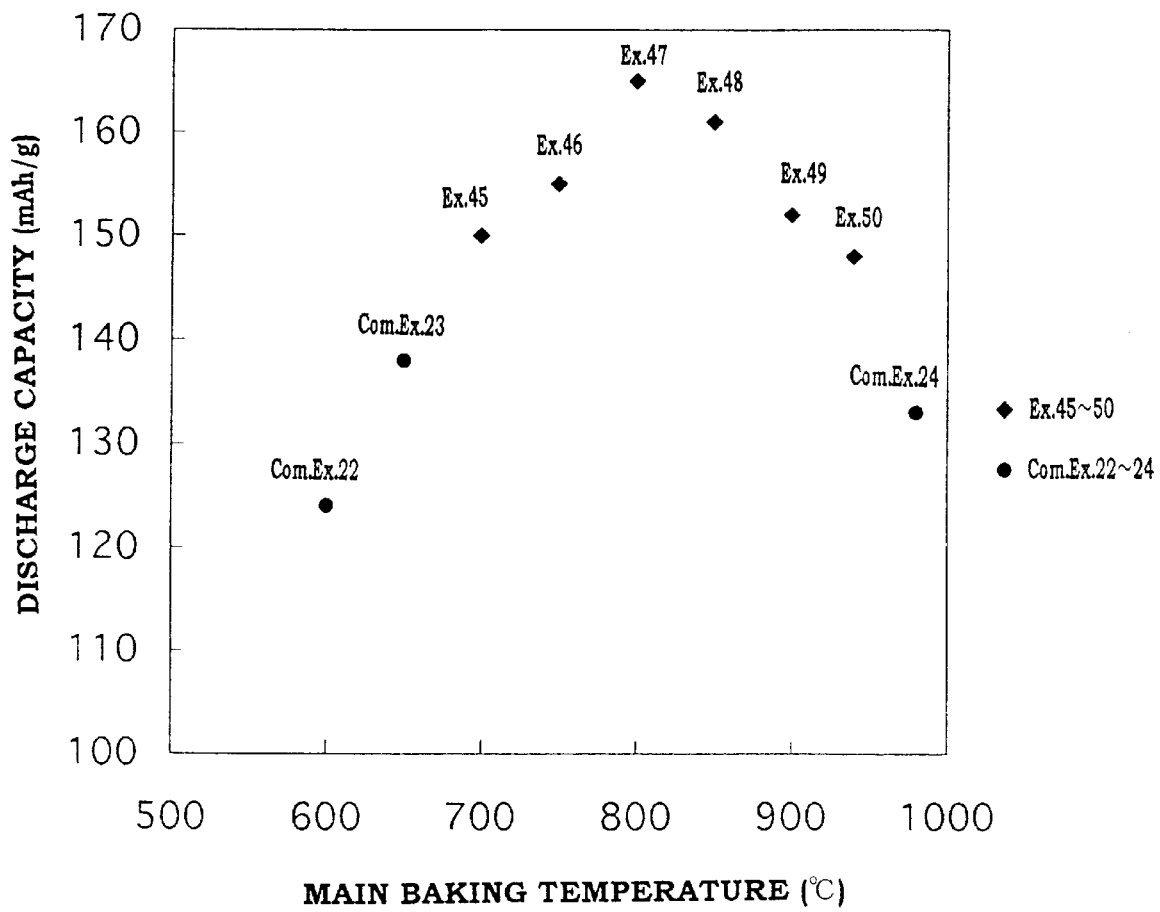
FIG. 7 is a graphical representation illustrating the relationship between a main calcining temperature and a discharge capacity in the first cycle in accordance with Examples 45 to 50 and Comparative Examples 22 to 24.

Electrodes were prepared and evaluated in the same manner as in Example 36. The relationship between the main calcining temperature and the discharge capacity in the first cycle is shown in FIG. 7. As can be seen from FIG. 7, the main calcining step is preferably carried out at a temperature of 700° C. to 950° C., more preferably 700° C. to 900° C.

Examples 51 to 56 and Comparative Example 25

Synthesis of $LiNiO_2$

Lithium hydroxide and nickel nitrate hexahydrate were weighed in a ratio of Li:Ni=1.2:1 and mixed. The mixture was heated up to 80° C. for melting nickel nitrate hexahydrate, and kneaded. In turn, the melt mixture was calcined at 380° C. in air for 24 hours (preliminary calcining step). The resulting substance was cooled and pulverized in a mortar. Thereafter, the resulting powdery substance was calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 25 and Examples 51 to 56, respectively, and the resulting products were pulverized. Thus, positive electrode active materials $LiNiO_2$ of Comparative Example 25 and Examples 51 to 56 were prepared.

Preparation and Evaluation of Electrodes

Figure 8:
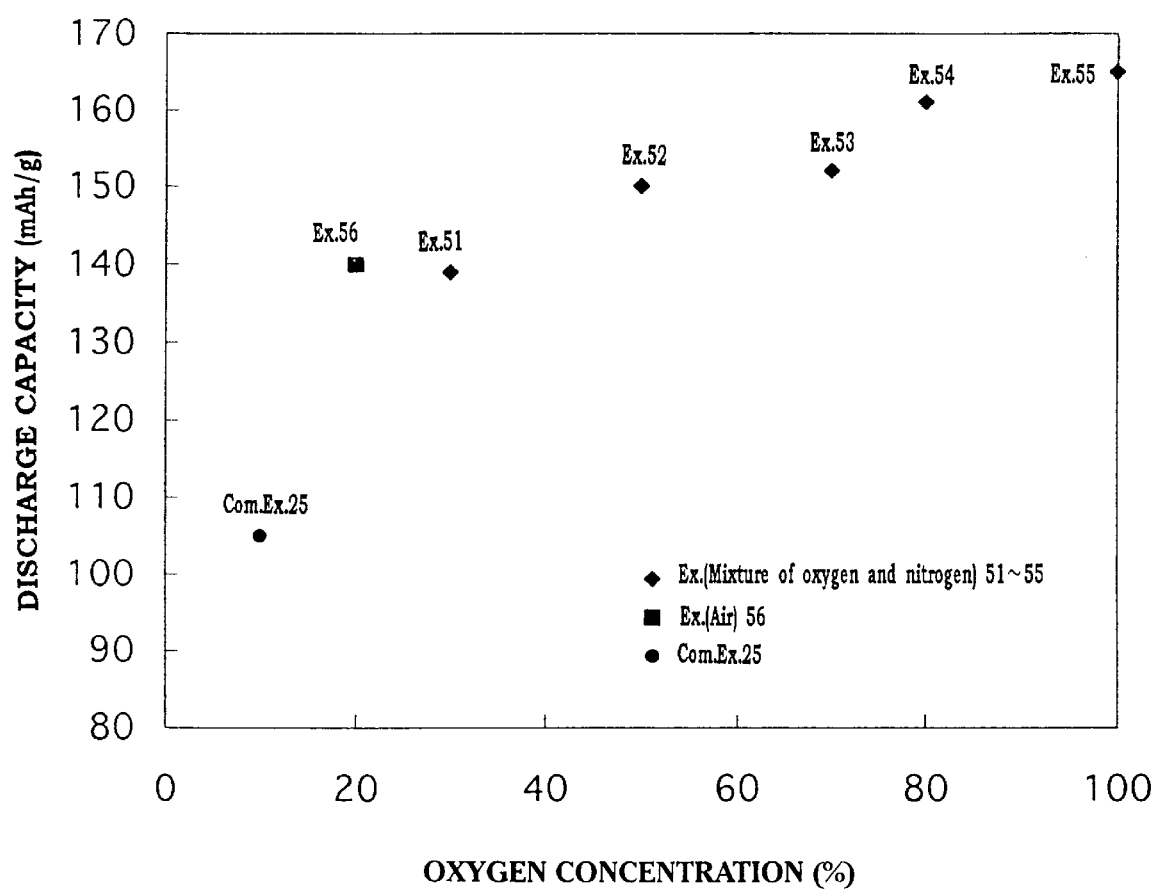
FIG. 8 is a graphical representation illustrating the relationship between an oxygen concentration in a main calcining atmosphere and a discharge capacity in the first cycle in accordance with Examples 51 to 56 and Comparative Example 25.

Electrodes were prepared and evaluated in the same manner as in Example 36. The relationship between the oxygen concentration in the main calcining atmosphere and the discharge capacity in the first cycle is shown in FIG. 8. As can be seen from FIG. 8, the oxygen concentration in the main calcining atmosphere is preferably 20 vol % to 100 vol %, more preferably 50 vol % to 100 vol %.

Example 57

Synthesis of $LiNiO_2$

Lithium carbonate and nickel nitrate hexahydrate were weighed in a ratio of Li:Ni=1.3:1 and mixed. The mixture was heated up to 80° C. for melting nickel nitrate hexahydrate, and kneaded. In turn, the melt mixture was calcined at 400° C. in air for 24 hours (preliminary calcining step), and the resulting substance was cooled and pulverized in a mortar. Thereafter, the resulting powdery substance was calcined at 700° C. in an oxygen atmosphere for 5 hours (main calcining step), and the resulting product was pulverized. Thus, a positive electrode active material $LiNiO_2$ was prepared.

Preparation and Evaluation of Electrode

An electrode was prepared in substantially the same manner as in Example 1, except that the positive electrode active material, acetylene black and polytetrafluoroethylene were mixed in a ratio of 100:30:25.

The electrode thus prepared was evaluated in substantially the same manner as in Example 1, except that the electrolytic solution was prepared by dissolving 1 mol/l lithium phosphorus hexafluoride ($LiPF_6$) in a solvent mixture containing propylene carbonate and dimethyl carbonate in a ratio of 1:1. As a result, the discharge capacity in the first cycle was 166 mAh/g.

Examples 58 to 63 and Comparative Examples 26 to 28

Synthesis of $LiNiO_2$

Anhydrous lithium nitrate and nickel nitrate hexahydrate were weighed in a ratio of Li:Ni=1.1:1. Anhydrous lithium nitrate melted at 270° C. and nickel nitrate hexahydrate melted at 120° C. were mixed at 270° C. by stirring with a stirring rod. In turn, the melt mixture was calcined in air for 24 hours at 200° C., 250° C., 300° C., 400° C., 500° C., 600° C., 650° C., 700° C. and 750° C. (preliminary calcining step) in Comparative Examples 26 and 27, Examples 58 to 63 and Comparative Example 28, respectively. The resulting substances were once cooled, and then calcined at 800° C. for 2 hours in an oxygen atmosphere (main calcining step), and the resulting products were pulverized. Thus, positive electrode active materials $LiNiO_2$ of Examples 58 to 63 and Comparative Examples 26 to 28 were prepared. Where the preliminary calcining step was carried out at 200° C. and 250° C. (Comparative Examples 26 and 27), bumping occurred in the main calcining step because of insufficient dehydration, causing a small trouble in the production process.

Preparation of Electrodes

The active materials $LiNiO_2$ thus prepared were each mixed with acetylene black and polytetrafluoro-ethylene in a ratio of 100:10:10 in a mortar, and the mixture was press-molded into a pellet having a diameter of 20 mm and a weight of 0.10 g. At this time, a titanium mesh for use as a collector was pressed along with the pellet. A titanium wire was spot-welded from the titanium mesh to the pellet to establish a current collection line. Thus, electrodes were prepared for evaluation thereof.

Evaluation of Electrodes

The electrodes were each evaluated by a three electrode method in which lithium electrodes were used as a counter electrode and a reference electrode. Used as an electrolytic solution was a solution in which 1 mol/l lithium perchlorate ($LiClO_4$) was dissolved in a solvent mixture containing ethylene carbonate and ethylmethyl carbonate in a ratio of 1:1. In the first charge and discharge cycle, the electrode was charged at a current density of 27.4 mA/g up to 4.2V relative to the lithium reference electrode, and then discharged to 2.7 V at the same current density. The charge and discharge process was thereafter repeated within the same potential range and at the same current density.

Figure 9:
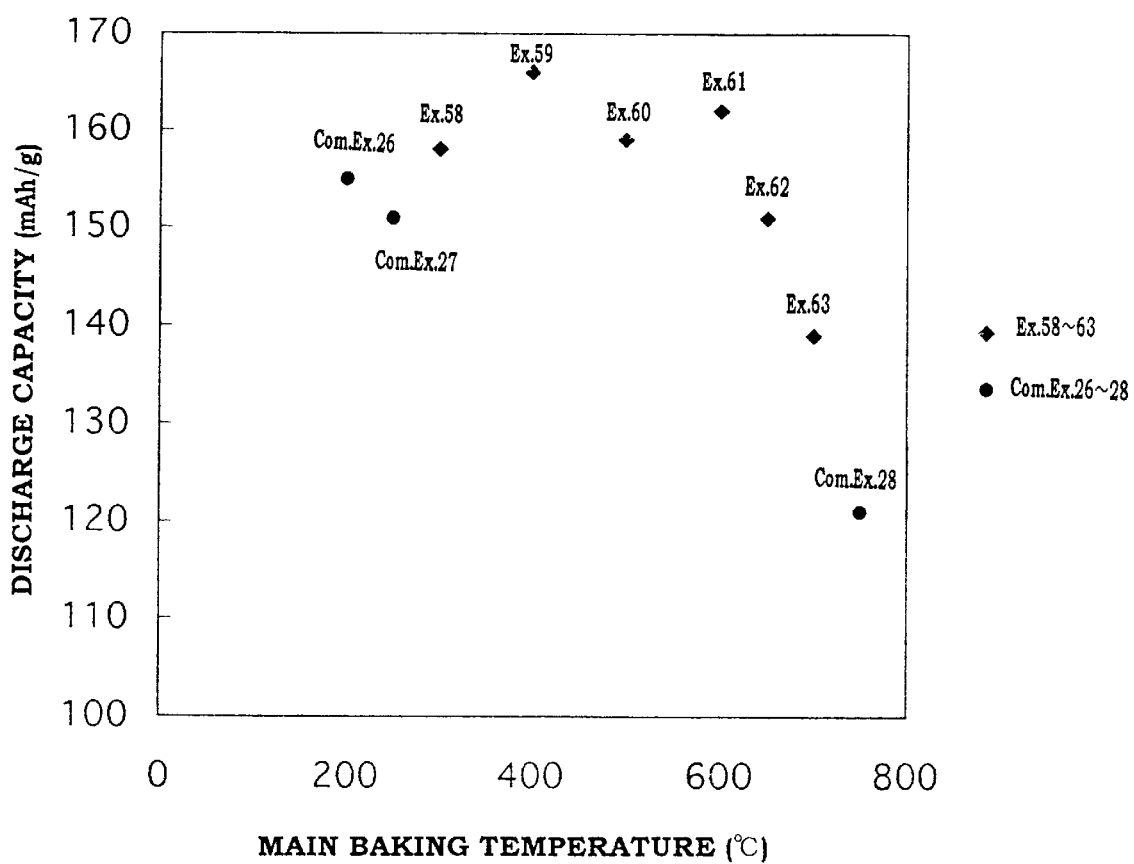
FIG. 9 is a graphical representation illustrating the relationship between a preliminary calcining temperature and a discharge capacity in the first cycle in accordance with Examples 58 to 63 and Comparative Examples 26 to 28.

The relationship between the preliminary calcining temperature and the discharge capacity in the first cycle is shown in FIG. 9.

If the preliminary calcining temperature is lower than 300° C., a problem associated with the production process arises (i.e., the bumping occurs in the main calcining step due to insufficient dehydration). Even if the preliminary calcining temperature is higher than 700° C., electrical characteristics cannot be improved (i.e., the discharge capacity does not increase) as can be seen from FIG. 9. Therefore, the preliminary calcining step is preferably carried out at a temperature of higher than the melting point and not higher than 700° C., more preferably not higher than 600° C., further more preferably 300° C. to 600° C.

Comparative Example 29

Synthesis of $LiNiO_2$

Anhydrous lithium nitrate and nickel nitrate hexahydrate were weighed in a ratio of Li:Ni=1.1:1. Anhydrous lithium nitrate melted at 270° C. and nickel nitrate hexahydrate melted at 120° C. were mixed at 270° C. as in Example 61. However, the stirring operation with a stirring rod was not carried out. In turn, the melt mixture was calcined at 400° C. in air for 24 hours (preliminary calcining step). The resulting substance was once cooled, and calcined at 800° C. in an oxygen atmosphere for 2 hours (main calcining step), and the resulting product was pulverized. Thus, a positive electrode active material $LiNiO_2$ was prepared.

Preparation and Evaluation of Electrode

An electrode was prepared and evaluated in the same manner as in Example 58. As a result, the discharge capacity in the first cycle was 119 mAh/g.

A comparison between Example 59 and Comparative Example 29 indicates that the discharge capacity can be increased by stirring the melt mixture.

Examples 64 to 69 and Comparative Examples 30 to 32

Synthesis of $LiNiO_2$

Anhydrous lithium nitrate and nickel nitrate hexahydrate were weighed in a ratio of Li:Ni=1.1:1. Anhydrous lithium nitrate melted at 270° C. and nickel nitrate hexahydrate melted at 120° C. were mixed at 270° C. by stirring with a stirring rod. In turn, the melt mixture was calcined at 400° C. in air for 24 hours (preliminary calcining step). The resulting substance was once cooled, and calcined in an oxygen atmosphere for 2 hours at 600° C., 650° C., 700° C., 750° C., 800° C., 850° C., 900° C., 940° C. and 980° C. (main calcining step) in Comparative Examples 30 and 31, Examples 64 to 69 and Comparative Example 32, respectively, and the resulting products were pulverized. Thus, positive electrode active materials $LiNiO_2$ of Examples 64 to 69 and Comparative Examples 30 to 32 were prepared.

Preparation and Evaluation of Electrodes

Figure 10:
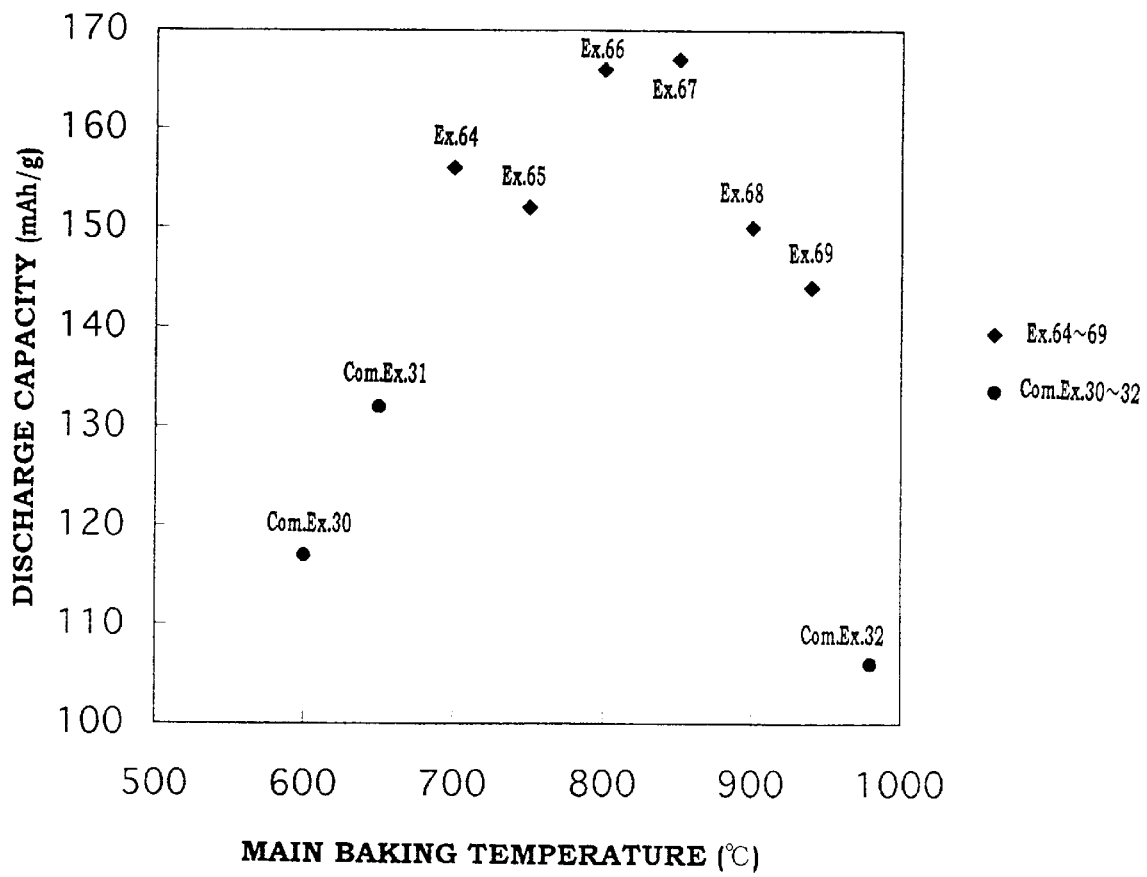
FIG. 10 is a graphical representation illustrating the relationship between a main calcining temperature and a discharge capacity in the first cycle in accordance with Examples 64 to 69 and Comparative Examples 30 to 32.

Electrodes were prepared and evaluated in the same manner as in Example 58. The relationship between the main calcining temperature and the discharge capacity in the first cycle is shown in FIG. 10. As can be seen from FIG. 10, the main calcining step is preferably carried out at a temperature of 700° C. to 950° C., more preferably 700° C. to 900° C.

Examples 70 to 75 and Comparative Example 33

Synthesis of $LiNiO_2$

Anhydrous lithium nitrate and nickel nitrate hexahydrate were weighed in a ratio of Li:Ni=1.1:1. Anhydrous lithium nitrate melted at 270° C. and nickel nitrate hexahydrate melted at 120° C. were mixed at 270° C. by stirring with a stirring rod. In turn, the mixture was calcined at 400° C. in air for 24 hours (preliminary calcining step). The resulting substance was once cooled, and calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 33 and Examples 70 to 75, respectively, and the resulting products were pulverized. Thus, positive electrode active materials $LiNiO_2$ of Comparative Example 33 and Examples 70 to 75 were prepared.

Preparation and Evaluation of Electrodes

Figure 11:
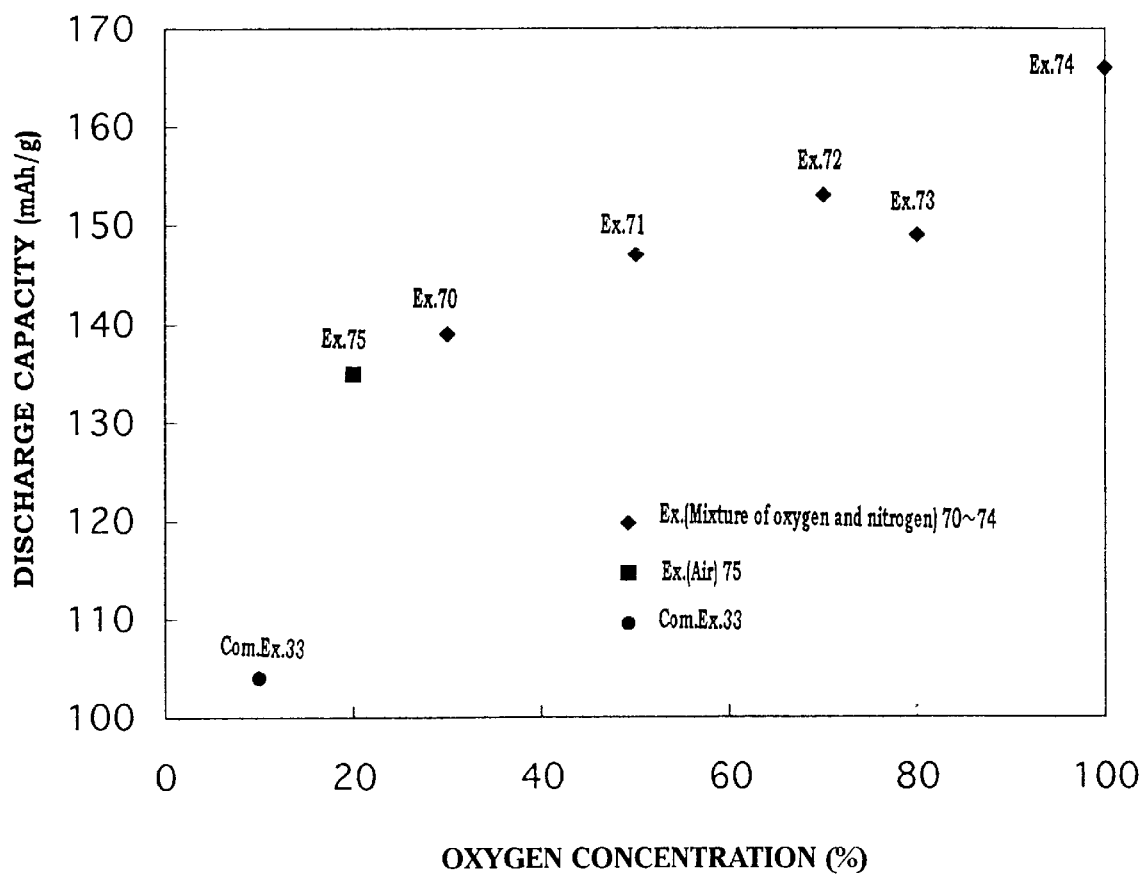
FIG. 11 is a graphical representation illustrating the relationship between an oxygen concentration in a main calcining atmosphere and a discharge capacity in the first cycle in accordance with Examples 70 to 75 and Comparative Example 33.

Electrodes were prepared and evaluated in the same manner as in Example 58. The relationship between the oxygen concentration in the main calcining atmosphere and the discharge capacity in the first cycle is shown in FIG. 11. As can be seen from FIG. 11, the oxygen concentration in the main calcining atmosphere is preferably 20 vol % to 100 vol %, more preferably 50 vol % to 100 vol %.

Example 76

Synthesis of $LiNiO_2$

Anhydrous lithium nitrate and nickel nitrate hexahydrate were weighed in a ratio of Li:Ni=1.3:1 and mixed in a mortar. The mixture was melted at 230° C. and stirred with a stirring rod. In turn, the melt mixture was calcined at 500° C. in air for 18 hours (preliminary calcining step). The resulting substance was once cooled, and calcined at 700° C. in an oxygen atmosphere for 10 hours (main calcining step), and the resulting product was pulverized. Thus, a positive electrode active material $LiNiO_2$ was prepared.

Preparation and Evaluation of Electrode

An electrode was prepared in substantially the same manner as in Example 58, except that the positive electrode active material thus prepared, acetylene black and polytetrafluoroethylene were mixed in a ratio of 100:30:25.

The electrode thus prepared was evaluated in substantially the same manner as in Example 58, except that the electrolytic solution was prepared by dissolving 1 mol/l lithium phosphorus hexafluoride ($LiPF_6$) in a solvent mixture containing propylene carbonate and dimethyl carbonate in a ratio of 1:1. As a result, the discharge capacity in the first cycle was 155 mAh/g.

Example 76 proves that the discharge capacity can be increased by first mixing the starting materials, then melting the mixture and stirring the melt mixture. A comparison between Examples 58 to 76 and Comparative Examples 7 to 11 indicates that the positive electrode active materials prepared by using a lithium material and a nickel material each having a melting point within a specific range in accordance with the present invention afford positive electrodes exhibiting superior characteristics.

Examples 77 to 81

Synthesis of $LiNiO_2$

Lithium acetate dihydrate and nickel nitrate hexahydrate were weighed in a ratio of Li:Ni=1.2:1. Lithium acetate dihydrate melted at 100° C. and nickel nitrate hexahydrate melted at 100° C. were mixed at 100° C. by stirring with a stirring rod. In turn, the melt mixture was calcined at 350° C. in air for 24 hours (preliminary calcining step). The resulting substance was calcined at 700° C. in an oxygen atmosphere for 2, 5, 7, 10 and 12 hours (main calcining step) in Examples 77 to 81, respectively, and the resulting products were pulverized. Thus, positive electrode active materials $LiNiO_2$ of Examples 77 to 81 were prepared.

Preparation and Evaluation of Electrodes

Electrodes were prepared in substantially the same manner as in Example 58, except that the positive electrode active materials were each mixed with acetylene black and polytetrafluoroethylene in a ratio of 100:4:3.

The electrodes thus prepared were each evaluated in substantially the same manner as in Example 58, except that the electrolytic solution was prepared by dissolving 1 mol/l lithium phosphorus hexafluoride ($LiPF_6$) in a solvent mixture containing propylene carbonate and diethyl carbonate in a ratio of 1:1.

Figure 12:
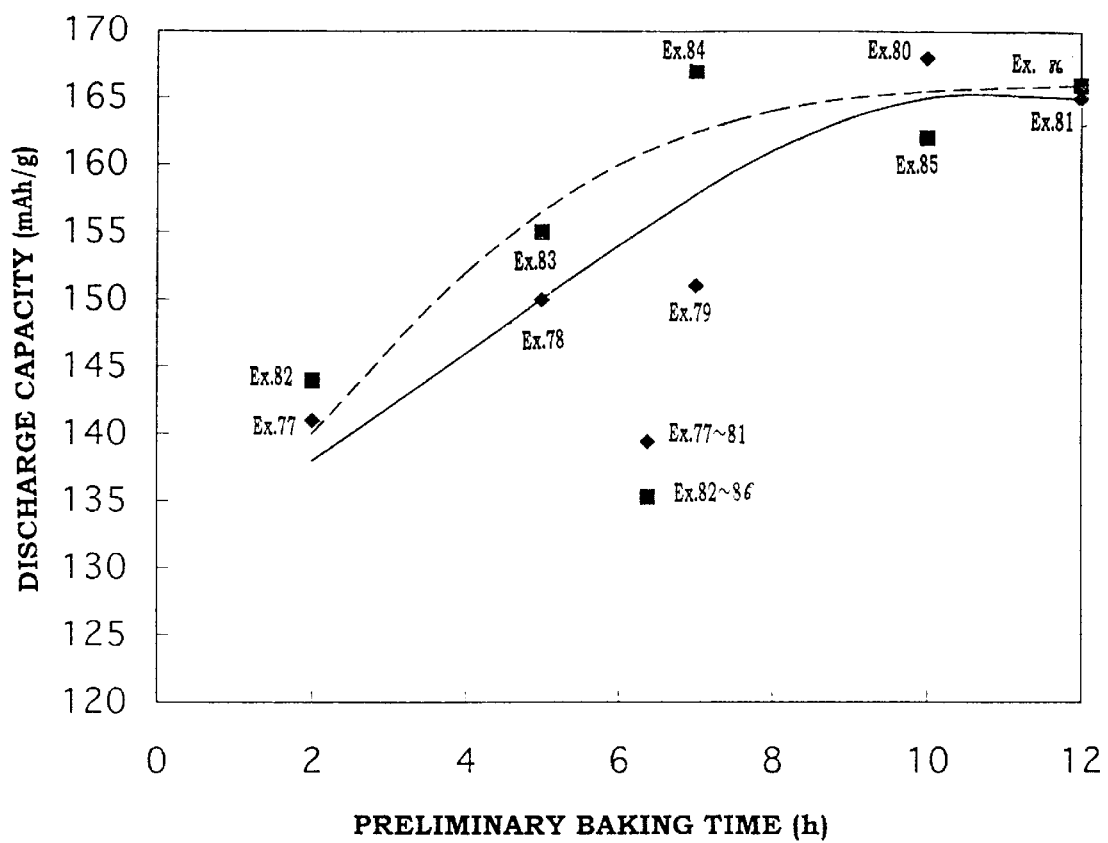
FIG. 12 is a graphical representation illustrating the relationship between a main calcining period and a discharge capacity in the first cycle in accordance with Examples 77 to 86.

The relationship between the main calcining period and the discharge capacity in the first cycle is shown in FIG. 12.

Examples 82 to 86

Synthesis of $LiNiO_2$

Lithium acetate dihydrate and nickel nitrate hexahydrate were weighed in a ratio of Li:Ni=1.2:1. Lithium acetate dihydrate melted at 100° C. and nickel nitrate hexahydrate melted at 100° C. were mixed at 100° C. by stirring with a stirring rod. In turn, the melt mixture was calcined at 350° C. in air for 24 hours (preliminary calcining step). The resulting substance was cooled and pulverized. Thereafter, the resulting powdery substance was calcined at 700° C. in an oxygen atmosphere for 2, 5, 7, 10 and 12 hours (main calcining step) in Examples 82 to 86, respectively, and the resulting products were pulverized. Thus, positive electrode active materials $LiNiO_2$ of Examples 82 to 86 were prepared.

Preparation and Evaluation of Electrodes

Electrodes were prepared and evaluated in the same manner as in Example 77. The relationship between the main calcining period and the discharge capacity in the first cycle is shown in FIG. 12. As can be seen from FIG. 12, the discharge capacity can be increased by the cooling and pulverization after the preliminary calcination.

Examples 87 to 95 and Comparative Examples 34 to 37

Synthesis of $LiNiO_2$

Lithium acetate dihydrate and nickel nitrate hexahydrate were weighed in a ratio of Li:Ni=1.1:1 and mixed in a mortar. The mixture was melted at 80° C. and stirred with a stirring rod. In turn, the melt mixture was calcined in air for 24 hours at 100° C., 120° C., 130° C., 150° C., 200° C., 250° C., 300° C., 320° C., 350° C., 380° C., 400° C., 450° C. and 500° C. (preliminary calcining step) in Comparative Examples 34 and 35, Examples 87 to 95 and Comparative Examples 36 and 37, respectively. The resulting substances were once cooled, and calcined at 750° C. in an oxygen atmosphere for 2 hours (main calcining step), and the resulting products were pulverized. Thus, positive electrode active materials $LiNiO_2$ of Examples 87 to 95 and Comparative Examples 34 to 37 were prepared. Where the preliminary calcining step was carried out at 100° C. and 120° C. (Comparative Examples 34 and 35), bumping occurred in the main calcining step because of insufficient dehydration, causing a small trouble in the production process. Where the preliminary calcining step was carried out at 130° C. to 200° C. (Examples 87 to 89), dehydration was insufficient, but no trouble arose in the production process.

Preparation and Evaluation of Electrodes

Electrodes were prepared in substantially the same manner as in Example 58, except that the positive electrode active materials were each mixed with acetylene black and polytetrafluoroethylene in a ratio of 100:5:5.

The electrodes thus prepared were each evaluated in substantially the same manner as in Example 58, except that the electrolytic solution was prepared by dissolving 1 mol/l lithium phosphorus hexafluoride ($LiPF_6$) in a solvent mixture containing propylene carbonate and ethylmethyl carbonate in a ratio of 1:1.

Figure 13:
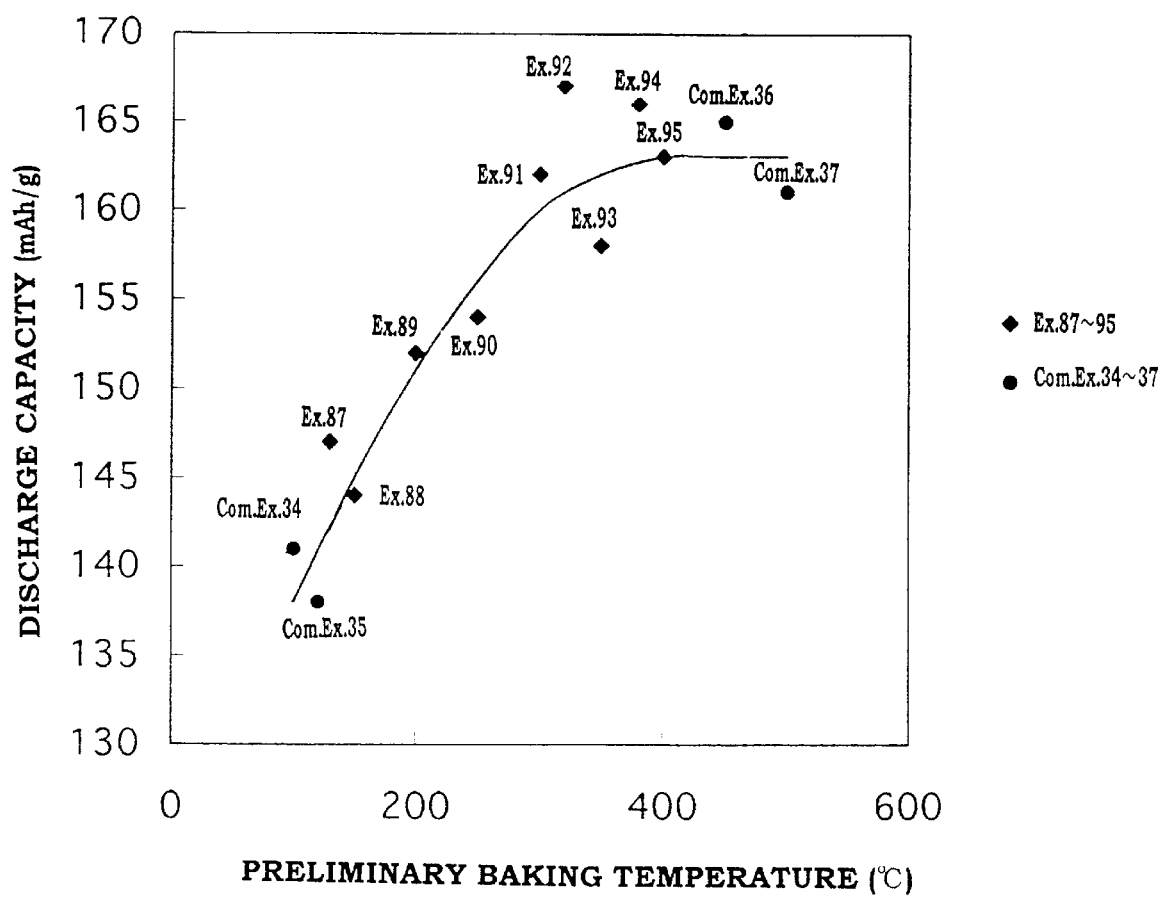
FIG. 13 is a graphical representation illustrating the relationship between a preliminary calcining temperature and a discharge capacity in the first cycle in accordance with Examples 87 to 95 and Comparative Examples 34 to 37.

The relationship between the preliminary calcining temperature and the discharge capacity in the first cycle is shown in FIG. 13.

If the preliminary calcining temperature is lower than 130° C., a problem associated with the production process arises (i.e., the bumping occurs in the main calcining step due to insufficient dehydration). Even if the preliminary calcining temperature is higher than 400° C., electrical characteristics cannot be improved (i.e., the discharge capacity does not increase) as can be seen from FIG. 13, and the effect of the preliminary calcining is the same. Therefore, the preliminary calcining step is preferably carried out at a temperature of 130° C. to 400° C., more preferably 300° C. to 400° C.

Examples 96 to 101 and Comparative Examples 38 to 40

Synthesis of $LiNiO_2$

Lithium acetate dihydrate and nickel nitrate hexahydrate were weighed in a ratio of Li:Ni=1.1:1, and mixed in a mortar. The mixture was melted at 80° C., and stirred with a stirring rod. In turn, the mixture was calcined at 380° C. in air for 24 hours (preliminary calcining step). The resulting substance was once cooled, and calcined in an oxygen atmosphere for 2 hours at 600° C., 650° C., 700° C., 750° C., 800° C., 850° C., 900° C., 940° C. and 980° C. (main calcining step) in Comparative Examples 38 and 39, Examples 96 to 101 and Comparative Example 40, respectively, and the resulting products were pulverized. Thus, positive electrode active materials $LiNiO_2$ of Examples 96 to 101 and Comparative Examples 38 to 40 were prepared.

Preparation and Evaluation of Electrodes

Figure 14:
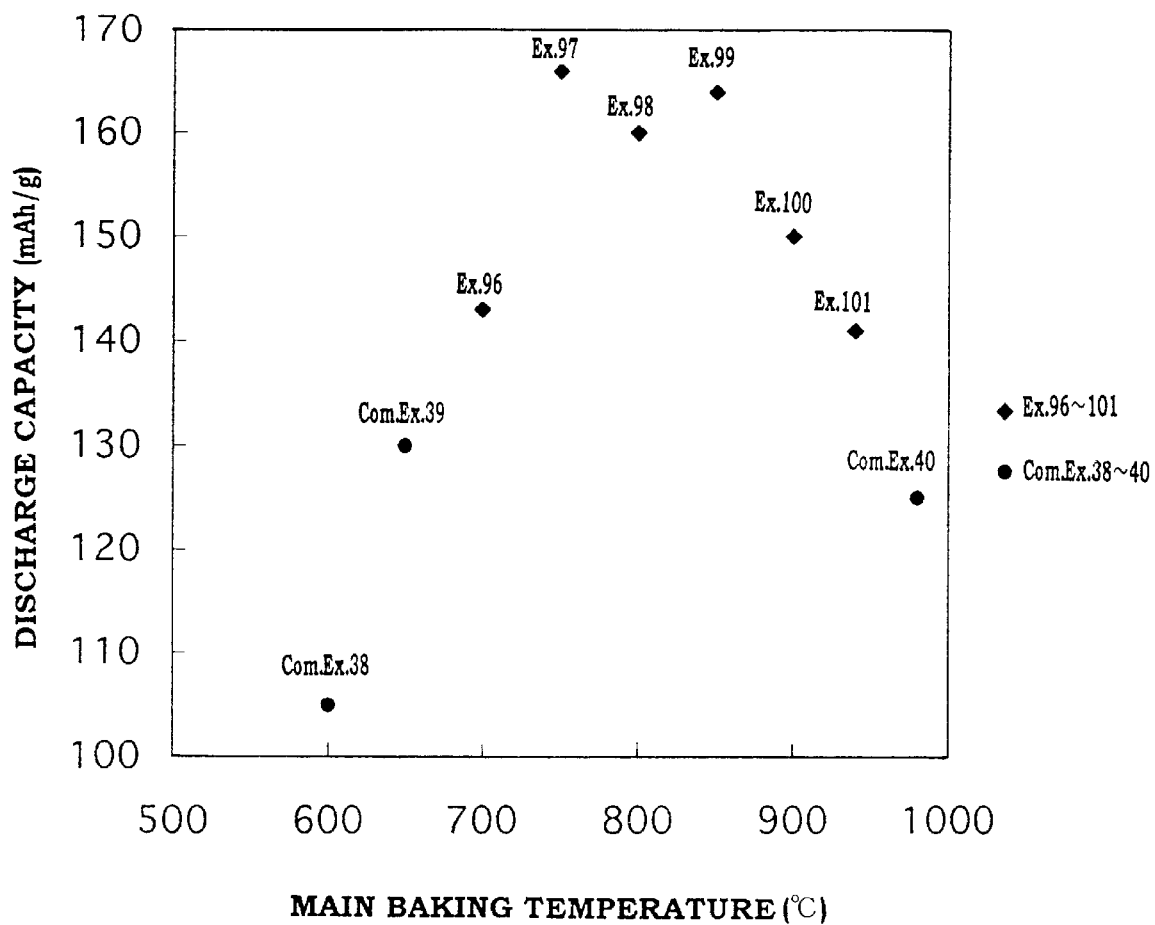
FIG. 14 is a graphical representation illustrating the relationship between a main calcining temperature and a discharge capacity in the first cycle in accordance with Examples 96 to 101 and Comparative Examples 38 to 40.

Electrodes were prepared and evaluated in the same manner as in Example 87. The relationship between the main calcining temperature and the discharge capacity in the first cycle is shown in FIG. 14. As can be seen from FIG. 14, the main calcining step is preferably carried out at 700° C. to 950° C., more preferably 700° C. to 900° C.

Examples 102 to 107 and Comparative Example 41

Synthesis of $LiNiO_2$

Lithium acetate dihydrate and nickel nitrate hexahydrate were weighed in a ratio of Li:Ni=1.1:1, and mixed in a mortar. The mixture was melted at 80° C., and stirred with a stirring rod. In turn, the melt mixture was calcined at 380° C. in air for 24 hours (preliminary calcining step). The resulting substance was once cooled, and calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 41 and Examples 102 to 107, respectively, and the resulting products were pulverized. Thus, positive electrode active materials $LiNiO_2$ of Comparative Example 41 and Examples 102 to 107 were prepared.

Preparation and Evaluation of Electrodes

Figure 15:
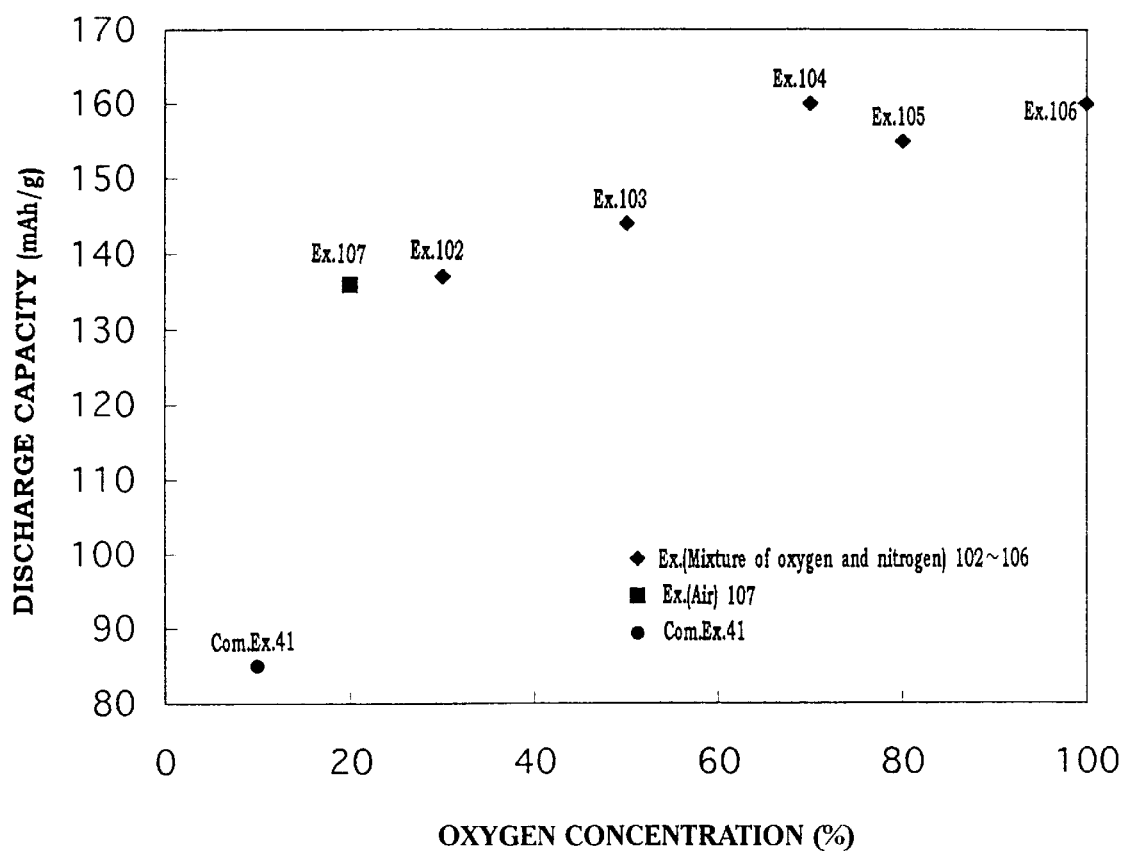
FIG. 15 is a graphical representation illustrating the relationship between an oxygen concentration in a main calcining atmosphere and a discharge capacity in the first cycle in accordance with Examples 102 to 107 and Comparative Example 41.

Electrodes were prepared and evaluated in the same manner as in Example 87. The relationship between the oxygen concentration in the main calcining atmosphere and the discharge capacity in the first cycle is shown in FIG. 15. As can be seen from FIG. 15, the oxygen concentration in the main calcining atmosphere is preferably 20 vol % to 100 vol %, more preferably 50 vol % to 100 vol %.

Example 108

Synthesis of $LiNiO_2$

Anhydrous lithium hydroxide and nickel nitrate hexahydrate were weighed in a ratio of Li:Ni=1.1:1, and mixed in a mortar. Then, 2.2 mols of oxalic acid with respect to 1 mol of nickel nitrate hexahydrate was added to the mixture and mixed therewith. In turn, the resulting mixture was calcined at 700° C. in an oxygen atmosphere for 10 hours (main calcining step), and the resulting product was pulverized. Thus, a positive electrode active material $LiNiO_2$ was prepared.

Preparation of Electrode

The active material $LiNiO_2$ thus prepared, acetylene black and polytetrafluoroethylene were mixed in a ratio of 100:10:10 in a mortar, and the mixture was press-molded into a pellet having a diameter of 20 mm and a weight of 0.10 g. At this time, a titanium mesh for use as a collector was pressed along with the pellet. A titanium wire was spot-welded from the titanium mesh to the pellet to establish a current collection line. Thus, an electrode was prepared for evaluation thereof.

Evaluation of Electrode

The electrode was evaluated by a three electrode method in which lithium electrodes were used as a counter electrode and a reference electrode. Used as an electrolytic solution was a solution in which 1 mol/l lithium perchlorate ($LiClO_4$) was dissolved in a solvent mixture containing ethylene carbonate and ethylmethyl carbonate in a ratio of 1:1. In the first charge and discharge cycle, the electrode was charged at a current density of 27.4 mA/g up to 4.2V relative to the lithium reference electrode, and then discharged to 2.7 V at the same current density. The charge and discharge process was thereafter repeated within the same potential range and at the same current density. As a result, the discharge capacity in the first cycle was 141 mAh/g.

Example 109

Synthesis of $LiNiO_2$

Anhydrous lithium hydroxide and nickel nitrate hexahydrate were weighed in a ratio of Li:Ni=1.1:1, and mixed. Then, 2.5 mols of malonic acid with respect to 1 mol of nickel nitrate hexahydrate was added to the mixture and mixed therewith. In turn, the resulting mixture was calcined at 700° C. in an oxygen atmosphere for 10 hours (main calcining step), and the resulting product was pulverized. Thus, a positive electrode active material $LiNiO_2$ was prepared.

Preparation and Evaluation of Electrode

An electrode was prepared in substantially the same manner as in Example 108, except that the positive electrode active material thus prepared, acetylene black and polytetrafluoroethylene were mixed in a ratio of 100:30:25.

The electrode was evaluated in substantially the same manner as in Example 108, except that the electrolytic solution was prepared by dissolving 1 mol/l lithium phosphorus hexafluoride ($LiPF_6$) in a solvent mixture containing propylene carbonate and dimethyl carbonate in a ratio of 1:1. As a result, the discharge capacity in the first cycle was 139 mAh/g.

Comparative Example 42

Synthesis of $LiNiO_2$

Anhydrous lithium hydroxide and nickel nitrate hexahydrate were weighed in a ratio of Li:Ni=1.1:1, and mixed. No organic acid was added to the mixture. In turn, the mixture was calcined at 700° C. in an oxygen atmosphere for 10 hours (main calcining step), and the resulting product was pulverized. Thus, a positive electrode active material $LiNiO_2$ was prepared.

Preparation and Evaluation of Electrode

An electrode was prepared and evaluated in the same manner as in Example 108. As a result, the discharge capacity in the first cycle was 139 mAh/g.

It was visually observed that the generation of nitrogen oxides was suppressed in Examples 108 and 109 in comparison with Comparative Example 42. Therefore, the addition of an organic acid is effective.

Example 110

Synthesis of $LiNiO_2$

Anhydrous lithium hydroxide and nickel nitrate hexahydrate were weighed in a ratio of Li:Ni=1.1:1, and mixed. Then, 2.2 mols of oxalic acid with respect to 1 mol of nickel nitrate hexahydrate was added to the mixture and mixed therewith. The resulting mixture was heated up to 100° C. for melting nickel nitrate hexahydrate, and kneaded. In turn, the melt mixture was calcined at 700° C. in an oxygen atmosphere for 10 hours (main calcining step), and the resulting product was pulverized. Thus, a positive electrode active material $LiNiO_2$ was prepared.

Preparation and Evaluation of Electrode

An electrode was prepared and evaluated in the same manner as in Example 108. As a result, the discharge capacity in the first cycle was 148 mAh/g.

A comparison between Examples 108 and 110 indicates that the kneading of the melt mixture is effective.

Examples 111 to 118

Synthesis of $LiNiO_2$

Anhydrous lithium hydroxide and nickel nitrate hexahydrate were weighed in a ratio of Li:Ni=1.1:1, and mixed. Then, 2.2 mols of oxalic acid with respect to 1 mol of nickel nitrate hexahydrate was added to the mixture and mixed therewith. The resulting mixture was heated up to 50° C., 60° C., 80° C., 100° C., 120° C., 130° C., 150° C. and 170° C. in Examples 111 to 118, respectively, for melting nickel nitrate hexahydrate, and kneaded for 1 hour. In turn, the resulting mixtures were calcined at 700° C. in an oxygen atmosphere for 10 hours (main calcining step), and the resulting products were pulverized. Thus, positive electrode active materials $LiNiO_2$ of Examples 111 to 118 were prepared. Where the mixture was heated up to 500° C. (Example 111), nickel nitrate hexahydrate was not melted. Where the mixture was heated up to a temperature of 150° C. or higher (Examples 117 and 118), the kneading operation became difficult with time.

Preparation and Evaluation of Electrodes

Electrodes were prepared and evaluated in the same manner as in Example 108. The relationship between the temperature at which the kneading operation was performed and the discharge capacity in the first cycle is shown in FIG. 16.

Figure 16:
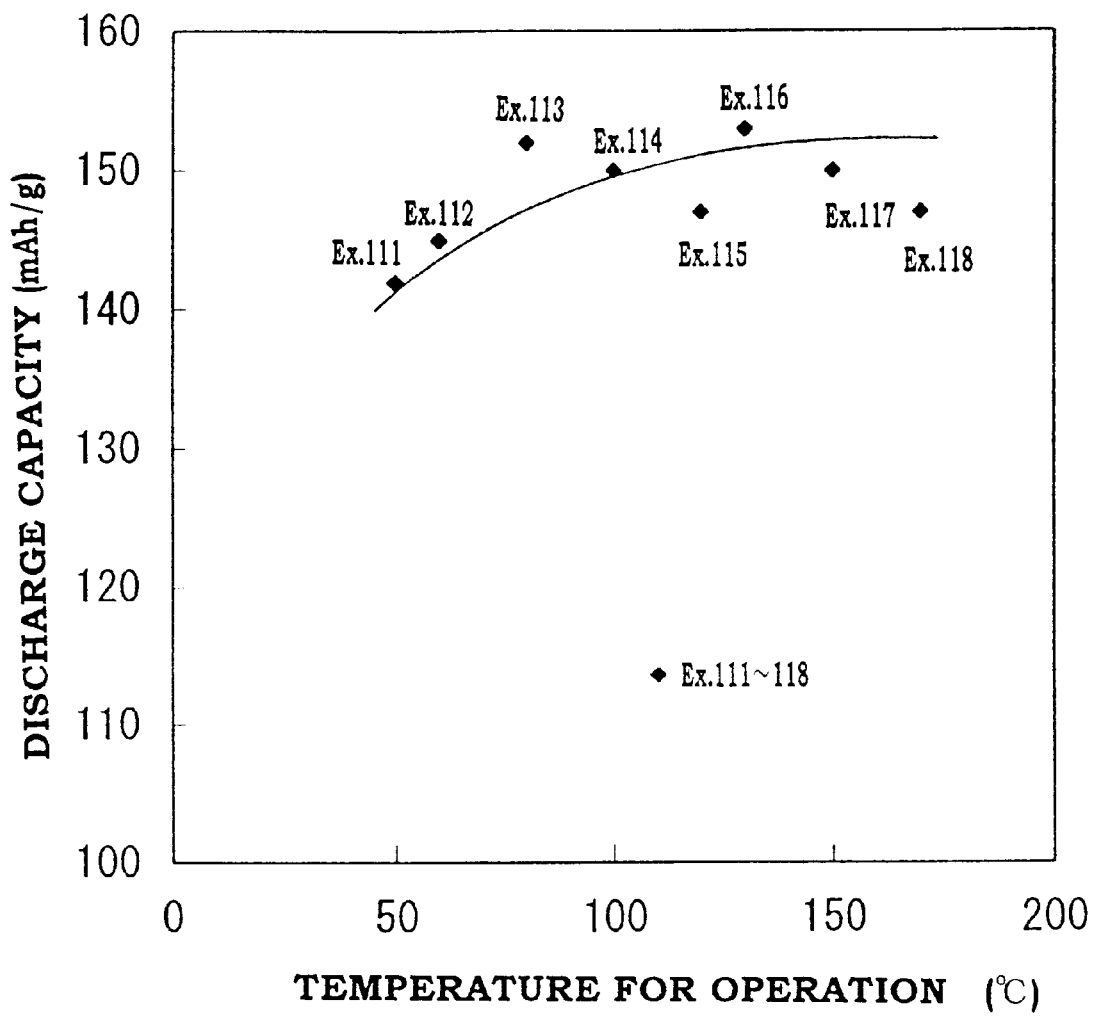
FIG. 16 is a graphical representation illustrating the relationship between a temperature at which a kneading operation is performed and a discharge capacity in the first cycle in accordance with Examples 111 to 118.

As can be seen from FIG. 16, the temperature at the kneading operation is preferably 60 to 130° C.

A comparison between Examples 108 to 118 and Comparative Examples 7 to 11 indicates that the positive electrode active materials prepared by adding an organic acid before the calcination afford electrodes exhibiting superior characteristics.

Examples 119 to 127 and Comparative Examples 43 to 46

Synthesis of $LiNiO_2$

Lithium carbonate and nickel nitrate hexahydrate were weighed in a ratio of Li:Ni=1.1:1 and mixed. Then, 1.2 mols of oxalic acid with respect to 1 mol of nickel nitrate hexahydrate was added to the mixture and mixed therewith. The resulting mixture was heated up to 100° C. for melting nickel nitrate hexahydrate, and kneaded. In turn, the resulting mixture was calcined in air for 24 hours at 100° C., 120° C., 130° C., 150° C., 200° C., 250° C., 300° C., 320° C., 350° C., 380° C., 400° C., 450° C. and 500° C. (preliminary calcining step) in Comparative Examples 43 and 44, Examples 119 to 127 and Comparative Examples 45 and 46, respectively. Thereafter, the resulting substances were calcined at 800° C. in an oxygen atmosphere for 2 hours (main calcining step), and the resulting products were pulverized. Thus, positive electrode active materials $LiNiO_2$ of Examples 119 to 127 and Comparative Examples 43 to 46 were prepared. Where the preliminary calcining step was carried out at 100° C. and 120° C. (Comparative Examples 43 and 44), bumping occurred in the main calcining step because of insufficient dehydration, causing a small trouble in the production process. Where the preliminary calcining step was carried out at 130° C. to 200° C. (Examples 119 to 121), dehydration was insufficient, but no trouble arose in the production process.

Preparation and Evaluation of Electrode

Electrodes were prepared in substantially the same manner as in Example 108, except that the positive electrode active materials were each mixed with acetylene black and polytetrafluoroethylene in a ratio of 100:4:3.

The electrodes thus prepared were each evaluated in substantially the same manner as in Example 108, except that the electrolytic solution was prepared by dissolving 1 mol/l lithium phosphorus hexafluoride ($LiPF_6$) in a solvent mixture containing propylene carbonate and diethyl carbonate in a ratio of 1:1.

Figure 17:
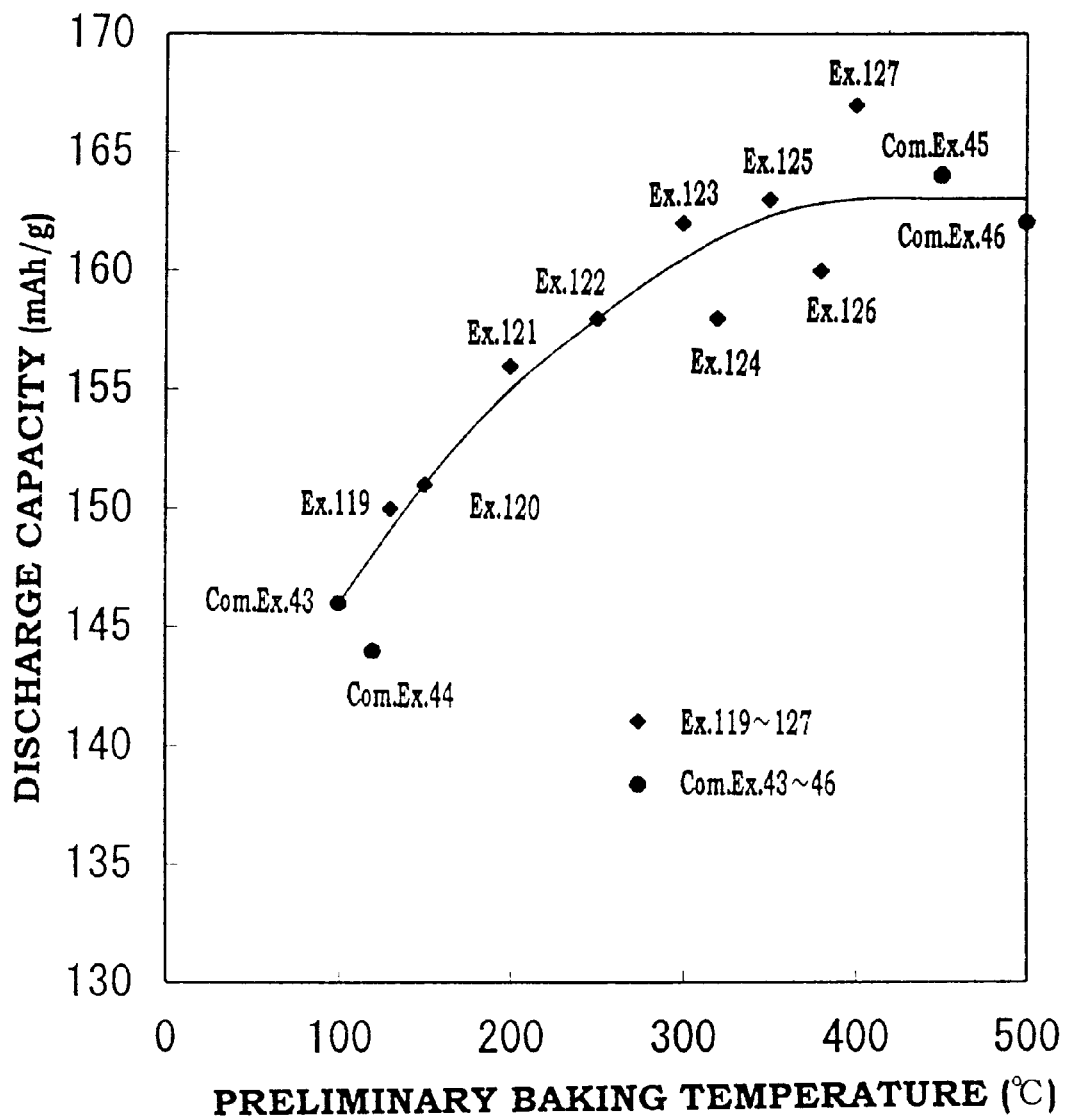
FIG. 17 is a graphical representation illustrating the relationship between a preliminary calcining temperature and a discharge capacity in the first cycle in accordance with Examples 119 to 127 and Comparative Examples 43 to 46.

The relationship between the preliminary calcining temperature and the discharge capacity in the first cycle is shown in FIG. 17.

If the preliminary calcining temperature is lower than 130° C., a problem associated with the production process arises (i.e., the bumping occurs in the main calcining step due to insufficient dehydration). Even if the preliminary calcining temperature is higher than 400° C., electrical characteristics cannot be improved (i.e., the discharge capacity does not increase) as can be seen from FIG. 17, and the effect of the preliminary calcination is the same. Therefore, the preliminary calcining step for dehydration is preferably carried out at a temperature of 130° C. to 400° C., more preferably 300° C. to 400° C.

Examples 128 to 133 and Comparative Examples 47 to 49

Synthesis of $LiNiO_2$

Lithium carbonate and nickel nitrate hexahydrate were weighed in a ratio of Li:Ni=1.1:1, and mixed. Then, 1.2 mols of oxalic acid with respect to 1 mol of nickel nitrate hexahydrate was added to the mixture and mixed therewith. The resulting mixture was heated up to 100° C. for melting nickel nitrate hexahydrate, and kneaded. In turn, the melt mixture was calcined at 400° C. in air for 24 hours (preliminary calcining step). Thereafter, the resulting substance was calcined in an oxygen atmosphere for 2 hours at 600° C., 650° C., 700° C., 750° C., 800° C., 850° C., 900° C., 940° C. and 980° C. (main calcining step) in Comparative Examples 47 and 48, Examples 128 to 133 and Comparative Example 49, respectively, and the resulting products were pulverized. Thus, positive electrode active materials $LiNiO_2$ of Examples 128 to 133 and Comparative Examples 47 to 49 were prepared.

Preparation and Evaluation of Electrodes

Figure 18:
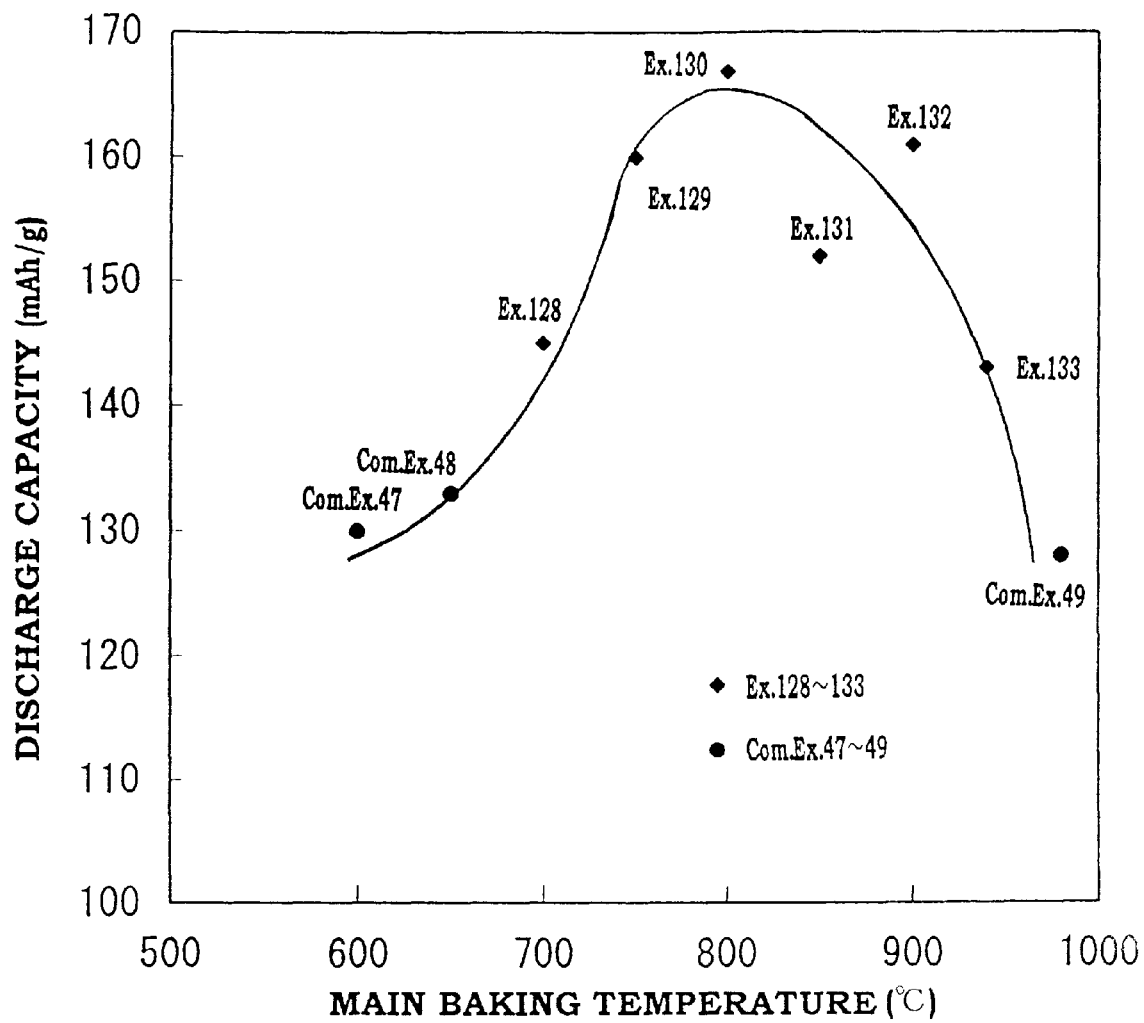
FIG. 18 is a graphical representation illustrating the relationship between a main calcining temperature and a discharge capacity in the first cycle in accordance with Examples 128 to 133 and Comparative Examples 47 to 49.

Electrodes were prepared and evaluated in the same manner as in Example 119. The relationship between the main calcining temperature and the discharge capacity in the first cycle is shown in FIG. 18. As can be seen from FIG. 18, the main calcining step is preferably carried out at a temperature of 700° C. to 950° C., more preferably 700° C. to 900° C.

Examples 134 to 139 and Comparative Example 50

Synthesis of $LiNiO_2$

Lithium carbonate and nickel nitrate hexahydrate were weighed in a ratio of Li:Ni=1.1:1, and mixed. Then, 1.2 mols of oxalic acid with respect to 1 mol of nickel nitrate hexahydrate was added to the mixture and mixed therewith. The resulting mixture was heated up to 100° C. for melting nickel nitrate hexahydrate, and kneaded. In turn, the melt mixture was calcined at 400° C. in air for 24 hours (preliminary calcining step). Thereafter, the resulting substance was calcined at 800° C. for 2 hours in nitrogen/oxygen atmospheres of oxygen concentrations of 10 vol %, 30 vol %, 50 vol %, 70 vol %, 80 vol % and 100 vol % and in air (oxygen concentration: 20 vol %) (main calcining step) in Comparative Example 50 and Examples 134 to 139, respectively, and the resulting products were pulverized. Thus, positive electrode active materials $LiNiO_2$ of Comparative Example 50 and Examples 134 to 139 were prepared.

Preparation and Evaluation of Electrodes

Figure 19:
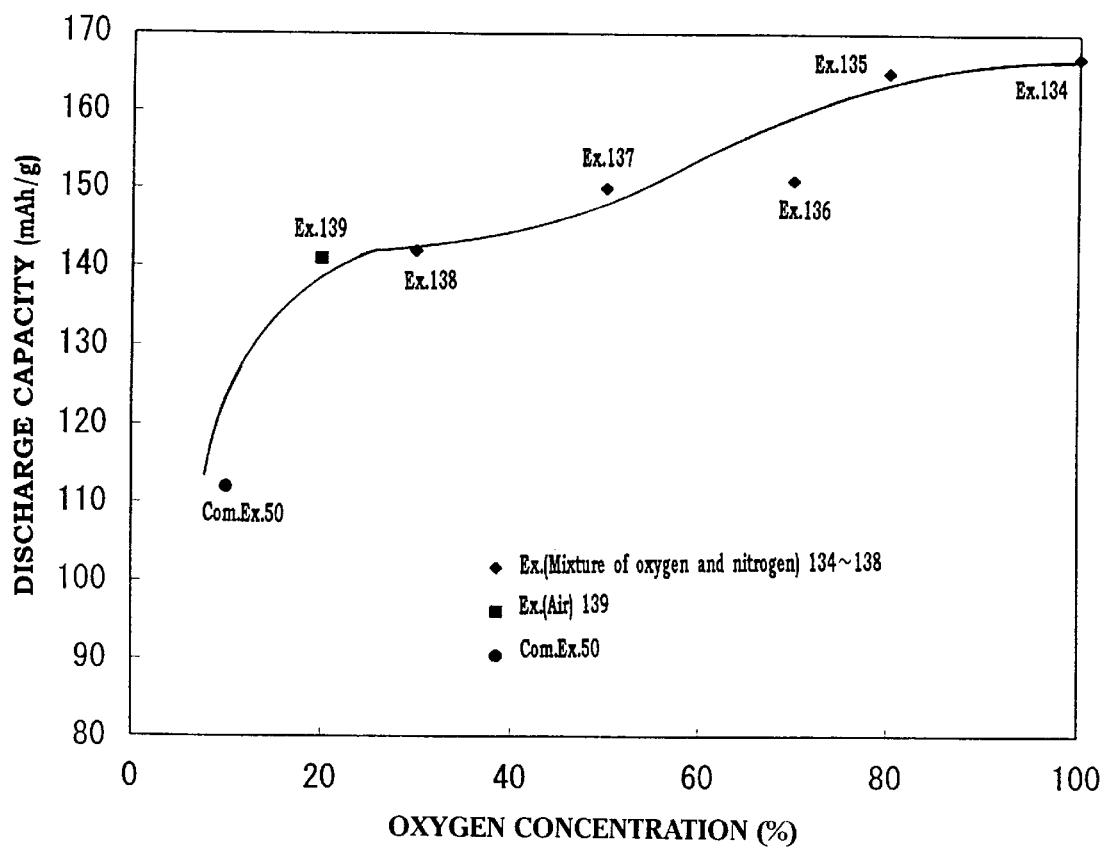
FIG. 19 is a graphical representation illustrating the relationship between an oxygen concentration in a main calcining atmosphere and a discharge capacity in the first cycle in accordance with Examples 134 to 139 and Comparative Example 50.

Electrodes were prepared and evaluated in the same manner as in Example 119. The relationship between the oxygen concentration in the main calcining atmosphere and the discharge capacity in the first cycle is shown in FIG. 19. As can be seen from FIG. 19, the oxygen concentration in the main calcining atmosphere is preferably 20 vol % to 100 vol %, more preferably 50 vol % to 100 vol %.

Examples 140 to 142

Synthesis of LiNiO$_2$

Lithium acetate dihydrate and nickel nitrate hexahydrate were weighed in a ratio of Li:Ni=1.1:1 and mixed. Then, 1.5 mols of oxalic acid with respect to 1 mol of nickel nitrate hexahydrate was added to the mixture and mixed therewith. The resulting mixture was melted at 100° C., and stirred. In turn, the melt mixture was calcined at 400° C. in air for 24 hours (preliminary calcining step). In Example 140, the resulting substance was not cooled before main calcination. In Example 141, the resulting substance was cooled, and then subjected to the main calcination. In Example 142, the resulting substance was cooled and pulverized in a mortar, and then subjected to the main calcination. The main calcining step was carried out at 800° C. in an oxygen atmosphere for 2 hours, and the resulting products were pulverized. Thus, positive electrode active materials LiNiO$_2$ of Examples 140 to 142 were prepared.

Preparation and Evaluation of Electrodes

Electrodes were prepared in substantially the same manner as in Example 108, except that the positive electrode active materials were each mixed with acetylene black and polytetrafluoroethylene in a ratio of 100:5:5.

The electrodes thus prepared were each evaluated in substantially the same manner as in Example 108, except that the electrolytic solution was prepared by dissolving 1 mol/l lithium phosphorus hexafluoride (LiPF$_6$) in a solvent mixture containing propylene carbonate and ethylmethyl carbonate in a ratio of 1:1. As a result, the discharge capacity in the first cycle was 158 mAh/g, 161 mAh/g and 168 mAh/g in Examples 140, 141 and 142, respectively. This indicates that the cooling and pulverization after the preliminary calcining step are effective.

Example 143

Synthesis of Positive Electrode Active Substance and Preparation of Positive Electrode In the same manner as in Example 1, a positive electrode active material LiNiO$_2$ was synthesized, and a positive electrode was prepared by forming the positive electrode active material into a pellet having a diameter of 15 mm and a weight of 50 mg.

Preparation of Negative Electrode

A negative electrode was formed of a pyrolytic carbon material. More specifically, a starting material of propane was pyrolyzed at 750° C. in a gas phase under atmospheric pressure, and the resulting pyrolytic carbon was deposited on a nickel substrate (surface area: 4 cm$^2$) for 2 hours. The X-ray diffraction analysis showed that the interplanar distance $d_{002}$ of (002) plane of the pyrolytic carbon material was 0.337 nm and the crystalline size Lc along (002) plane was 15 nm. The argon laser Raman spectrum analysis showed that the ratio of a peak intensity at around 1360 cm$^{-1}$ to that at around 1580 cm$^{-1}$ (R value) was 0.48. A nickel wire was spot-welded on the nickel substrate of the negative electrode to establish a current collection line. The negative electrode was dried at 200° C. under reduced pressure for removing moisture therefrom. The negative electrode contained 28 mg of the negative electrode active material.

Evaluation of Battery

A battery of beaker type cell was fabricated by using the positive and negative electrodes prepared in the aforesaid manner. Used as an electrolytic solution was a solution in which 1 mol/l lithium perchlorate was dissolved in a solvent mixture containing propylene carbonate and diethyl carbonate in a ratio of 1:1. The battery thus fabricated was evaluated through a charge-discharge test in which the battery was charged up to 4.4 V at a current of 0.2 mA, and discharged to 2.5 V at the same current in the first charge and discharge cycle. The charge and discharge process was thereafter repeated within the same voltage range at the same current density for evaluation of the battery.

As a result, the discharge capacity of the battery was 6.7 mAh in the first cycle and 6.2 mAh in the 100th cycle.

Example 144

Synthesis of Positive Electrode Active Substance and Preparation of Positive Electrode In the same manner as in Example 59, a positive electrode active material LiNiO$_2$ was synthesized, and a positive electrode was prepared by forming the positive electrode active material into a pellet having a diameter of 15 mm and a weight of 50 mg.

Fabrication and Evaluation of Battery

A negative electrode was prepared in the same manner as in Example 143. The negative electrode contained 30 mg of the negative electrode active material. A battery of beaker type cell was fabricated by employing the positive and negative electrodes thus prepared, and evaluated in the same manner as in Example 143. As a result, the discharge capacity of the battery thus prepared was 7.1 mAh in the first cycle and 6.2 mAh in the 100th cycle.

Example 145

Synthesis of Positive Electrode Active Substance and Preparation of Positive Electrode In the same manner as in Example 142, a positive electrode active material LiNiO$_2$ was synthesized, and a positive electrode was prepared by forming the positive electrode active material into a pellet having a diameter of 15 mm and a weight of 50 mg.

Fabrication and Evaluation of Battery

A negative electrode was prepared in the same manner as in Example 143. The negative electrode contained 35 mg of the negative electrode active material. A battery of beaker type cell was fabricated by employing the positive and negative electrodes thus prepared, and evaluated in the same manner as in Example 143. As a result, the discharge capacity of the battery thus fabricated was 7.8 mAh in the first cycle and 7.0 mAh in the 100th cycle.

Example 146

Synthesis of Positive Electrode Active Substance and Preparation of Positive Electrode A positive electrode active material LiNiO$_2$ was synthesized in the same manner as in Example 16. A positive electrode of a pellet having a diameter of 15 mm and a thickness of 0.75 mm and containing 0.2 g of the positive electrode active material was prepared in the same manner as in Example 1.

Preparation of Negative Electrode

Natural graphite (produced in Madagascar, scale shape, particle diameter: 11 μm, $d_{002}$: 0.337 nm, Lc: 27 nm, La: 17 nm, R value: 0, specific surface area: 8 m$^2$/g) was employed as a negative electrode active material. The natural graphite and polytetrafluoroethylene were mixed in a ratio of 10:1, and the mixture was press-molded into a pellet having a diameter of 15 mm and a thickness of 0.59 mm and containing 0.1 g of the negative electrode active material. At this time, a nickel mesh for use as a collector was pressed along with the pellet. The pellet thus prepared was dried at 200° C. under reduced pressure for removal of moisture therefrom. Thus, a negative electrode was prepared.

Fabrication of Battery

Figure 20:
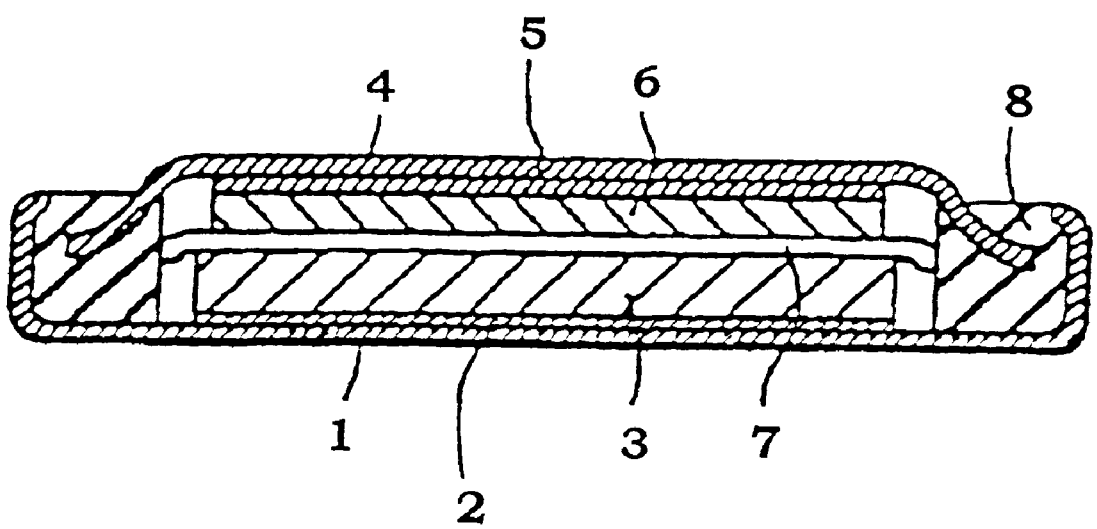
FIG. 20 is a schematic sectional view illustrating the construction of coin-type batteries fabricated in Examples 146 to 183 and Comparative Examples 51 to 61.

A coin-type battery as shown in FIG. 20 was fabricated in the following manner. The positive electrode 3 including the positive electrode collector 2 was press-fitted in a positive electrode case 1 including an insulation packing 8 fitted therein. A separator 7 of a polypropylene nonwoven fabric was placed on the positive electrode 3, and impregnated with an electrolytic solution in which an electrolytic salt $LiPF_6$ was dissolved in a concentration of 1 mol/l in a solvent mixture containing ethylene carbonate and propylene carbonate and diethyl carbonate in a volume ratio of 2:1:3. The negative electrode 6 including the negative electrode collector 5 to be fitted in a negative electrode case 4 was placed on the separator 7. In turn, the positive electrode case 1 was pressedly secured to the negative electrode case 4 with the insulation packing 8 interposed therebetween for sealing. Thus, the coin-type battery was fabricated.

Evaluation of Battery

The battery thus fabricated was evaluated by measuring the discharge capacity thereof. More specifically, the battery was charged at a charge current of 1 mA up to an upper limit charge voltage of 4.4 V, and then discharged at a discharge current of 1 mA to a lower limit voltage of 2.5 V in the first charge and discharge cycle. The charge and discharge process was thereafter repeated within the same voltage range and at the same current density for the evaluation of the battery. As a result, the discharge capacity of the battery was 28.5 mAh in the first cycle and 24.6 mAh in the 100th cycle.

Example 147

Synthesis of Positive Electrode Active Substance and Preparation of Positive Electrode A positive electrode active material $LiNiO_2$ was synthesized in the same manner as in Example 94. A positive electrode of a pellet having a diameter of 15 mm and a thickness of 0.75 mm and containing 0.2 g of the positive electrode active material was prepared in the same manner as in Example 58.

Fabrication and Evaluation of Battery

The preparation of a negative electrode, the fabrication and evaluation of a battery were carried out in the same manner as in Example 146. As a result, the discharge capacity of the battery thus fabricated was 27.3 mAh in the first cycle and 23.4 mAh in the 100th cycle.

Example 148

Synthesis of Positive Electrode Active Substance and Preparation of Positive Electrode A positive electrode active material $LiNiO_2$ was synthesized in the same manner as in Example 142. A positive electrode of a pellet having a diameter of 15 mm and a thickness of 0.75 mm and containing 0.2 g of the positive electrode active material was prepared in the same manner as in Example 1.

Fabrication and Evaluation of Battery

The preparation of a negative electrode, the fabrication and evaluation of a battery were carried out in the same manner as in Example 146. As a result, the discharge capacity of the battery thus fabricated was 28.0 mAh in the first cycle and 25.7 mAh in the 100th cycle.

Examples 149 to 156 and Comparative Example 51

Synthesis of $LiNiO_2$

Lithium hydroxide and nickel nitrate hexahydrate were weighed in Li:Ni ratios (Li/Ni ratios) of 0.7:1 (0.7), 0.8:1 (0.8), 0.9:1 (0.9), 1.0:1 (1.0), 1.1:1 (1.1), 1.2:1 (1.2), 1.3:1 (1.3), 1.4:1 (1.4) and 1.5:1 (1.5) in Comparative Example 51 and Examples 149 to 156, respectively, and mixed. In turn, the mixtures were heated up to 80° C. for melting nickel nitrate hexahydrate, and kneaded. The resulting mixtures were calcined at 380° C. in air for 24 hours (preliminary calcining step). The resulting substances were cooled and pulverized in mortars. Thereafter, the resulting powdery substances were calcined at 800° C. in an atmosphere of 100% oxygen for 2 hours (main calcining step), and the resulting products were pulverized. Thus, positive electrode active materials of Comparative Example 51 and Examples 149 to 156 were prepared. These positive electrode active materials were each divided into two portions, one of which was exposed to air for 12 hours and the other of which was unexposed to air.

Fabrication of Batteries

Coin-type batteries were fabricated in substantially the same manner as in Example 146, except that the positive electrode active materials $LiNiO_2$ thus prepared (those exposed and unexposed to air) were used for the positive electrodes thereof and the electrolytic solution was prepared by dissolving an electrolytic salt $LiPF_6$ in a concentration of 1 mol/l in a solvent mixture containing ethylene carbonate and diethyl carbonate in a volume ratio of 1:1.

Evaluation of Batteries

The coin-type batteries thus prepared were each evaluated in the same manner as in Example 146. The relationship between the Li/Ni ratio in the starting material mixture and the discharge capacity in the first cycle for the batteries utilizing the positive electrode active materials exposed and unexposed to air is shown in FIG. 21.

Figure 21:
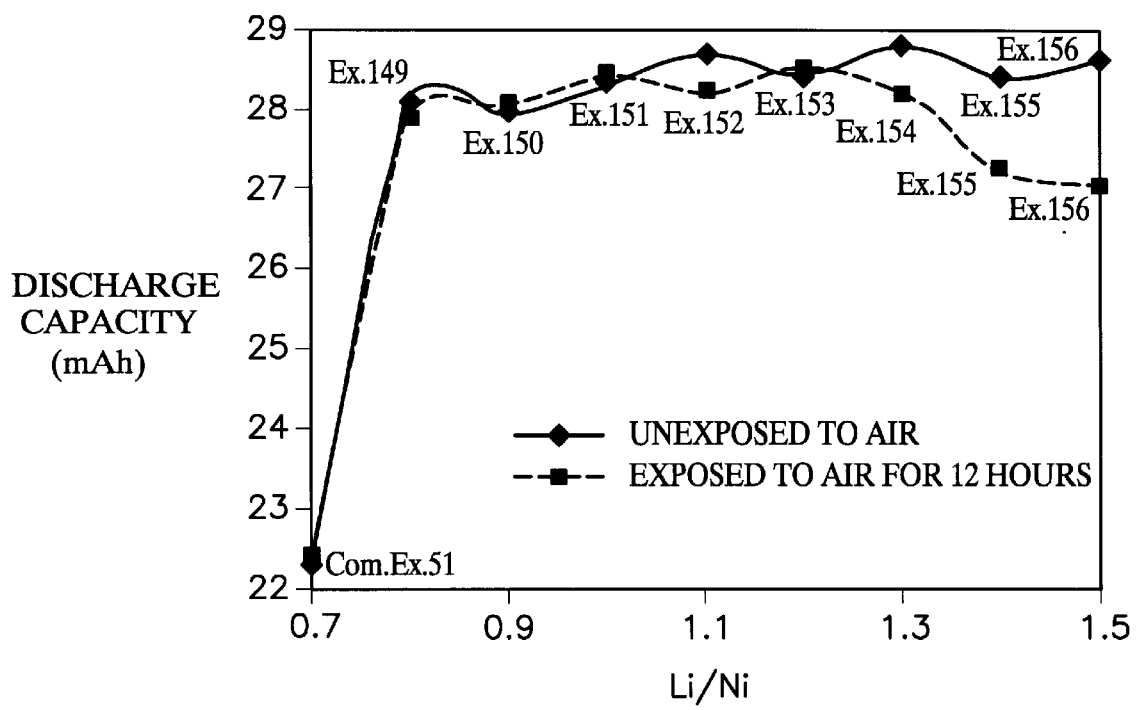
FIG. 21 is a graphical representation illustrating the relationship between an Li/Ni ratio and a discharge capacity in the first cycle in accordance with Examples 149 to 156 and Comparative Example 51.

As can be seen from FIG. 21, the molar ratio is preferably Ni:Li=1:0.8 or greater (Li/Ni=0.8 or higher) in terms of the discharge capacity, more preferably Ni:Li=1:0.8 to 1.3 (Li/Ni=0.8 to 1.3) in terms of the stability of the active material in air, further more preferably Ni:Li=1:1.0 to 1.3 (Li/Ni=1.0 to 1.3) in terms of the stability in the discharge capacity.

Examples 157 to 164 and Comparative Example 52

Synthesis of $LiNiO_2$

Lithium acetate dihydrate and nickel nitrate hexahydrate were weighed in Li:Ni ratios (Li/Ni ratios) of 0.7:1 (0.7), 0.8:1 (0.8), 0.9:1 (0.9), 1.0:1 (1.0), 1.1:1 (1.1), 1.2:1 (1.2), 1.3:1 (1.3), 1.4:1 (1.4) and 1.5:1 (1.5) in Comparative Example 52 and Examples 157 to 164, respectively, and mixed in mortars. The mixtures were melted at 80° C., and stirred with a stirring rod. In turn, the melt mixtures were calcined at 380° C. in air for 24 hours (preliminary calcining step). The resulting substances were once cooled and calcined at 750° C. in an atmosphere of 100% oxygen for 5 hours (main calcining step), and the resulting products were pulverized. Thus, positive electrode active materials of Comparative Example 52 and Examples 157 to 164 were prepared. These positive electrode active materials were each divided into two portions, one of which was exposed to air for 12 hours and the other of which was unexposed to air.

Fabrication and Evaluation of Batteries

Figure 22:
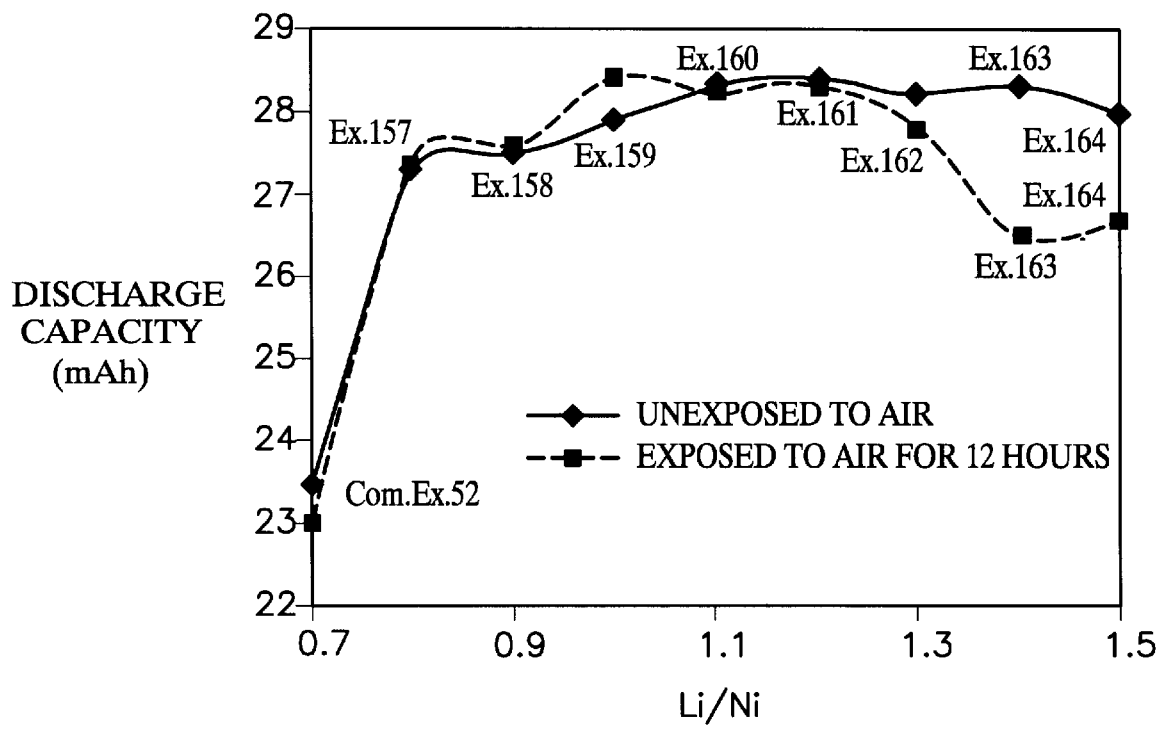
FIG. 22 is a graphical representation illustrating the relationship between an Li/Ni ratio and a discharge capacity in the first cycle in accordance with Examples 157 to 164 and Comparative Example 52.

Coin-type batteries were fabricated in substantially the same manner as in Example 149, except that the positive electrode active materials $LiNiO_2$ thus prepared were used for the positive electrodes thereof, and evaluated in the same manner as in Example 149. Results are shown in FIG. 22. A comparison between Examples 157 to 164 and Comparative Example 52 supports the conclusion drawn from the comparison between Examples 149 to 156 and Comparative Example 51.

Examples 165 to 172 and Comparative Example 53

Synthesis of $LiNiO_2$

Lithium acetate dehydrate and nickel nitrate hexahydrate were weighed in Li:Ni ratios (Li/Ni ratios) of 0.7:1 (0.7), 0.8:1 (0.8), 0.9:1 (0.9), 1:1.0 (1.0), 1.1:1 (1.1), 1.2:1 (1.2), 1.3:1 (1.3), 1.4:1 (1.4) and 1.5:1 (1.5) in Comparative Example 53 and Examples 165 to 172, respectively, and mixed. Then, 1.2 mols of oxalic acid with respect to 1 mol of nickel nitrate hexahydrate was added to each of the mixtures and mixed therewith. The resulting mixtures were melted at 80° C., and stirred with a stirring rod. In turn, the melt mixtures were calcined at 400° C. in air for 24 hours (preliminary calcining step). The resulting substances were once cooled and calcined at 800° C. in an atmosphere of 100% oxygen for 2 hours (main calcining step), and the resulting products were pulverized. Thus, positive electrode active materials of Comparative Example 53 and Examples 165 to 172 were prepared. These positive electrode active materials were each divided into two portions, one of which was exposed to air for 12 hours and the other of which was unexposed to air.

Fabrication and Evaluation of Batteries

Figure 23:
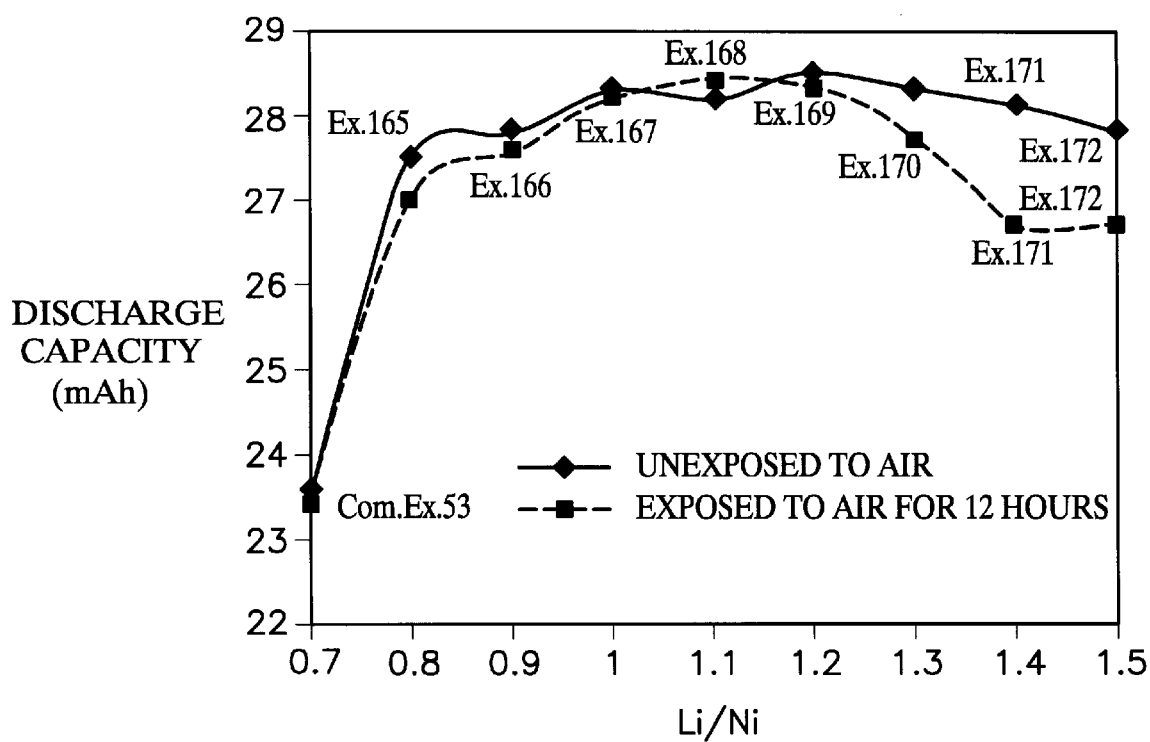
FIG. 23 is a graphical representation illustrating the relationship between an Li/Ni ratio and a discharge capacity in the first cycle in accordance with Examples 165 to 172 and Comparative Example 53.

Coin-type batteries were fabricated in substantially the same manner as in Example 149, except that the positive electrode active materials $LiNiO_2$ thus prepared were used for the positive electrodes thereof, and evaluated in the same manner as in Example 149. Results are shown in FIG. 23. A comparison between Examples 165 to 172 and Comparative Example 53 supports the conclusion drawn from the comparison between Examples 149 to 156 and Comparative Example 51.

Examples 173 to 178 and Comparative Examples 54 to 57

Synthesis of $LiNiO_2$

Anhydrous lithium hydroxide and nickel nitrate hexahydrate were weighed in an Li:Ni ratio (Li/Ni ratio) of 1.1:1 (1.1), and mixed. Then, 1.5 mol, 1.7 mol, 1.8 mol, 2.0 mol, 2.2 mol, 2.5 mol, 2.8 mol, 3.0 mol, 3.2 mol and 3.5 mol of acetic acid with respect to 1 mol of nickel nitrate hexahydrate were added to the mixture in Comparative Examples 54 and 55, Examples 173 to 178 and Comparative Examples 56 and 57, respectively, and mixed therewith. The resulting mixtures were melted at 100° C., and stirred. In turn, the melt mixtures were calcined at 400° C. in air for 24 hours (preliminary calcining step). The resulting substances were cooled and pulverized in mortars. Thereafter, the resulting powdery substances were calcined at 800° C. in an oxygen atmosphere for 2 hours (main calcining step), and the resulting products were pulverized. Thus, positive electrode active materials of Examples 173 to 178 and Comparative Examples 54 to 57 were prepared.

During the preliminary calcination and the main calcination, Comparative Examples 54 and 55 (in which 1.5 mol and 1.7 mol of acetic acid were added, respectively) and Example 173 (in which 1.8 mol of acetic acid was added) were observed for checking the generation of nitrogen oxides. It was visually observed that nitrogen oxides were generated in Comparative Examples 54 and 55 and that the generation of nitrogen oxides was suppressed (though a very small amount of nitrogen oxides were generated) in Example 173.

Fabrication and Evaluation of Batteries

Coin-type batteries were fabricated in substantially the same manner as in Example 146, except that the positive electrode active materials $LiNiO_2$ thus prepared were used for the positive electrodes thereof.

Figure 24:
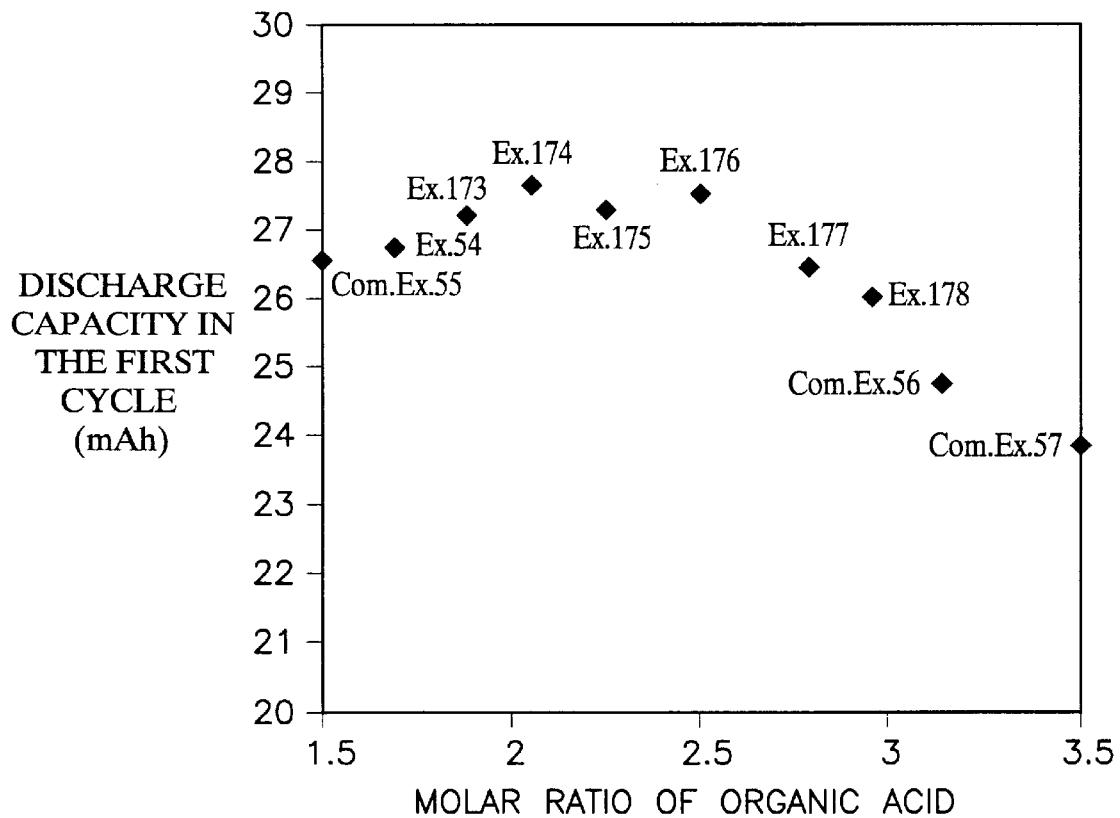
FIG. 24 is a graphical representation illustrating the relationship between the proportion of an organic acid with respect to 1 mol of nickel nitrate and a discharge capacity in the first cycle in accordance with Examples 173 to 178 and Comparative Examples 54 to 57.

The coin-type batteries were each evaluated in the same manner as in Example 146. The relationship between the discharge capacity in the first cycle and the molar ratio of acetic acid to nickel nitrate hexahydrate is shown in FIG. 24.

Where the molar ratio of acetic acid is greater than 3 mol, the discharge capacity is reduced as shown in FIG. 24. This is because carbon in acetic acid remains to produce impurities during the main calcination. Where the molar ratio of acetic acid is less than 1.8 mol, nitrogen oxides are generated in a great amount during the preliminary calcination and the main calcination. This is not preferable for the production process. Therefore, a monovalent organic acid is preferably added in a molar ratio of 1.8 mol to 3 mol with respect to 1 mol of nickel nitrate.

Examples 179 to 183 and Comparative Examples 58 to 61

Synthesis of $LiNiO_2$

Anhydrous lithium hydroxide and nickel nitrate hexahydrate were weighed in a ratio of Li:Ni=1.1:1 (Li/Ni=1.1), and mixed. Then, 0.7 mol, 0.8 mol, 0.9 mol, 1.0 mol, 1.2 mol, 1.4 mol, 1.5 mol, 1.6 mol and 1.8 mol of oxalic acid with respect to 1 mol of nickel nitrate hexahydrate were each added to the mixture in Comparative Examples 58 and 59, Examples 179 to 183 and Comparative Examples 60 and 61, respectively, and mixed therewith. The resulting mixtures were melted at 100° C., and stirred. In turn, the melt mixtures were calcined at 400° C. in air for 24 hours (preliminary calcining step). The resulting substances were cooled and pulverized in mortars. Thereafter, the resulting powdery substances were calcined at 800° C. in an oxygen atmosphere for 2 hours (main calcining step), and the resulting products were pulverized. Thus, positive electrode active materials of Examples 179 to 183 and Comparative Examples 58 to 61 were prepared.

During the preliminary calcination and the main calcination, Comparative Examples 58 and 59 (in which 0.7 mol and 0.8 mol of oxalic acid were added, respectively) and Example 179 (in which 0.9 mol of oxalic acid was added) were observed for checking the generation of nitrogen oxides. It was visually observed that nitrogen oxides were generated in Comparative Examples 58 and 59 and that the generation of nitrogen oxides was suppressed (though a very small amount of nitrogen oxides were generated) in Example 179.

Fabrication and Evaluation of Batteries

Coin-type batteries were fabricated in substantially the same manner as in Example 146, except that the positive electrode active materials $LiNiO_2$ thus prepared were used for the positive electrodes thereof.

Figure 25:
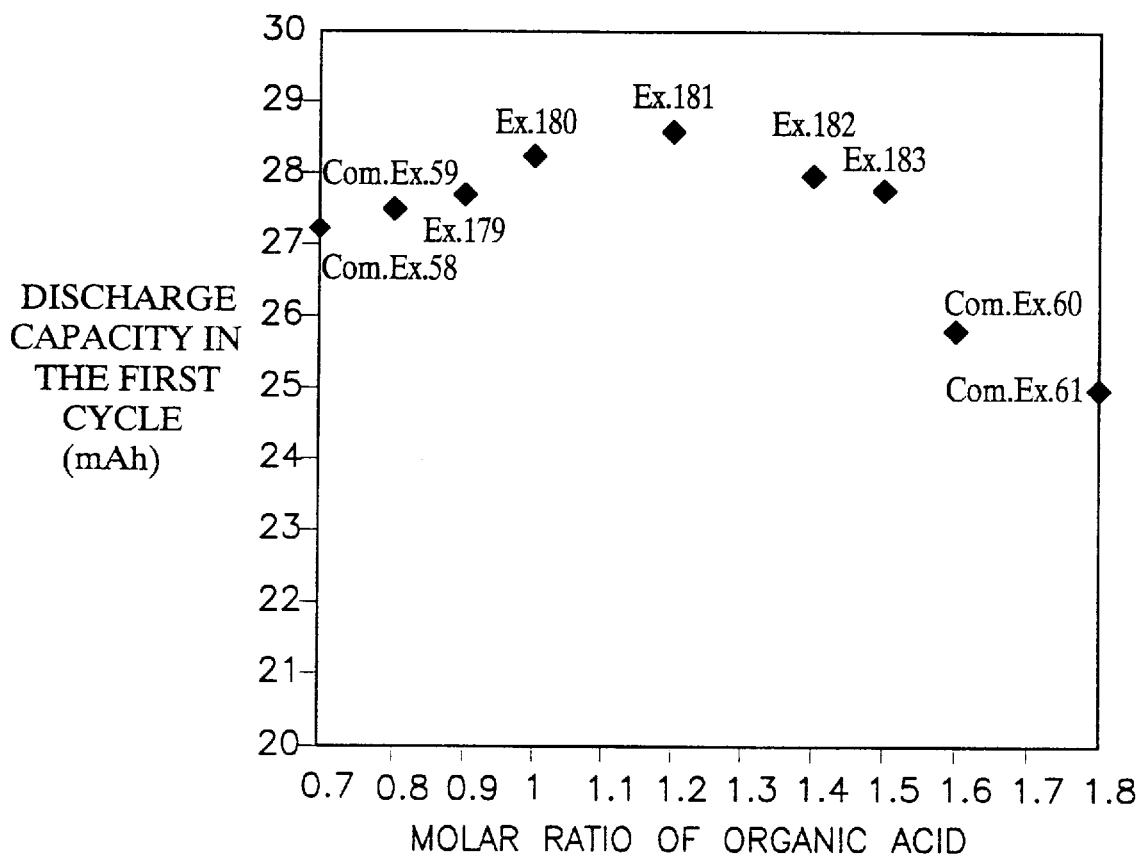
FIG. 25 is a graphical representation illustrating the relationship between the proportion of an organic acid with respect to 1 mol of nickel nitrate and a discharge capacity in the first cycle in accordance with Examples 179 to 183 and Comparative Examples 58 to 61.

The coin-type batteries were each evaluated in the same manner as in Example 146. The relationship between the discharge capacity in the first cycle and the molar ratio of oxalic acid to nickel nitrate hexahydrate is shown in FIG. 25.

Where the molar ratio of oxalic acid is greater than 1.5 mols, the discharge capacity is reduced as shown in FIG. 25. This is because carbon in oxalic acid remains to produce impurities during the main calcination. Where the molar ratio of oxalic acid is less than 0.9 mol, nitrogen oxides are generated in a great amount during the preliminary calcination and the main calcination. This is not preferable for the production process. Therefore, a divalent organic acid is preferably added in a molar ratio of 0.9 mol to 1.5 mol, more preferably 1.0 mol to 1.4 mol (in terms of the discharge capacity), with respect to 1 mol of nickel nitrate.

Example 184

Figure 26:
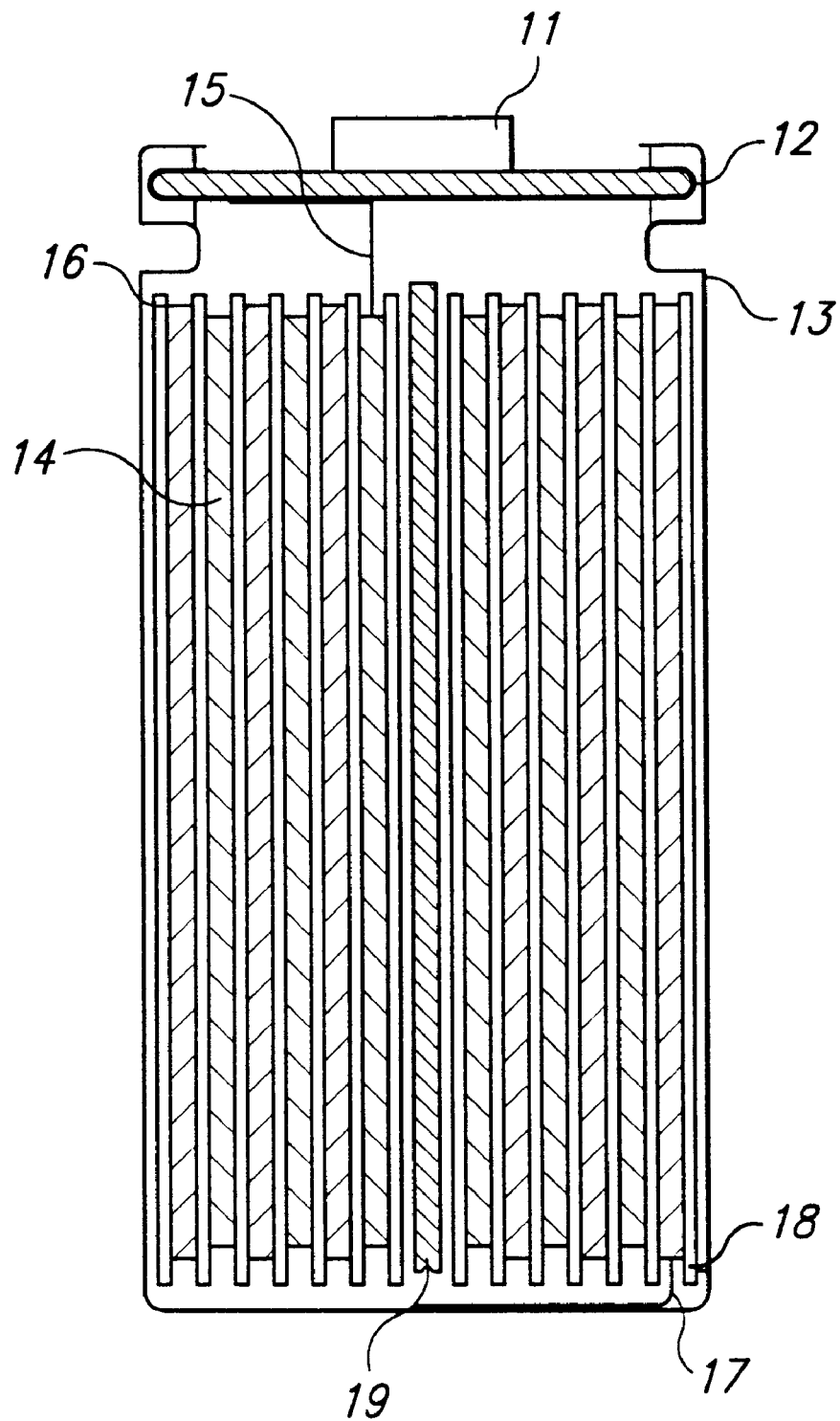
FIG. 26 is a schematic sectional view illustrating the construction of cylindrical batteries fabricated in Examples 184 to 186.

A cylindrical battery as shown in FIG. 26 was fabricated in the following manner.

First, a positive electrode 14 was prepared. More specifically, 100 parts by weight of the positive electrode active material $LiNiO_2$ prepared in Example 47, 7 parts by weight of acetylene black as a conductive material and 10 parts by weight of polyvinylidene fluoride as a binder were mixed in N-methyl-2-pyrrolidone as a dispersant, and the mixture was kneaded to afford a positive electrode paste. In turn, the positive electrode paste was applied on the both sides of an aluminum foil collector having a thickness of 20 μm and dried. Then, the resulting positive electrode composite was rolled, and cut into an elongate strip. A positive electrode lead 15 of an aluminum tab was spot-welded to one end of the positive electrode strip. Thus, the positive electrode 14 was prepared. The content of the positive electrode active material $LiNiO_2$ in the positive electrode was 40 mg/cm$^2$.

Next, a negative electrode 16 was prepared. More specifically, 100 parts by weight of synthetic graphite (particle diameter: 8 μm, $d_{002}$: 0.337 nm, Lc: 25 nm, La: 13 nm, R value: 0, specific surface area: 12 m$^2$/g) as a negative electrode active material and 10 parts by weight of polyvinylidene fluoride as a binder were mixed in N-methyl-2-pyrrolidone as a dispersant to afford a negative electrode paste. In turn, the negative electrode paste was applied on the both sides of a copper foil collector having a thickness of 18 μm and dried. Then, the resulting negative electrode composite was rolled, and cut into an elongate strip. A negative electrode lead 17 of a nickel tab was spot-welded to one end of the negative electrode strip. Thus, the negative electrode 16 was prepared. The content of graphite of the negative electrode active material in the negative electrode was 20 mg/cm$^2$.

The positive electrode 14 and the negative electrode 16 were joined to face opposite to each other with a polyethylene microporous separator 18 interposed therebetween, and spirally wound into an electrode roll. The electrode roll was inserted into an electrode case 13 of stainless (diameter: 17 mm, height: 50 mm) with the positive electrode lead 15 located upward and with the negative electrode lead 17 located downward. Then, the negative electrode lead 17 was spot-welded to a bottom of the battery case 13, and the positive electrode lead 15 was spot-welded to a positive electrode cap 11 provided with a safety valve. A center pin 19 (stainless tube having a diameter of 3.4 mm and a length of 40 mm) was inserted into the center of the electrode roll for prevention of the slack of the electrode roll. An electrolytic solution in which 1 mol/l lithium phosphorus hexafluoride as an electrolyte was dissolved in a solvent mixture containing ethylene carbonate and diethyl carbonate in a ratio of 1:1 was poured in the battery case 13, and the positive electrode cap 11 was press-fitted onto the battery case 13 with an insulation packing interposed therebetween. Thus, the cylindrical battery was fabricated.

In a charge-discharge test, the battery was charged up to an upper voltage of 4.2 V at a constant charge current of 500 mA for 3 hours, and discharged to a lower voltage of 2.75 V at a constant discharge current of 100 mA in a constant temperature bath kept at 25° C. As a result, the discharge capacity was 905 mAh in the first cycle and 829 mAh in the 50th cycle.

Example 185

A cylindrical battery as shown in FIG. 26 was fabricated in substantially the same manner as in Example 184, except that the positive electrode active material prepared in Example 59 was used. The charge-discharge test was performed on the battery thus fabricated in the same manner as in Example 184. As a result, the discharge capacity was 895 mAh in the first cycle and 811 mAh in the 50th cycle.

Example 186

A cylindrical battery as shown in FIG. 26 was fabricated in substantially the same manner as in Example 184, except that the positive electrode active material prepared in Example 142 was used. The charge-discharge test was performed on the battery thus fabricated in the same manner as in Example 184. As a result, the discharge capacity was 911 mAh in the first cycle and 817 mAh in the 50th cycle.

Examples 187 to 190
Synthesis of Active Materials

Lithium hydroxide, nickel nitrate hexahydrate and cobalt nitrate hexahydrate were weighed in Li:Ni:Co ratios of 1.1:0.9:0.1, 1.1:0.8:0.2, 1.1:0.7:0.3 and 1.1:0.6:0.4 in Examples 187 to 190, respectively, and mixed. In turn, the mixtures were melted at 80° C. and then kneaded. The resulting mixtures were calcined at 400° C. in air for 24 hours (preliminary calcining step). The resulting substances were cooled and pulverized in mortars. Thereafter, the resulting substances were calcined at 700° C. in an oxygen atmosphere for 5 hours (main calcining step), and were pulverized. Thus, positive electrode active materials of $LiNi_{0.9}Co_{0.1}O_2$ (Example 187), $LiNi_{0.8}Co_{0.2}O_2$ (Example 188), $LiNi_{0.75}Co_{0.25}O_2$ (Example 189) and $LiNi_{0.55}Co_{0.45}O_2$ (Example 190) were prepared.

Preparation and Evaluation of Electrodes

Electrodes were prepared and evaluated in the same manner as in Example 1, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 157, 157, 154 and 153 mAh/g respectively.

The relationship between the main calcining temperature and the discharge capacity in the first cycle was evaluated for the case of Li:Ni:Co=1.1:0.8:0.2 in the same manner as in Examples 3 to 8 and Comparative Examples 3 to 5. The result was almost the same as shown in FIG. 1. The relationship between the oxygen concentration at the main calcining step and the discharge capacity in the first cycle was evaluated for the case of Li:Ni:Co=1.1:0.8:0.2 in the same manner as in Examples 9 to 14 and Comparative Example 6. The result was almost the same as shown in FIG. 2. The relationship between the Li/(Ni+Co) ratio in the starting material mixture and the discharge capacity in the first cycle was evaluated for the case of Li:(Ni+Co)=0.7:1 to 1.5:1 and Ni:Co=0.8:0.2 in the same manner as in Examples 149 to 156 and Comparative Example 51. The result was almost the same as shown in FIG. 21.

Comparative Example 62
Synthesis of Active Material

Lithium hydroxide, nickel oxyhydroxide (NiOOH) and cobalt oxide ($Co_3O_4$) were weighed in a ratio of Li:Ni:Co= 1.1:0.8:0.2, and mixed in a mortar. The mixture was press-molded into a pellet by applying thereto a pressure of 100 Kg/cm$^2$. The pellet was calcined at 800° C. in an oxygen atmosphere for 2 hours. Thus, an active material of $LiNi_{0.8}Co_{0.2}O_2$ was prepared.

Preparation and Evaluation of Electrode

An electrode was prepared and evaluated in the same manner as in Example 1. The discharge capacity in the first cycle was 138 mAh/g.

Comparative Example 63
Synthesis of Active Material

Lithium hydroxide, nickel chloride and cobalt chloride were weighed in a ratio of Li:Ni:Co=1.1:0.8:0.2, and each dissolved in water. The aqueous solution of nickel chloride and the aqueous solution of cobalt chloride were mixed. The aqueous solution of lithium hydroxide was added thereto little by little with stirring. The solution mixture was continuously stirred at 30° C. for 5 hours and then dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of $LiNi_{0.8}Co_{0.2}O_2$ was prepared.
Preparation and Evaluation of Electrode
An electrode was prepared and evaluated in the same manner as in Example 1. The discharge capacity in the first cycle was 135 mAh/g.

Comparative Example 64
Synthesis of Active Material
Lithium hydroxide, nickel hydroxide and cobalt oxide ($Co_3O_4$) were weighed in a ratio of Li:Ni:Co=1.1:0.8:0.2, and mixed in a mortar with a small amount of water added as dispersant. The mixture was dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of $LiNi_{0.8}Co_{0.2}O_2$ was prepared.
Preparation and Evaluation of Electrode
An electrode was prepared and evaluated in the same manner as in Example 1. The discharge capacity in the first cycle was 133 mAh/g.

Comparative Example 65
Synthesis of Active Material
Lithium chloride, nickel oxide (NiO) and cobalt oxide ($Co_3O_4$) were weighed in a ratio of Li:Ni:Co=1.1:0.8:0.2. Lithium chloride was dissolved in water. Nickel oxide and cobalt oxide were mixed. To the mixture, the aqueous solution of lithium chloride was added little by little with kneading. The resulting mixture was continuously kneaded at 30° C. for 5 hours, and then dried at 90° C. to 100° C. The resulting solid substance was pulverized, and then press-molded into a pellet by applying thereto a pressure of 100 Kg/cm$^2$. The pellet was calcined at 800° C. in an oxygen atmosphere for 2 hours. Thus, an active material of $LiNi_{0.8}Co_{0.2}O_2$ was prepared.
Preparation and Evaluation of Electrode
An electrode was prepared and evaluated in the same manner as in Example 1. The discharge capacity in the first cycle was 137 mAh/g.
A comparison between Examples 187 to 190 and Comparative Examples 62 to 65 indicates that, by the process of the present invention, lithium, nickel and cobalt are more uniformly mixed before the calcination and the discharge capacity is improved.

Examples 191 to 194
Synthesis of Active Materials
Lithium hydroxide, nickel nitrate hexahydrate and aluminum nitrate enneahydrate were weighed in Li:Ni:Al ratios of 1.1:0.95:0.05, 1.1:0.9:0.1, 1.1:0.85:0.15 and 1.1:0.8:0.2 in Examples 191 to 194, respectively. Nickel nitrate hexahydrate was melted at 80° C. Lithium hydroxide and aluminum nitrate enneahydrate were heated to 80° C. and mixed with molten nickel nitrate hexahydrate at 80° C. The resulting mixtures were kneaded and then calcined at 400° C. in air for 24 hours (preliminary calcining step). The resulting substances were cooled and pulverized in mortars. Thereafter, the resulting substances were calcined at 700° C. in an oxygen atmosphere for 5 hours (main calcining step) and were pulverized. Thus, positive electrode active materials of $LiNi_{0.95}Al_{0.15}O_2$ (Example 191), $LiNi_{0.9}Al_{0.1}O_2$ (Example 192), $LiNi_{0.85}Al_{0.15}O_2$ (Example 193) and $LiNi_{0.8}Al_{0.2}O_2$ (Example 194) were prepared.
Preparation and Evaluation of Electrodes
Electrodes were prepared and evaluated in the same manner as in Example 1, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.
The discharge capacities in the first cycle were 153, 154, 151 and 151 mAh/g respectively.
The relationship between the main calcining temperature and the discharge capacity in the first cycle was evaluated for the case of Li:Ni:Al=1.1:0.9:0.1 in the same manner as in Examples 3 to 8 and Comparative Examples 3 to 5. The result was almost the same as shown in FIG. 1. The relationship between the oxygen concentration at the main calcining step and the discharge capacity in the first cycle was evaluated for the case of Li:Ni:Al=1.1:0.9:0.1 in the same manner as in Examples 9 to 14 and Comparative Example 6. The result was almost the same as shown in FIG. 2. The relationship between the Li/(Ni+Al) ratio in the starting material mixture and the discharge capacity in the first cycle was evaluated for the case of Li:(Ni+Al)=0.7:1 to 1.5:1 and Ni:Al=0.9:0.1 in the same manner as in Examples 149 to 1 5 6 and Comparative Example 51. The result was almost the same as shown in FIG. 21.

Comparative Example 66
Synthesis of Active Material
Lithium hydroxide, nickel oxyhydroxide (NiOOH) and aluminum oxide ($Al_2O_3$) were weighed in a ratio of Li:Ni:Al=1.1:0.9:0.1, and mixed in a mortar. The mixture was press-molded into a pellet by applying thereto a pressure of 100 Kg/cm$^2$. The pellet was calcined at 800° C. in an oxygen atmosphere for 2 hours. Thus, an active material of $LiNi_{0.9}Al_{0.1}O_2$ was prepared.
Preparation and Evaluation of Electrode
An electrode was prepared and evaluated in the same manner as in Example 1. The discharge capacity in the first cycle was 125 mAh/g.

Comparative Example 67
Synthesis of Active Material
Lithium hydroxide, nickel chloride and aluminum chloride were weighed in a ratio of Li:Ni:Al=1.1:0.9:0.1, and each dissolved in water. The aqueous solution of nickel chloride and the aqueous solution of aluminum chloride were mixed. The aqueous solution of lithium hydroxide was added thereto little by little with stirring. The solution mixture was continuously stirred at 30° C. for 5 hours and then dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of $LiNi_{0.9}Al_{0.1}O_2$ was prepared.
Preparation and Evaluation of Electrode
An electrode was prepared and evaluated in the same manner as in Example 1. The discharge capacity in the first cycle was 130 mAh/g.

Comparative Example 68
Synthesis of Active Material
Lithium hydroxide, nickel hydroxide and aluminum oxide ($Al_3O_3$) were weighed in a ratio of Li:Ni:Al=1.1:0.9:0.1, and mixed in a mortar with a small amount of water as dispersant. The mixture was dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of LiNi$_{0.9}$Al$_{0.1}$O$_2$ was prepared.
Preparation and Evaluation of Electrode An electrode was prepared and evaluated in the same manner as in Example 1. The discharge capacity in the first cycle was 121 mAh/g.

Comparative Example 69

Lithium chloride, nickel oxide (NiO) and aluminum oxide (Al$_2$O$_3$) were weighed in a ratio of Li:Ni:Al=1.1:0.9:0.1. Lithium chloride was dissolved in water. Nickel oxide and aluminum oxide were mixed, and then the aqueous solution of lithium chloride was added thereto little by little with kneading. The resulting mixture was continuously kneaded at 30° C. for 5 hours and then dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of LiNi$_{0.9}$Al$_{0.1}$O$_2$ was prepared.
Preparation and Evaluation of Electrode An electrode was prepared and evaluated in the same manner as in Example 1. The discharge capacity in the first cycle was 102 mAh/g.

A comparison between Examples 191 to 194 and Comparative Examples 66 to 69 indicates that, by the process of the present invention, lithium, nickel and aluminum are more uniformly mixed before the calcination and the discharge capacity is improved.

Examples 195 to 197
Synthesis of Active Materials

Lithium hydroxide, nickel nitrate hexahydrate and zinc oxide were weighed in Li:Ni:Zn ratios of 1.1:0.95:0.05, 1.1:0.9:0.1, and 1.1:0.85:0.15 in Examples 195 to 197, respectively, and mixed. In turn, the mixtures were melted at 80° C. and then kneaded. The resulting mixtures were calcined at 400° C. in air for 24 hours (preliminary calcining step). The resulting substances were cooled and pulverized in mortars. Thereafter, the resulting substances were calcined at 700° C. in an oxygen atmosphere for 5 hours (main calcining step) and were pulverized. Thus, positive electrode active materials of LiNi$_{0.95}$Zn$_{0.05}$O$_2$ (Example 195), LiNi$_{0.9}$Zn$_{0.1}$O$_2$ (Example 196), and LiNi$_{0.85}$Zn$_{0.15}$O$_2$ (Example 197) were prepared.
Preparation and Evaluation of Electrodes Electrodes were prepared and evaluated in the same manner as in Example 1, except that the electrolytic solution was prepared by dissolving 1 mol/l lithium phosphorus hexafluoride (LiPF$_6$) in a solvent mixture containing propylene carbonate and dimethyl carbonate in a volume ratio of 1:1.

The discharge capacities in the first cycle were 155, 152, and 151 mAh/g respectively.

The relationship between the main calcining temperature and the discharge capacity in the first cycle was evaluated for the case of Li:Ni:Zn=1.1:0.9:0.1 in the same manner as in Examples 3 to 8 and Comparative Examples 3 to 5. The result was almost the same as shown in FIG. 1. The relationship between the oxygen concentration at the main calcining step and the discharge capacity in the first cycle was evaluated for the case of Li:Ni:Zn=1.1:0.9:0.1 in the same manner as in Examples 9 to 14 and Comparative Example 6. The result was almost the same as shown in FIG. 2. The relationship between the Li/(Ni+Zn) ratio in the starting material mixture and the discharge capacity in the first cycle was evaluated for the case of Li:(Ni+Zn)=0.7:1 to 1.5:1 and Ni:Zn=0.9:0.1 in the same manner as in Examples 149 to 156 and Comparative Example 51. The result was almost the same as shown in FIG. 21.

Comparative Example 70
Synthesis of Active Material

Lithium hydroxide, nickel oxyhydroxide (NiOOH) and zinc oxide (ZnO) were weighed in a ratio of Li:Ni:Zn=1.1:0.9:0.1, and mixed in a mortar. The mixture was press-molded into a pellet by applying thereto a pressure of 100 Kg/cm$^2$. The pellet was calcined at 800° C. in an oxygen atmosphere for 2 hours. Thus, an active material of LiNi$_{0.9}$Zn$_{0.1}$O$_2$ was prepared.
Preparation and Evaluation of Electrode An electrode was prepared and evaluated in the same manner as in Example 1. The discharge capacity in the first cycle was 122 mAh/g.

Comparative Example 71
Synthesis of Active Material

Lithium hydroxide, nickel chloride and zinc chloride were weighed in a ratio of Li:Ni:Zn=1.1:0.9:0.1, and each dissolved in water. The aqueous solution of nickel chloride and the aqueous solution of zinc chloride were mixed. The aqueous solution of lithium hydroxide was added thereto little by little with stirring. The solution mixture was continuously stirred at 30° C. for 5 hours and then dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of LiNi$_{0.9}$Zn$_{0.1}$O$_2$ was prepared.
Preparation and Evaluation of Electrode An electrode was prepared and evaluated in the same manner as in Example 1. The discharge capacity in the first cycle was 128 mAh/g.

Comparative Example 72
Synthesis of Active Material

Lithium hydroxide, nickel hydroxide and Zinc oxide (ZnO) were weighed in a ratio of Li:Ni:Zn=1.1:0.9:0.1, and mixed in a mortar with a small amount of water as dispersant. The mixture was dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of LiNi$_{0.9}$Zn$_{0.1}$O$_2$ was prepared.
Preparation and Evaluation of Electrode An electrode was prepared and evaluated in the same manner as in Example 1. The discharge capacity in the first cycle was 123 mAh/g.

Comparative Example 73

Lithium chloride, nickel oxide (NiO) and zinc oxide (ZnO) were weighed in a ratio of Li:Ni:Zn=1.1:0.9:0.1. Lithium chloride was dissolved in water. Nickel oxide and zinc oxide were mixed, and then the aqueous solution of lithium chloride was added thereto little by little with kneading. The resulting mixture was continuously kneaded at 30° C. for 5 hours and then dried at 90° C. to 100° C. The resulting solid substance was pulverized and then press-molded into a pellet by applying thereto a pressure of 100 Kg/cm$^2$. The pellet was calcined at 800° C. in an oxygen atmosphere for 2 hours. Thus, an active material of $LiNi_{0.9}Zn_{0.1}O_2$ was prepared.

Preparation and Evaluation of Electrode

An electrode was prepared and evaluated in the same manner as in Example 1. The discharge capacity in the first cycle was 126 mAh/g.

A comparison between Examples 195 to 197 and Comparative Examples 70 to 73 indicates that, by the process of the present invention, lithium, nickel and zinc are more uniformly mixed before the calcination and the discharge capacity is improved.

A comparison between Examples 187 to 197 and Comparative Examples 62 to 73 shows that the process of the present invention is superior in uniform mixture of lithium, nickel and other element before the calcination and also improves the discharge capacity. Therefore, the process of the invention is also proved to be an excellent process for the manufacture of $LiNi_{1-x}M_xO_2$ wherein $0<X<0.5$ and M is a transition metal or a 3B-, 4B- or 5B-group element.

Examples 198 to 201

Synthesis of Active Materials

Lithium acetate dihydrate, nickel nitrate hexahydrate and cobalt nitrate hexahydrate were weighed in Li:Ni:Co ratios of 1.1:0.9:0.1, 1.1:0.8:0.2, 1.1:0.7:0.3 and 1.1:0.6:0.4 in Examples 198 to 201, respectively, and mixed in mortars. In turn, the mixtures were melted at 100° C. and stirred with a stirring rod. The resulting mixtures were calcined at 500° C. in air for 18 hours (preliminary calcining step). The resulting substances were cooled and then calcined at 700° C. in an oxygen atmosphere for 10 hours (main calcining step). Thus, positive electrode active materials of $LiNi_{0.9}Co_{0.1}O_2$ (Example 198), $LiNi_{0.8}Co_{0.2}O_2$ (Example 199), $LiNi_{0.75}Co_{0.25}O_2$ (Example 200) and $LiNi_{0.55}Co_{0.45}O_2$ (Example 201) were prepared.

Preparation and Evaluation of Electrodes

Electrodes were prepared and evaluated in the same manner as in Example 58, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 155, 162, 158 and 160 mAh/g respectively.

The relationship between the main calcining temperature and the discharge capacity in the first cycle was evaluated for the case of Li:Ni:Co=1.1:0.8:0.2 in the same manner as in Examples 64 to 69 and Comparative Examples 30 to 32. The result was almost the same as shown in FIG. 10. The relationship between the oxygen concentration at the main calcining step and the discharge capacity in the first cycle was evaluated for the case of Li:Ni:Co=1.1:0.8:0.2 in the same manner as in Examples 70 to 75 and Comparative Example 33. The result was almost the same as shown in FIG. 11. The relationship between the Li/(Ni+Co) ratio in the starting material mixture and the discharge capacity in the first cycle was evaluated for the case of Li:(Ni+Co)= 0.7:1 to 1.5:1 and Ni:Co=0.8:0.2 in the same manner as in Examples 157 to 164 and Comparative Example 52. The result was almost the same as shown in FIG. 22.

A comparison between Examples 198 to 201 and Comparative Examples 62 to 65 indicates that, by the process of the present invention, lithium, nickel and cobalt are more uniformly mixed before the calcination and the discharge capacity is improved.

Examples 202 to 205

Synthesis of Active Materials

Lithium acetate dihydrate, nickel nitrate hexahydrate and aluminum nitrate enneahydrate were weighed in Li:Ni:Al ratios of 1.1:0.95:0.05, 1.1:0.9:0.1, 1.1:0.85:0.15 and 1.1:0.8:0.2 in Examples 202 to 205, respectively, and then mixed in mortars. The mixtures were melted at 100° C. and then stirred with a stirring rod. The resulting mixtures were calcined at 500° C. in air for 18 hours (preliminary calcining step). The resulting substances were cooled and then calcined at 700° C. in an oxygen atmosphere for 10 hours (main calcining step). Thus, positive electrode active materials of $LiNi_{0.95}Al_{0.05}O_2$ (Example 202), $LiNi_{0.9}Al_{0.1}O_2$ (Example 203), $LiNi_{0.85}Al_{0.15}O_2$ (Example 204) and $LiNi_{0.8}Al_{0.2}O_2$ (Example 205) were prepared.

Preparation and Evaluation of Electrodes

Electrodes were prepared and evaluated in the same manner as in Example 58, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 155, 154, 150 and 152 mAh/g respectively.

The relationship between the main calcining temperature and the discharge capacity in the first cycle was evaluated for the case of Li:Ni:Al=1.1:0.9:0.1 in the same manner as in Examples 64 to 69 and Comparative Examples 30 to 32. The result was almost the same as shown in FIG. 10. The relationship between the oxygen concentration at the main calcining step and the discharge capacity in the first cycle was evaluated for the case of Li:Ni:Al=1.1:0.9:0.1 in the same manner as in Examples 70 to 75 and Comparative Example 33. The result was almost the same as shown in FIG. 11. The relationship between the Li/(Ni+Al) ratio in the starting material mixture and the discharge capacity in the first cycle was evaluated for the case of Li:(Ni+Al)=0.7:1 to 1.5:1 and Ni:Al=0.9:0.1 in the same manner as in Examples 157 to 164 and Comparative Example 52. The result was almost the same as shown in FIG. 22.

A comparison between Examples 202 to 205 and Comparative Examples 66 to 69 indicates that, by the process of the present invention, lithium, nickel and aluminum are more uniformly mixed before the calcination and the discharge capacity is improved.

Examples 206 to 208

Synthesis of Active Materials

Lithium acetate dihydrate, nickel nitrate hexahydrate and zinc nitrate hexahydrate were weighed in Li:Ni:Zn ratios of 1.1:0.95:0.05, 1.1:0.9:0.1, and 1.1:0.85:0.15 in Examples 206 to 208, respectively, and mixed in mortars. In turn, the mixtures were melted at 100° C. and then stirred with a stirring rod. The resulting mixtures were calcined at 500° C. in air for 18 hours (preliminary calcining step). The resulting substances were cooled, and then calcined at 700° C. in an oxygen atmosphere for 10 hours (main calcining step). Thus, positive electrode active materials of $LiNi_{0.95}Zn_{0.05}O_2$ (Example 206), $LiNi_{0.9}Zn_{0.1}O_2$ (Example 207), and $LiNi_{0.85}Zn_{0.15}O_2$ (Example 208) were prepared.

Preparation and Evaluation of Electrodes

Electrodes were prepared and evaluated in the same manner as in Example 58, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 153, 153, and 150 mAh/g respectively.

The relationship between the main calcining temperature and the discharge capacity in the first cycle was evaluated for the case of Li:Ni:Zn=1.1:0.9:0.1 in the same manner as in Examples 64 to 69 and Comparative Examples 30 to 32. The result was almost the same as shown in FIG. 10. The relationship between the oxygen concentration at the main calcining step and the discharge capacity in the first cycle was evaluated for the case of Li:Ni:Zn=1.1:0.9:0.1 in the same manner as in Examples 70 to 75 and Comparative Example 33. The result was almost the same as shown in FIG. 11. The relationship between the Li/(Ni+Zn) ratio in the starting material mixture and the discharge capacity in the first cycle was evaluated for the case of Li:(Ni+Zn)=0.7:1 to 1.5:1 and Ni:Zn=0.9:0.1 in the same manner as in Examples 157 to 164 and Comparative Example 52. The result was almost the same as shown in FIG. 22.

A comparison between Examples 206 to 208 and Comparative Examples 70 to 73 indicates that, by the process of the present invention, lithium, nickel and zinc are more uniformly mixed before the calcination and the discharge capacity is improved.

A comparison between Examples 198 to 208 and Comparative Examples 62 to 73 shows that the process of the present invention is superior in uniform mixture of lithium, nickel and other element before the calcination and also improves the discharge capacity. Therefore, the process of the invention is proved to be an excellent process for the manufacture of $LiNi_{1-X}M_XO_2$ wherein $0<X<0.5$ and M is a transition metal or a 3B-, 4B- or 5B-group element.

Examples 209 to 212

Synthesis of Active Materials

Lithium acetate dihydrate, nickel nitrate hexahydrate and cobalt nitrate hexahydrate were weighed in Li:Ni:Co ratios of 1.1:0.9:0.1, 1.1:0.8:0.2, 1.1:0.7:0.3 and 1.1:0.6:0.4 in Examples 209 to 212, respectively, and mixed. Then, 1.2 mols of oxalic acid with respect to 1 mol of nickel nitrate hexahydrate were added to each of the mixtures and mixed therewith in mortars. The resulting mixtures were melted at 100° C. and then stirred with a stirring rod. The melt mixtures were calcined at 400° C. in air for 18 hours (preliminary calcining step). The resulting substances were cooled and then calcined at 700° C. in an oxygen atmosphere for 10 hours (main calcining step). Thus, positive electrode active materials of $LiNi_{0.9}Co_{0.1}O_2$ (Example 209), $LiNi_{0.8}Co_{0.2}O_2$ (Example 210), $LiNi_{0.7}Co_{0.3}O_2$ (Example 211) and $LiNi_{0.60}Co_{0.40}O_2$ (Example 212) were prepared.

Preparation and Evaluation of Electrodes

Electrodes were prepared and evaluated in the same manner as in Example 108, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 158, 163, 160 and 162 mAh/g respectively.

The relationship between the main calcining temperature and the discharge capacity in the first cycle was evaluated for the case of Li:Ni:Co=1.1:0.8:0.2 and the molar ratio of oxalic acid to nickel nitrate hexahydrate=1:1 in the same manner as in Examples 128 to 133 and Comparative Examples 47 to 49. The result was almost the same as shown in FIG. 18. The relationship between the oxygen concentration at the main calcining step and the discharge capacity in the first cycle was evaluated for the case of Li:Ni:Co=1.1:0.8:0.2 and the molar ratio of oxalic acid to nickel nitrate hexahydrate=1:1 in the same manner as in Examples 134 to 139 and Comparative Example 50. The result was almost the same as shown in FIG. 19. The relationship between the Li/(Ni+Co) ratio in the starting material mixture and the discharge capacity in the first cycle was evaluated for the case of Li:(Ni+Co)=0.7:1 to 1.5:1, Ni:Co=0.8:0.2 and the molar ratio of oxalic acid to nickel nitrate hexahydrate=1:1 in the same manner as in Examples 165 to 172 and Comparative Example 53. The result was almost the same as shown in FIG. 23.

A comparison between Examples 209 to 212 and Comparative Examples 62 to 65 indicates that, by the process of the present invention, lithium, nickel and cobalt are more uniformly mixed before the calcination and the discharge capacity is improved.

Examples 213 to 216

Synthesis of Active Materials

Lithium acetate dihydrate, nickel nitrate hexahydrate and aluminum nitrate enneahydrate were weighed in Li:Ni:Al ratios of 1.1:0.95:0.05, 1.1:0.9:0.1, 1.1:0.85:0.15 and 1.1:0.8:0.2 in Examples 213 to 216, respectively, and mixed. Then, 1.2 mols of oxalic acid with respect to 1 mol of nickel nitrate hexahydrate were added to each of the mixtures and mixed therewith in mortars. The resulting mixtures were melted at 100° C. and stirred with a stirring rod. The melt mixtures were calcined at 400° C. in air for 18 hours (preliminary calcining step). The resulting substances were cooled, then calcined at 700° C. in an oxygen atmosphere for 10 hours (main calcining step). Thus, positive electrode active materials of $LiNi_{0.95}Al_{0.05}O_2$ (Example 213), $LiNi_{0.9}Al_{0.1}O_2$ (Example 214), $LiNi_{0.85}Al_{0.15}O_2$ (Example 215) and $LiNi_{0.8}Al_{0.2}O_2$ (Example 216) were prepared.

Preparation and Evaluation of Electrodes

Electrodes were prepared and evaluated in the same manner as in Example 108, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 151, 154, 153 and 152 mAh/g respectively.

The relationship between the main calcining temperature and the discharge capacity in the first cycle was evaluated for the case of Li:Ni:Al=1.1:0.9:0.1 and the molar ratio of oxalic acid to nickel nitrate hexahydrate=1:1 in the same manner as in Examples 128 to 133 and Comparative Examples 47 to 49. The result was almost the same as shown in FIG. 18. The relationship between the oxygen concentration at the main calcining step and the discharge capacity in the first cycle was evaluated for the case of Li:Ni:Al=1.1:0.9:0.1 and the molar ratio of oxalic acid to nickel nitrate hexahydrate=1:1 in the same manner as in Examples 134 to 139 and Comparative Example 50. The result was almost the same as shown in FIG. 19. The relationship between the Li/(Ni+Al) ratio in the starting material mixture and the discharge capacity in the first cycle was evaluated for the case of Li:(Ni+Al)=0.7:1 to 1.5:1, Ni:Al=0.9:0.1 and the molar ratio of oxalic acid to nickel nitrate hexahydrate=1:1 in the same manner as in Examples 165 to 172 and Comparative Example 52. The result was almost the same as shown in FIG. 23.

A comparison between Examples 213 to 216 and Comparative Examples 66 to 69 indicates that, by the process of the present invention, lithium, nickel and aluminum are more uniformly mixed before the calcination and the discharge capacity is improved.

Examples 217 to 219

Synthesis of Active Materials

Lithium acetate dihydrate, nickel nitrate hexahydrate and zinc nitrate hexahydrate were weighed in Li:Ni:Zn ratios of 1.1:0.95:0.05, 1.1:0.9:0.1, and 1.1:0.85:0.15 in Examples 217 to 219, respectively, and mixed. Then, 1.2 mols of oxalic acid with respect to 1 mol of nickel nitrate hexahydrate were added to each of the mixtures and mixed therewith in mortars. The resulting mixtures were melted at 100° C. and then stirred with a stirring rod. The melt mixtures were calcined at 400° C. in air for 18 hours (preliminary calcining step). The resulting substances were cooled and then calcined at 700° C. in an oxygen atmosphere for 10 hours (main calcining step). Thus, positive electrode active materials of $LiNi_{0.95}Zn_{0.05}O_2$ (Example 217), $LiNi_{0.9}Zn_{0.1}O_2$ (Example 218), and $LiNi_{0.85}Zn_{0.15}O_2$ (Example 219) were prepared.

Preparation and Evaluation of Electrodes

Electrodes were prepared and evaluated in the same manner as in Example 108, except that the electrolytic solution was prepared by dissolving 1 mol/l lithium phosphorus hexafluoride ($LiPF_6$) in a solvent mixture containing propylene carbonate and dimethyl carbonate in a volume ratio of 1:1.

The discharge capacities in the first cycle were 154, 154, and 152 mAh/g respectively.

The relationship between the main calcining temperature and the discharge capacity in the first cycle was evaluated for the case of Li:Ni:Zn=1.1:0.9:0.1 and the molar ratio of oxalic acid to nickel nitrate hexahydrate=1:1 in the same manner as in Examples 128 to 133 and Comparative Examples 47 to 49. The result was almost the same as shown in FIG. 18. The relationship between the oxygen concentration at the main calcining step and the discharge capacity in the first cycle was evaluated for the case of Li:Ni:Zn=1.1:0.9:0.1 and the molar ratio of oxalic acid to nickel nitrate hexahydrate=1:1 in the same manner as in Examples 134 to 139 and Comparative Example 50. The result was almost the same as shown in FIG. 19. The relationship between the Li/(Ni+Zn) ratio in the starting material mixture and the discharge capacity in the first cycle was evaluated for the case of Li:(Ni+Zn)=0.7:1 to 1.5:1, Ni:Zn=0.9:0.1 and the molar ratio of oxalic acid to nickel nitrate hexahydrate=1:1 in the same manner as in Examples 165 to 172 and Comparative Example 53. The result was almost the same as shown in FIG. 23.

A comparison between Examples 217 to 219 and Comparative Examples 70 to 73 indicates that, by the process of the present invention, lithium, nickel and aluminum are more uniformly mixed before the calcination and the discharge capacity is improved.

A comparison between Examples 209 to 219 and Comparative Examples 62 to 73 shows that the process of the present invention is superior in uniform mixture of lithium, nickel and other element before the calcination and also improves the discharge capacity. Therefore, the process of the invention is proved to be an excellent process for the manufacture of $LiNi_{1-x}M_xO_2$ wherein $0<X<0.5$ and M is a transition metal or a 3B-, 4B- or 5B-group element.

A comparison between Examples 209 to 219 wherein organic acids are used and Examples 187 to 208 wherein no organic acids are used indicates that the use of the organic acid inhibits the generation of nitrogen oxides better and thus ensures safer operation.

The present invention provides a process for preparing a lithium nickel oxide ($LiNiO_2$) for use as a positive electrode active material for a nonaqueous secondary battery, which comprises the steps of: (a) using as the raw materials a lithium compound and a nickel compound at least one of which has a melting point not higher than 300° C.; (i) in the case where both of the lithium compound and the nickel compound have a melting point not higher than 300° C., mixing the above two compounds after their melting, or mixing the above compounds, melting the mixture and mixing the melted mixture; (ii) in the case where either one of the lithium compound and the nickel compound has a melting point higher than 300° C., mixing said one having a melting point higher than 300° C. with the remaining one before or after its melting; (b) calcining the resulting mixture at a temperature of 700° C. to 950° C. in air or in an atmosphere containing oxygen in a higher concentration than an atmospheric oxygen concentration.

This process allows for homogeneous mixing of the lithium compound and the nickel compound, so that the positive electrode active material obtained by calcining the homogeneous mixture constantly exhibits a discharge capacity of about 160 mAh/g.

Where nickel nitrate hexahydrate is employed as the nickel compound in combination with the lithium compound for preparation of lithium nickeloxide ($LiNiO_2$) which is to be used as a positive electrode active material for a secondary battery, an organic acid is added to the mixture before the calcination in accordance with the present invention. The addition of the organic acid suppresses generation of nitrogen oxides which may result from decomposition of the nitrate during the calcination. Therefore, the production process can be carried out more safely.

Since the positive electrode active material $LiNiO_2$ thus prepared constantly exhibits a discharge capacity of about 160 mAh/g, the use of the positive electrode active material allows for fabrication of a lithium ion secondary battery having stable battery characteristics. Such a lithium ion battery exhibits superior charge and discharge characteristics and cycle characteristics.

The stability of the positive electrode active material (lithium nickeloxide) in air can be improved by adjusting the Ni:Li molar ratio (Li/Ni ratio) in the starting material mixture to 1:0.8 to 1:1.3 (0.8 to 1.3). Thus, the nonaqueous secondary battery utilizing the positive electrode active material can have an improved stability in air.

Further, the stability in the discharge capacity of the positive electrode active material (lithium nickeloxide) can be improved by adjusting the Ni:Li molar ratio (Li/Ni ratio) in the starting material mixture to 1:1.0 to 1:1.3 (1.0 to 1.3). (The stability in the discharge capacity herein means that the discharge capacity hardly changes with a slight variation in the Ni:Li molar ratio.) Thus, the nonaqueous secondary battery utilizing the positive electrode active material can have an improved stability in the discharge capacity.

What is claimed is:

1. A process for preparing lithium nickel oxide for use as a positive electrode active material for a nonaqueous secondary battery, which comprises the steps of:
   (a) using as the raw materials a lithium compound and a nickel compound at least one of which has a melting point not higher than 300° C.;
   i) in the case where both of the lithium compound and the nickel compound have a melting point not higher than 300° C., mixing the above two compounds after their melting, or mixing the above two compounds, melting the mixture and mixing the melted mixture;
   ii) in the case where either one of the lithium compound and the nickel compound has a melting point higher than 300° C., mixing said one having a melting point higher than 300° C. with the remaining one before or after the melting of the remaining one;

(b) calcining the resulting mixture at a temperature of 700° C. to 950° C. in air or in an atmosphere containing oxygen in a higher concentration than an atmospheric oxygen concentration.

2. A process according to claim 1 wherein the mixture obtained in the step (a)(i) and (a)(ii) is cooled, or cooled and pulverized and, optionally, preliminarily calcined, before the calcining step (b).

3. A process according to claim 2 wherein the preliminary calcination is carried out at a temperature not lower than the melting point of the lithium compound or the nickel compound and not higher than 700° C.

4. A process according to claim 3 wherein the preliminary calcination is carried out at a temperature not higher than 600° C.

5. A process according to claim 1 wherein the nickel compound having a melting point not higher than 300° C. is nickel nitrate hexahydrate, the lithium compound having a melting point not higher than 300° C. is anhydrous lithium nitrate, lithium nitrate trihydrate, lithium acetate dihydrate, and or lithium iodide trihydrate.

6. A process according to claim 1 wherein the nickel compound having a melting point higher than 300° C. is nickel oxide, nickel hydroxide, nickel oxyhydroxide, nickel carbonate, basic nickel carbonate monohydrate, nickel acetate tetrahydrate, nickel oxalate dihydrate, nickel formate dihydrate, anhydrous nickel chloride or nickel chloride hexahydrate and the lithium compound having a melting point higher than 300° C. is anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide or anhydrous lithium acetate.

7. A process according to claim 1 wherein the lithium compound and the nickel compound are selected from the combinations of anhydrous lithium nitrate with nickel hydroxide, lithium acetate dihydrate with nickel oxide, anhydrous lithium hydroxide with nickel nitrate hexahydrate, lithium carbonate with nickel nitrate hexahydrate, anhydrous lithium nitrate with nickel nitrate hexahydrate, and lithium acetate dehydrate with nickel nitrate hexahydrate.

8. A process according to claim 1 wherein an organic acid is added to the mixture in the step (a)(i) and (a)(ii).

9. A process according to claim 8 wherein the nickel compound having a melting point not higher than 300° C. is nickel nitrate hexahydrate.

10. A process according to claim 9 wherein the mixture of nickel nitrate hexahydrate, the lithium compound and the organic acid are mixed or kneaded at a temperature of 60 to 130° C.

11. A process according to claim 10 wherein the mixture is preliminarily calcined at a temperature of 130 to 400° C. before the calcining step (b).

12. A process according to claim 10 wherein the lithium compound is anhydrous lithium nitrate, lithium nitrate trihydrate, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide, anhydrous lithium acetate, lithium acetate dihydrate or lithium iodide trihydrate.

13. A process according to claim 8 wherein the organic acid is acetic acid, oxalic acid, malonic acid, maleic acid or malic acid.

14. A process according to claim 9 wherein the organic acid is added to the mixture in a proportion of 0.9 to 3 mol relative to 1 mol of nickel nitrate hexahydrate.

15. A process according to claim 3 wherein the nickel compound having a melting point not higher than 300° C. is nickel nitrate hexahydrate, the lithium compound has a melting or eutectic point higher than 130° C., the melting step is carried out at 130° C., and the preliminary calcination is carried out at a temperature of 130 to 400° C.

16. A process according to claim 15 wherein the lithium compound having a melting or eutectic point higher than 130° C. is anhydrous lithium nitrate, lithium nitrate trihydrate, anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide, or anhydrous lithium acetate.

17. A process according to claim 16 wherein the lithium compound is lithium acetate dihyrate or lithium iodide trihydrate.

18. A process for preparing $LiNi_{1-x}M_xO_2$ for use as a positive electrode active material for a nonaqueous secondary battery, which comprises the steps of:
(a) using as the raw materials a lithium compound, a nickel compound and a third compound which is a transition-metal compound or a compound containing an element of the 3B, 4B or 5B group, at least one of the lithium compound and the nickel compound having a melting point not higher than 300° C.;
i) in the case where the lithium compound, the nickel compound and the third compound each have a melting point not higher than 300° C. mixing the three compounds after their melting, or mixing the three compounds, melting the mixture and mixing the melted mixture;
ii) in the case where any of the lithium compound, the nickel compound and the third compound has a melting point higher than 300° C., mixing the compound(s) having a melting point higher than 300° C. with the remaining compound(s) before or after melting the remaining compound(s); and
(b) calcining the resulting mixture at a temperature of 700° C. to 950° C. in air or in an atmosphere containing oxygen in a higher concentration than an atmospheric oxygen concentration, wherein X is more than 0 and less than 0.5 and M is a transition metal or an element of the 3B, 4B or 5B group.

19. A process according to claim 18 wherein the transition-metal compound or the compound containing an element of the 3B, 4B or 5B group is a compound of Ti, V, Cr, Mn, Fe, Co, Cu, Zn, Y, Zr, Nb, Mo, La, W, Al, In, Sn, Pb, Sb or Bi.

20. A process according to claim 19 wherein the transition-metal compound or the compound containing an element of the 3B, 4B or 5B group is a compound of Ti, V, Cr, Mn, Fe, Co, Cu, Zn, Nb, Mo, La, W, Al, In, Sn, Pb, Sb or Bi which has a melting point not higher than 300° C.

21. A process according to claim 18 wherein an organic acid is added in the step (a)(i) or (a)(ii).

22. A process according to claim 1, wherein the lithium nickel oxide has an Li/Ni ratio of 0.8 to 1.3.

23. A process according to claim 18, wherein the nickel compound having a melting point not higher than 300° C. is nickel nitrate hexahydrate, the lithium compound having a melting point not higher than 300° C. is anhydrous lithium nitrate, lithium nitrate trihydrate, lithium acetate dihydrate or lithium iodide trihydrate.

24. A process according to claim 18, wherein the nickel compound having a melting point higher than 300° C. is nickel oxide, nickel hydroxide, nickel oxyhydroxide, nickel carbonate, basic nickel carbonate monohydrate, nickel acetate tetrahydrate, nickel oxalate dihydrate, nickel formate dihydrate, anhydrous nickel chloride or nickel chloride hexahydrate and the lithium compound having a melting point higher than 300° C. is anhydrous lithium hydroxide, lithium hydroxide monohydrate, lithium oxide, lithium carbonate, lithium oxalate, lithium chloride, anhydrous lithium bromide, lithium bromide monohydrate, anhydrous lithium iodide or anhydrous lithium acetate.

25. A process according to claim 18, wherein the third compound having a melting point not higher than 300° C. is chromium chloride hexahydrate, chromium nitrate hexahydrate, manganese chloride tetrahydrate, manganese nitrate hexahydrate, cobalt chloride hexahydrate, cobalt sulfate heptahydrate, cobalt nitrate hexahydrate, zinc nitrate hexahydrate or aluminum nitrate nonahydrate.

26. A process according to claim 18, wherein the lithium compound is lithium nitrate trihydrate or lithium acetate dihydrate, the nickel compound is nickel nitrate hexahydrate and the third compound having a melting point not higher than 300° C. is chromium chloride hexahydrate, chromium nitrate hexahydrate, manganese chloride tetrahydrate, manganese nitrate hexahydrate, cobalt chloride hexahydrate, cobalt sulfate heptahydrate, cobalt nitrate hexahydrate, zinc nitrate hexahydrate or aluminum nitrate nonahydrate.

27. A process according to claim 18, wherein the third compound having a melting point not higher than 300° C. is chromium trioxide, chromium acetate, chromium chloride, chromium oxide, chromium oxalate, manganese oxide, manganese carbonate, manganese acetate, manganese oxalate, cobalt chloride, cobalt oxide, cobalt acetate, cobalt oxalate, zinc oxide, zinc carbonate, zinc oxalate, aluminum oxide, aluminum hydroxide or aluminum oxalate.

28. A process according to claim 18, wherein the lithium compound is lithium nitrate trihydrate, the nickel compound is nickel oxide or nickel hydroxide, and the third compound having a melting point higher than 300° C. is chromium trioxide, chromium acetate, chromium chloride, chromium oxide, chromium oxalate, manganese oxide, manganese carbonate, manganese acetate, manganese oxalate, cobalt chloride, cobalt oxide, cobalt acetate, cobalt oxalate, zinc oxide, zinc carbonate, zinc oxalate, aluminum oxide, aluminum hydroxide or aluminum oxalate.

29. The process according to claim 1, wherein the lithium nickel oxide is $LiNiO_2$.

30. The process according to claim 1, wherein at least one of the nickel compound and the lithium compound has a melting point not higher than 130° C.

31. A method of making a nonaqueous secondary battery, comprising the steps of:
preparing a positive electrode with an active material of lithium nickel oxide by:
(a) using as the raw materials a lithium compound and a nickel compound at least one of which has a melting point not higher than 300° C.;
i) in the case where both of the lithium compound and the nickel compound have a melting point not higher than 300° C., mixing the above two compounds after their melting, or mixing the above two compounds, melting the mixture and mixing the melted mixture;
ii) in the case where either one of the lithium compound and the nickel compound has a melting point higher than 300° C., mixing said one having a melting point higher than 300° C. with the remaining one before or after the melting of the remaining one;
(b) calcining the resulting mixture at a temperature of 700° C. to 950° C. in air or in an atmosphere containing oxygen in a higher concentration than an atmospheric oxygen concentration;
preparing a negative electrode; and
arranging said positive electrode and said negative electrode in a casing with a separator therebetween.

32. A method of making a nonaqueous secondary battery, comprising the steps of:
preparing a positive electrode with an active material of $LiNi_{1-x}M_xO_2$ by:
(a) using as the raw materials a lithium compound, a nickel compound and a third compound which is a transition-metal compound or a compound containing an element of the 3B, 4B or 5B group, at least one of the lithium compound and the nickel compound having a melting point not higher than 300° C.;
(i) in the case where the lithium compound, the nickel compound and third compound each have a melting point not higher than 300° C., mixing the three compounds after their melting, or mixing the three compounds, melting the mixture and mixing the melted mixture;
(ii) in the case where any one of the lithium compound, the nickel compound and the third compound has a melting point higher than 300° C., mixing the compound(s) having a melting point higher than 300° C. with the remaining compound(s) before or after the melting of the remaining compound(s); and
(b) calcining the resulting mixture at a temperature of 700° C. to 950° C. in air or in an atmosphere containing oxygen in a higher concentration than an atmospheric oxygen concentration, wherein X is more than 0 and less than 0.5 and M is a transition metal or an element of the 3B, 4B or 5B group;
preparing a negative electrode; and
arranging said positive electrode and said negative electrode in a casing with a separator therebetween.

33. A nonaqueous secondary battery which comprises a positive electrode containing a positive electrode active material of lithium nickel oxide prepared by a process according to claim 1, a negative electrode and an ion conductor, wherein the lithium nickel oxide exhibits a discharge capacity in the first cycle more than 139 mAh/g.

34. A nonaqueous secondary battery which comprises a positive electrode containing a positive electrode active material of $LiNi_{1-x}M_xO_2$ prepared by the process according to claim 18, a negative electrode and an ion conductor, wherein X is more than 0 and less than 0.5 and M is a transition metal or an element of the 3B, 4B or 5B group, and wherein the $LiNi_{1-x}M_xO_2$ exhibits a discharge capacity in the first cycle more than 150 mAh/g.

* * * * *